US012280010B2

(12) United States Patent
Asano et al.

(10) Patent No.: US 12,280,010 B2
(45) Date of Patent: Apr. 22, 2025

(54) LOCK MECHANISM, EQUIPMENT CONNECTOR, CONTAINER CONNECTOR, AND CONNECTION EQUIPMENT

(71) Applicant: DAIWA CAN COMPANY, Tokyo (JP)

(72) Inventors: Toshihiro Asano, Kanagawa (JP); Toshio Iino, Kanagawa (JP); Naoyuki Takahashi, Kanagawa (JP); Naoki Sunaga, Kanagawa (JP); Masanori Okabayashi, Kanagawa (JP); Mio Hattori, Kanagawa (JP)

(73) Assignee: DAIWA CAN COMPANY, Tokyo (JP)

( * ) Notice: Subject to any disclaimer, the term of this patent is extended or adjusted under 35 U.S.C. 154(b) by 823 days.

(21) Appl. No.: 17/466,926

(22) Filed: Sep. 3, 2021

(65) Prior Publication Data

US 2022/0023149 A1 Jan. 27, 2022

Related U.S. Application Data

(63) Continuation of application No. PCT/JP2020/013958, filed on Mar. 27, 2020.

(30) Foreign Application Priority Data

Mar. 29, 2019 (JP) ................................ 2019-067986

(51) Int. Cl.
*A61J 1/20* (2006.01)

(52) U.S. Cl.
CPC ........... *A61J 1/2048* (2015.05); *A61J 1/2096* (2013.01)

(58) Field of Classification Search
CPC .. A61M 2039/0072; A61M 2039/0081; A61M 2039/009; A61J 1/201; A61J 1/2048; A61J 1/2096
See application file for complete search history.

(56) References Cited

U.S. PATENT DOCUMENTS

2011/0074148 A1 3/2011 Imai
2012/0172830 A1 7/2012 Yokoyama et al.
(Continued)

FOREIGN PATENT DOCUMENTS

CN 101940532 A 1/2011
JP 2002-078774 A 3/2002
(Continued)

OTHER PUBLICATIONS

English language translation of International Preliminary Report on Patentability issued Sep. 28, 2021, including Written Opinion of the International Searching Authority issued Jun. 16, 2020 and Notification of Transmittal of Translation of the International Preliminary Report on Patentability issued Oct. 14, 2021, in connection with PCT International Application No. PCT/JP2020/013958.
(Continued)

*Primary Examiner* — Ariana Zimbouski
*Assistant Examiner* — Timothy L Flynn
(74) *Attorney, Agent, or Firm* — John P. White

(57) ABSTRACT

A lock mechanism includes an engaged section of a second member and an engagement member of a first member. The engagement member includes an operating section, a fulcrum section configured to contact the second member in a state in which the operating section is pressed, an engaging section engaging with the engaged section, a deformation section configured to be bent to move the engaging section when the operating section is pressed, and a fixing section fixed to the edge of a hole.

6 Claims, 48 Drawing Sheets

(56) References Cited

U.S. PATENT DOCUMENTS

| | | | | |
|---|---|---|---|---|
| 2015/0083950 | A1 | 3/2015 | Okiyama | |
| 2019/0046410 | A1* | 2/2019 | Shemesh .................. | A61J 1/20 |
| 2020/0038289 | A1 | 2/2020 | Asano et al. | |

FOREIGN PATENT DOCUMENTS

| | | | |
|---|---|---|---|
| JP | 2004-000483 | A | 1/2004 |
| JP | 2013-226281 | A | 11/2013 |
| WO | WO 2009/133754 | A1 | 11/2009 |
| WO | WO 2011/030787 | A1 | 3/2011 |
| WO | WO 2018/186361 | A1 | 10/2018 |
| WO | WO 2019/026840 | A1 | 2/2019 |

OTHER PUBLICATIONS

Taiwanese official action dated Mar. 17, 2023 in connection with corresponding Taiwanese Application No. 109110423.

European search report dated Nov. 11, 2022 in connection with corresponding European Patent Application No. 20 78 2086.

International Search Report issued Jun. 16, 2020 in connection with PCT International Application No. PCT/JP2020/013958.

Singapore official action dated Oct. 14, 2022 in corresponding Singapore Patent Application No. 11202109565Y.

* cited by examiner

LOCK MECHANISM, EQUIPMENT CONNECTOR, CONTAINER CONNECTOR, AND CONNECTION EQUIPMENT

This application is a Continuation Application of PCT Application No. PCT/JP2020/013958, filed Mar. 27, 2020 and based upon and claiming the benefit of priority from prior Japanese Patent Application No. 2019-067986, filed Mar. 29, 2019, the entire contents of all of which are incorporated herein by reference.

BACKGROUND

1. Field

The present invention relates to a lock mechanism for locking a state in which two members are connected to each other and an engaging section of one member and an engaged section of the other member are engaged with each other, an equipment connector, a container connector, and a connection equipment.

2. Description of the Related Art

There is conventionally known a connection equipment that connects a container and an equipment to each other to collect a chemical solution in the container such as a vial by the equipment such as a syringe. There is known such connection equipment including a container connector fixed to the mouth of the container and an equipment connector for fixing the equipment, which has one opening end and to which the container connector is connected by being inserted from the opening.

Furthermore, there is known such connection equipment that maintains the connection state between the equipment connector and the container connector by engaging an engaging section provided on the peripheral wall of the equipment connector and an engaged section provided on the outer peripheral surface of the container connector with each other.

The engaging section is provided at one end of a long engagement member that is disposed in a hole formed on the peripheral wall of the equipment connector and has a middle portion fixed to the peripheral wall. The other end of the engagement member is formed in a pressing section that is pressed by an operator toward the inner side of the equipment connector.

When the operator presses the pressing section, the engagement member rotates about a fixing section fixed to the equipment connector to move the engaging section in a direction away from the engaged section of the container connector. When releasing the connection between the equipment connector and the container connector, the operator presses the pressing section to move the engaging section to a position where the engagement with the engaged section is released, and then pulls the container connector out of the equipment connector (see, for example, patent literature 1).

CITATION LIST

Patent Literature

Patent Literature 1: International Publication No. 2018/186361

However, if a fixing section about which an engagement member rotates is disposed between an engaging section and a pressing section, like the above-described engagement member, when attempting to pull a container connector out of an equipment connector, engagement between the engaging section of the equipment connector and the engaged section of the container connector may be released.

That is, when attempting to pull the container connector out of the equipment connector, the engaging section is pressed by the engaged section to generate, for the engagement member, a rotation moment that moves the engaging section in a direction away from the engaged section about the fixing section. Therefore, when attempting to pull the container connector out of the equipment connector by a predetermined force, a rotation moment generated in the engagement member moves the engaging section, resulting in releasing of engagement between the engaging section and the engaged section.

For example, for the connection equipment that connects a syringe and a container storing a chemical solution, it is not preferable that engagement between the engaging section of the equipment connector and the engaged section of the container connector is released against the intention of the operator.

To cope with this, an engagement member having an arrangement in which a fixing section is disposed on the opposite side of the pressing section with respect to the engaging section is considered. In this arrangement, however, to release the engagement between the engaging section and the engaged section, it is necessary to press the pressing section in a direction away from an outer shell, which is poor in operability.

BRIEF SUMMARY OF THE INVENTION

According to an aspect of embodiments, a lock mechanism is a lock mechanism for locking engagement between a first member including a barrel section formed in a cylindrical shape and formed with a hole extending through in a radial direction and a second member inserted into the barrel section from one end of the barrel section, including an engaged section formed on an outer surface of the second member, and an engagement member having one end portion fixed to an edge of the hole and long in an axial direction of the barrel section, the engagement member including an operating section formed in another end portion and having a gap with respect to the second member in the radial direction, a fulcrum section formed continuously from the operating section in the axial direction of the barrel section and configured to contact the second member in a state in which the operating section is pressed inward in the radial direction, an engaging section formed continuously from the fulcrum section in the axial direction, formed in a convex shape protruding inward in the radial direction, and engaging with the engaged section in the axial direction, and a deformation section formed continuously from the engaging section in the axial direction and configured to be bent to move the engaging section outward in the radial direction when the operating section is pressed inward in the radial direction.

According to an aspect of embodiments, an equipment connector includes a barrel section fixed to a container, including a container-side flow path constituting portion, formed in a cylindrical shape so that a container connector including an engaged section on an outer surface is insertable from one end, and having a hole formed at a position facing the container connector in a radial direction, an equipment-side flow path constituting portion stored in the barrel section and configured to communicate with the container-side flow path constituting portion when the container connector is inserted into the barrel section, and an engagement member having one end portion fixed to an edge of the hole and long in an axial direction of the barrel section, the engagement member including an operating section formed in another end portion and having a gap with respect to the container connector in the radial direction, a fulcrum section formed continuously from the operating section in the axial direction and configured to contact the container connector in a state in which the operating section is pressed inward in the radial direction, an engaging section formed continuously from the fulcrum section in the axial direction, formed in a convex shape protruding inward in the radial direction, and engaging with the engaged section in the axial direction in a state in which the container-side flow path constituting portion and the equipment-side flow path constituting portion communicate with each other, and a deformation section formed continuously from the engaging section in the axial direction and configured to be bent to move the engaging section outward in the radial direction when the operating section is pressed inward in the radial direction.

According to an aspect of embodiments, a container connector includes an insertion section configured to be insertable into a cylindrical barrel section of an equipment connector for fixing an equipment, which includes an equipment-side flow path constituting portion and includes the barrel section formed with a hole extending through in a radial direction, from one end of the barrel section, a container fixing section fixed to the container, a container-side flow path constituting portion formed in the insertion section and the container fixing portion and configured to communicate with an interior of the container when the container fixing section is fixed to the container and communicate with the equipment-side flow path constituting portion when the insertion section is inserted into the barrel section, and an engaged section formed in the insertion portion and configured to, in a state in which the container-side flow path constituting portion and the equipment-side flow path constituting portion communicate with each other, be engaged with an engaging section of an engagement member of the equipment connector, which includes an operating section, a fulcrum section formed continuously from the operating section in an axial direction of the barrel section and configured to contact the insertion section in a state in which the operating section is pressed inward in a radial direction of the barrel section, the engaging section formed continuously from the fulcrum section in the axial direction and formed in a convex shape protruding inward in the radial direction, and a deformation section formed continuously from the engaging section in the axial direction and configured to be bent to move the engaging section outward in the radial direction when the operating section is pressed inward in the radial direction.

According to an aspect of embodiments, a connection equipment includes a container connector fixed to a container, including a container-side flow path constituting portion, and formed with an engaged section on an outer surface, and an equipment connector. The equipment connector includes a barrel section formed in a cylindrical shape so that the container connector is insertable from one end and having a hole formed at a position facing the container connector in a radial direction, an equipment-side flow path constituting portion stored in the barrel section and configured to communicate with the container-side flow path constituting portion when the container connector is inserted into the barrel section, and an engagement member having one end portion fixed to an edge of the hole and long in an axial direction of the barrel section, the engagement member including an operating section formed in another end portion and having a gap with respect to the container connector in the radial direction, a fulcrum section formed continuously from the operating section in the axial direction and configured to contact the container connector in a state in which the operating section is pressed inward in the radial direction, an engaging section formed continuously from the fulcrum section in the axial direction, formed in a convex shape protruding inward in the radial direction, and engaging with the engaged section in the axial direction in a state in which the container-side flow path constituting portion and the equipment-side flow path constituting portion communicate with each other, and a deformation section formed continuously from the engaging section in the axial direction and configured to be bent to move the engaging section outward in the radial direction when the operating section is pressed inward in the radial direction.

DETAILED DESCRIPTION

A connection equipment 10 according to the first embodiment of the present invention will be described with reference to FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, and 54.

Figure 1:
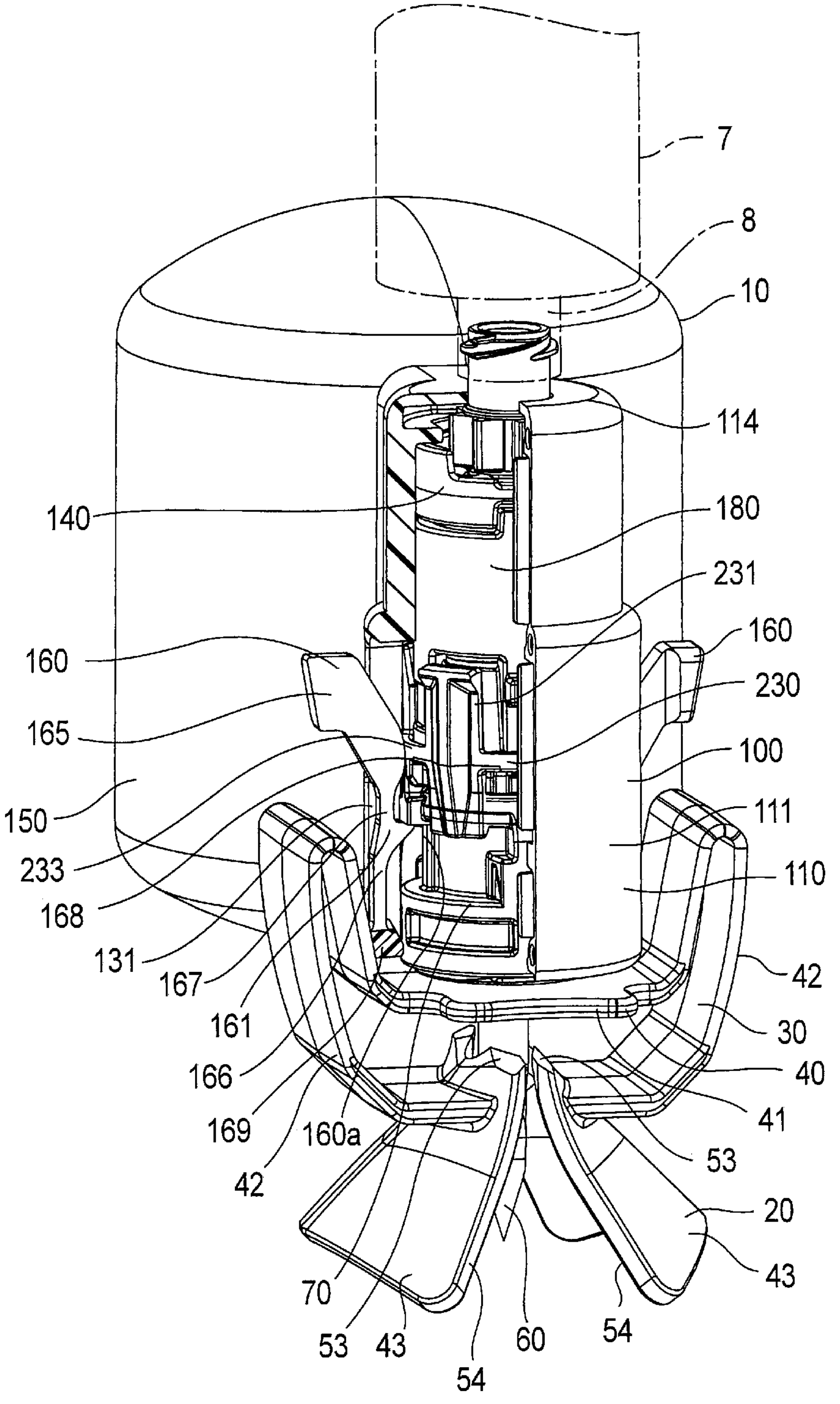
FIG. 1 is a perspective view showing the arrangement of an equipment connector according to the first embodiment of the present invention.
Figure 2:
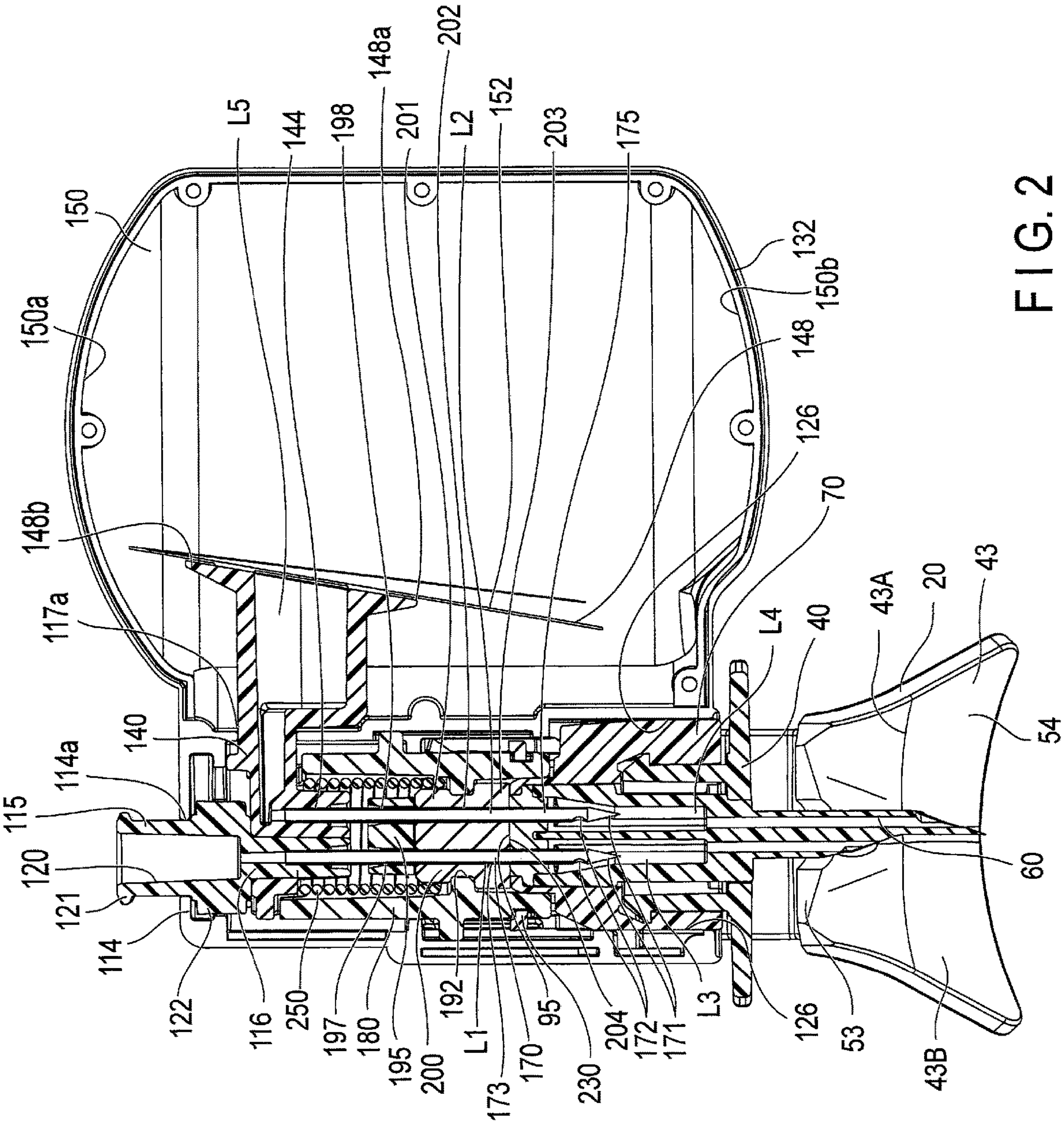
FIG. 2 is a sectional view showing the arrangement of the connection equipment.
Figure 3:
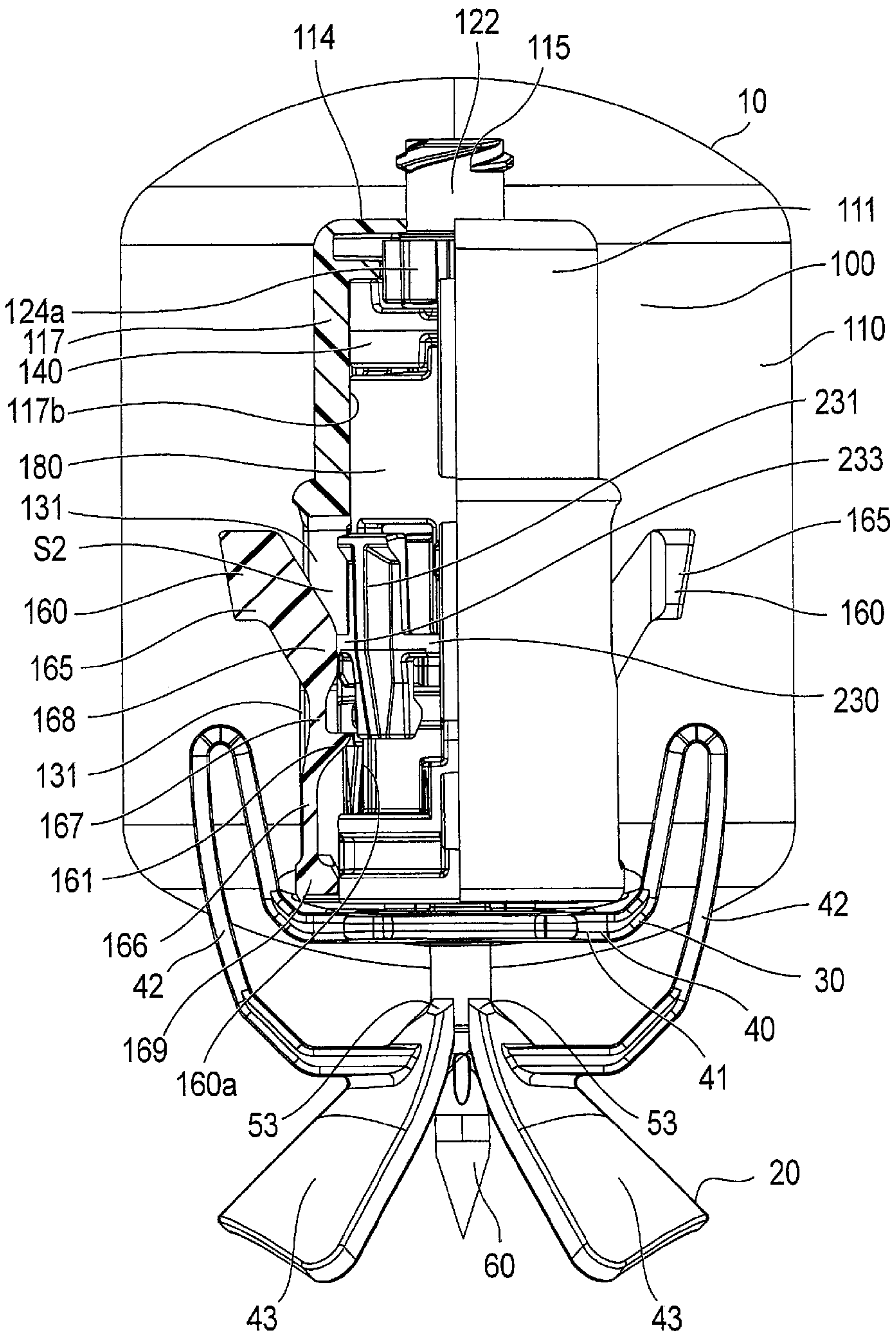
FIG. 3 is a side view showing the arrangement of the connection equipment by partially cutting it.
Figure 4:
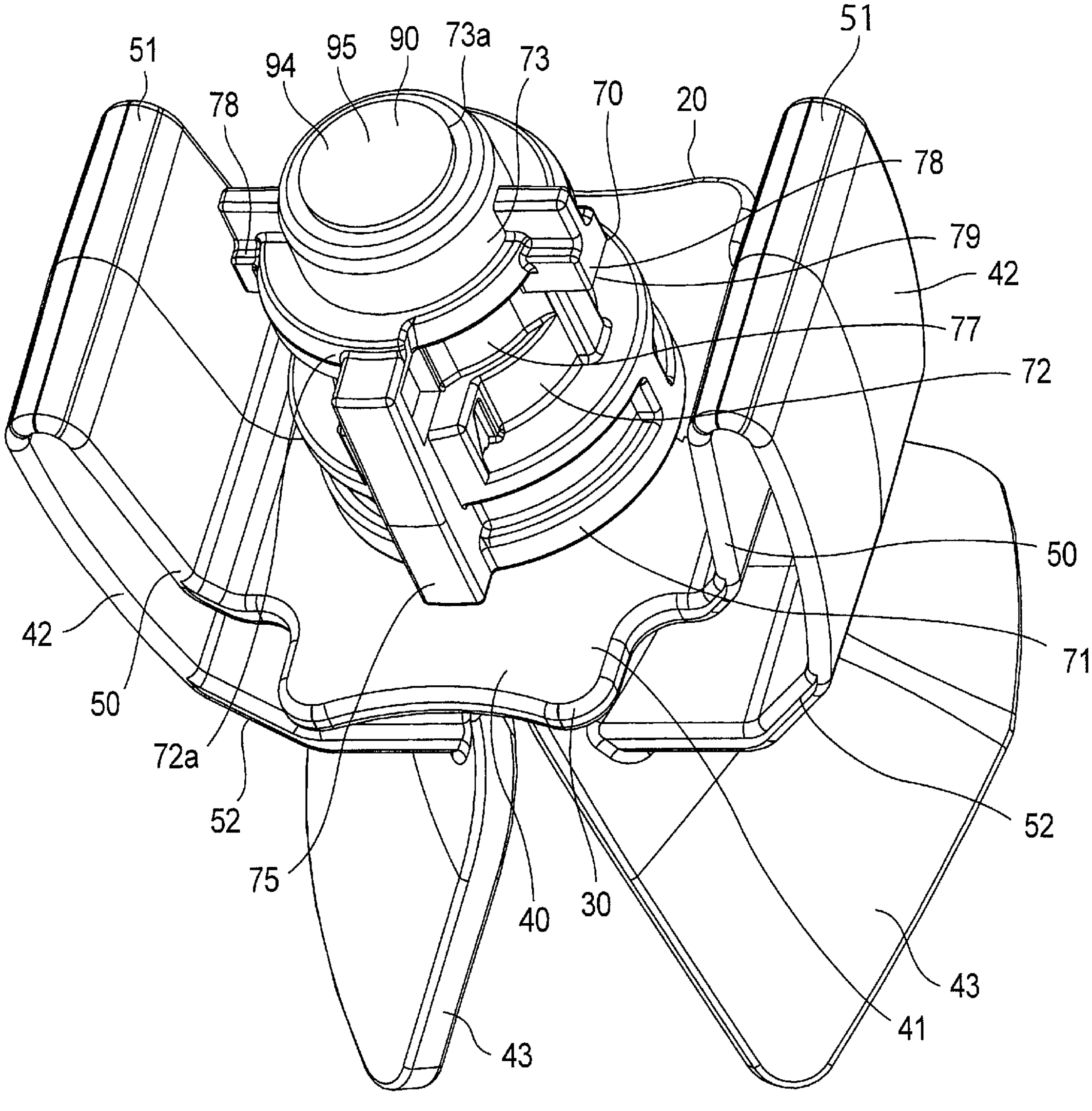
FIG. 4 is a perspective view showing the arrangement of a container connector used in the connection equipment.
Figure 5:
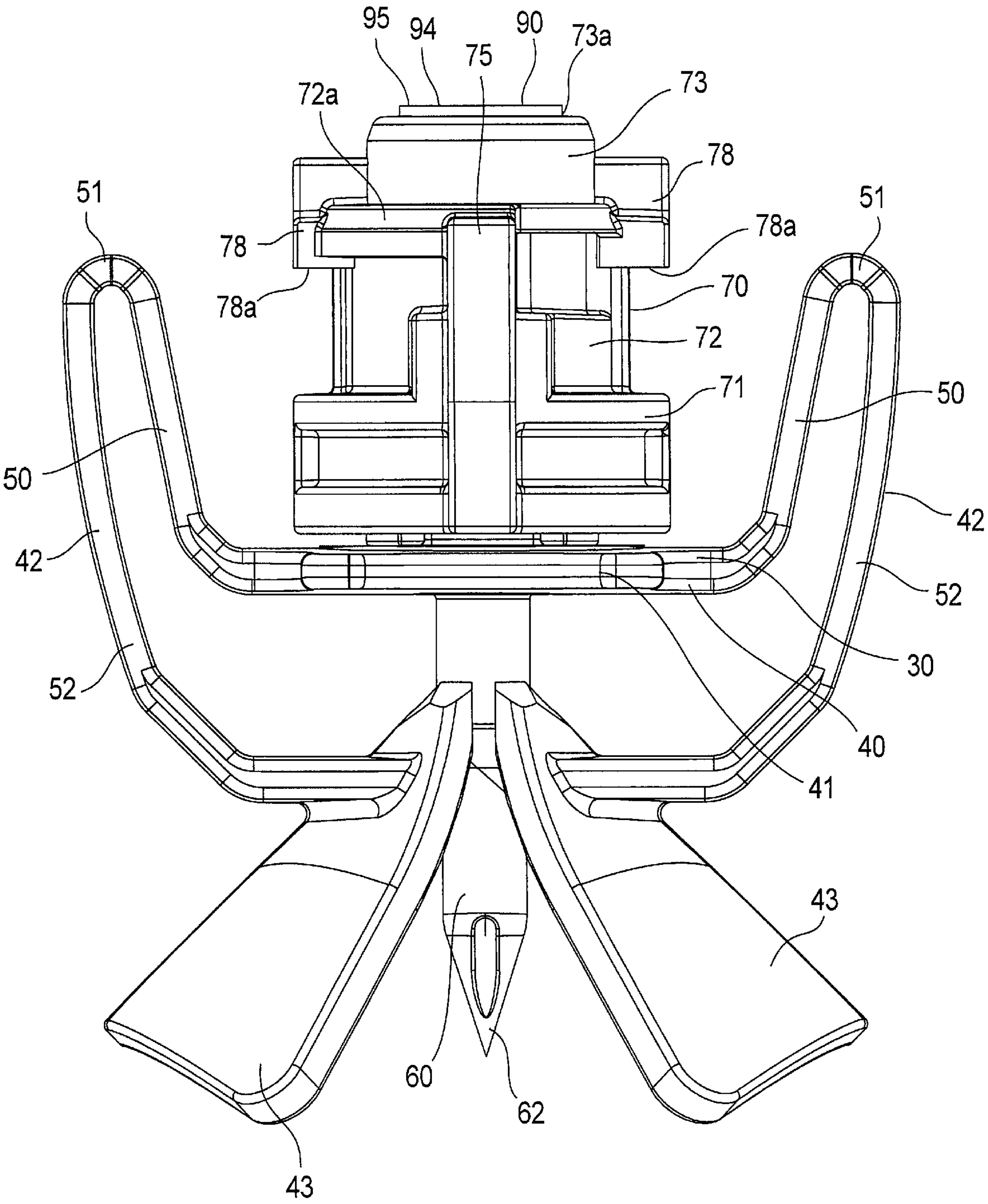
FIG. 5 is a side view showing the arrangement of the container connector.
Figure 6:
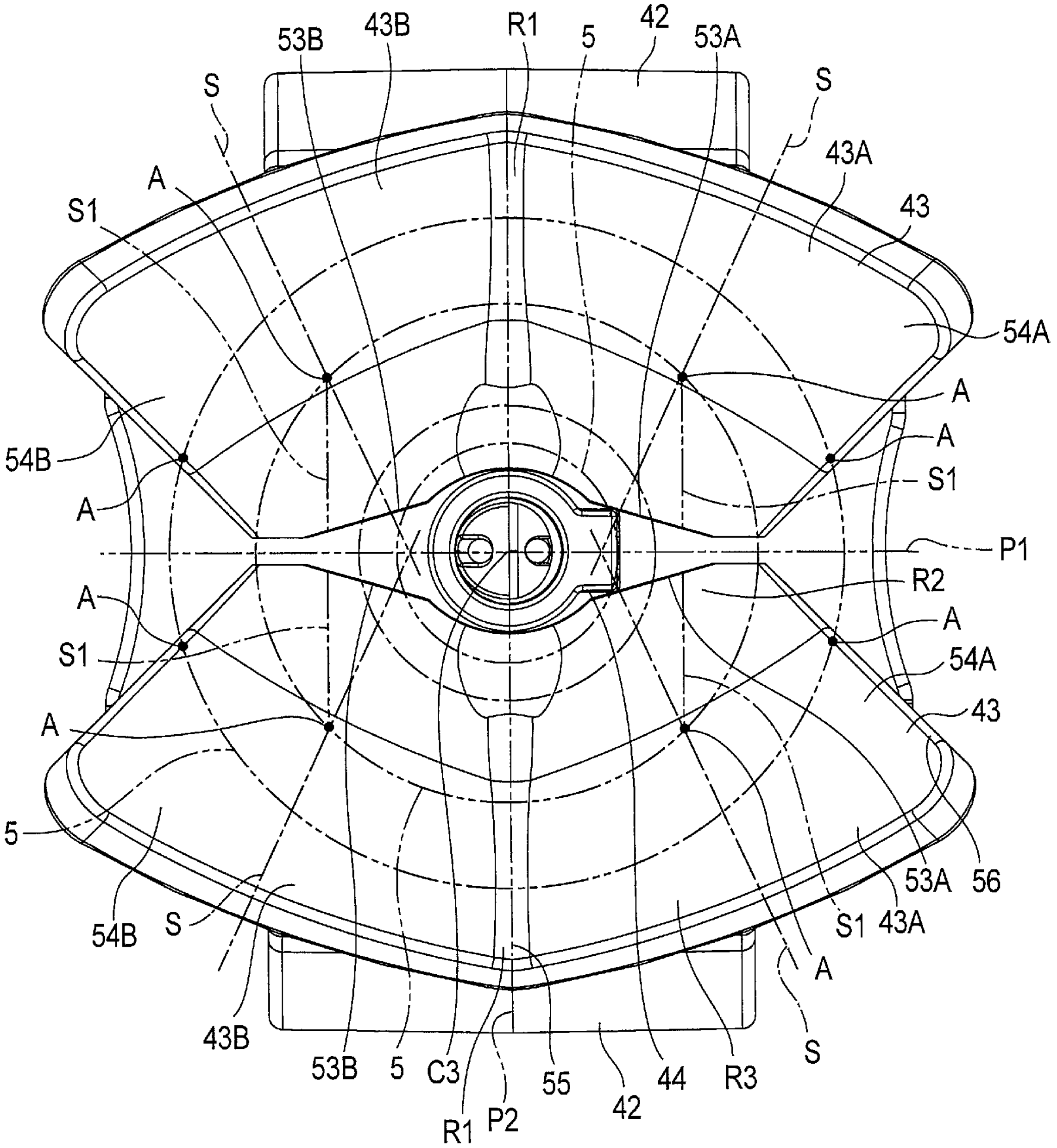
FIG. 6 is a bottom view showing the arrangement of the container connector.

FIG. 1 is a perspective view showing the arrangement of the connection equipment 10 by partially cutting it. FIG. 2 is a sectional view showing the arrangement of the connection equipment 10. FIG. 3 is a side view showing the arrangement of the connection equipment 10 by partially cutting it. FIG. 3 shows a state in which an outer shell main body 111 is rotated about its axis by 90° with respect to FIG. 2. FIG. 4 is a perspective view showing the arrangement of a container connector 20 used in the connection equipment 10. FIG. 5 is a side view showing the arrangement of the container connector 20. FIG. 6 is a bottom view showing the arrangement of the container connector 20.

Figure 7:
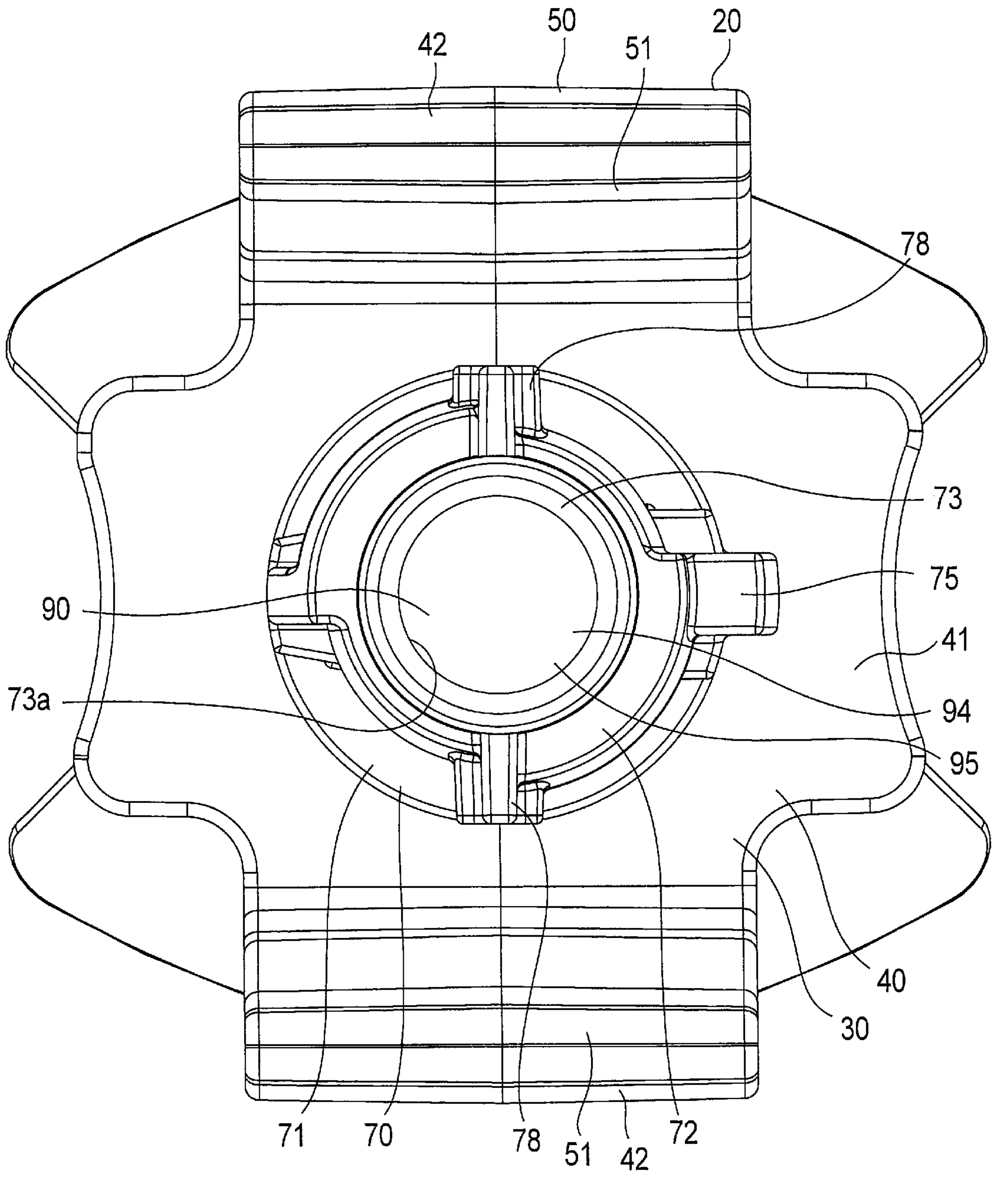
FIG. 7 is a plan view showing the arrangement of the container connector.
Figure 8:
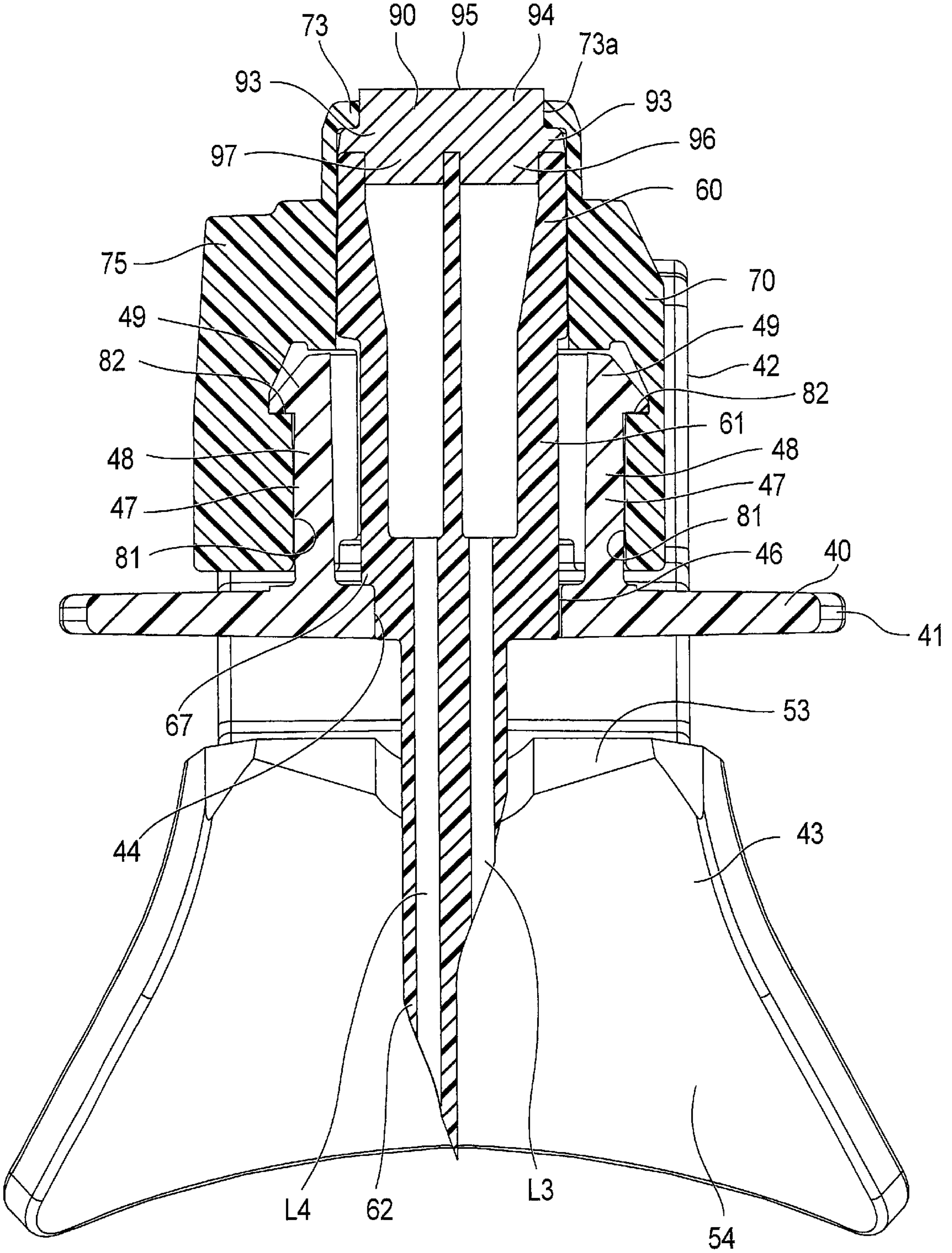
FIG. 8 is a sectional view showing the arrangement of the container connector.
Figure 9:
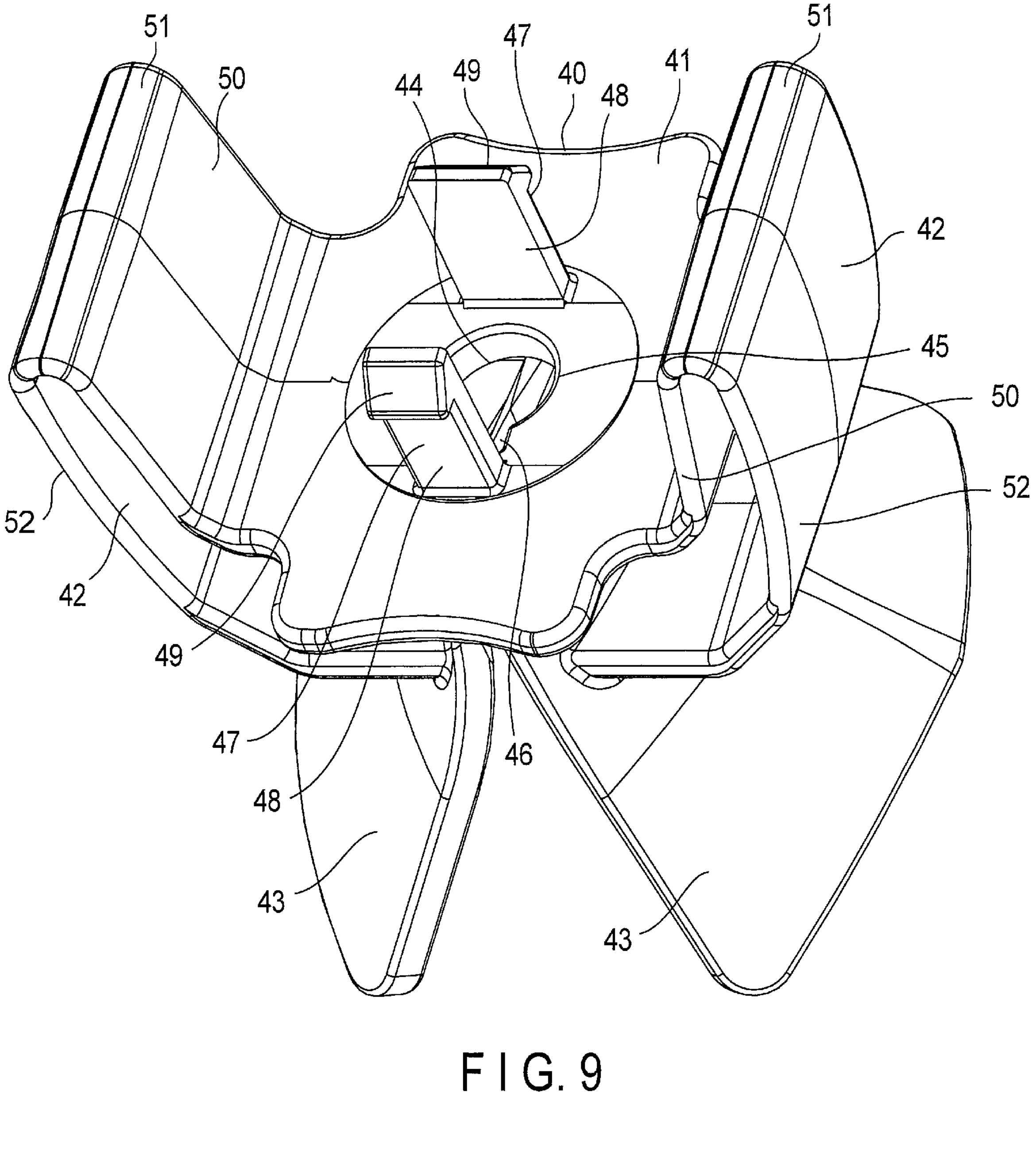
FIG. 9 is a perspective view showing the arrangement of a container cap used in the container connector.
Figure 10:
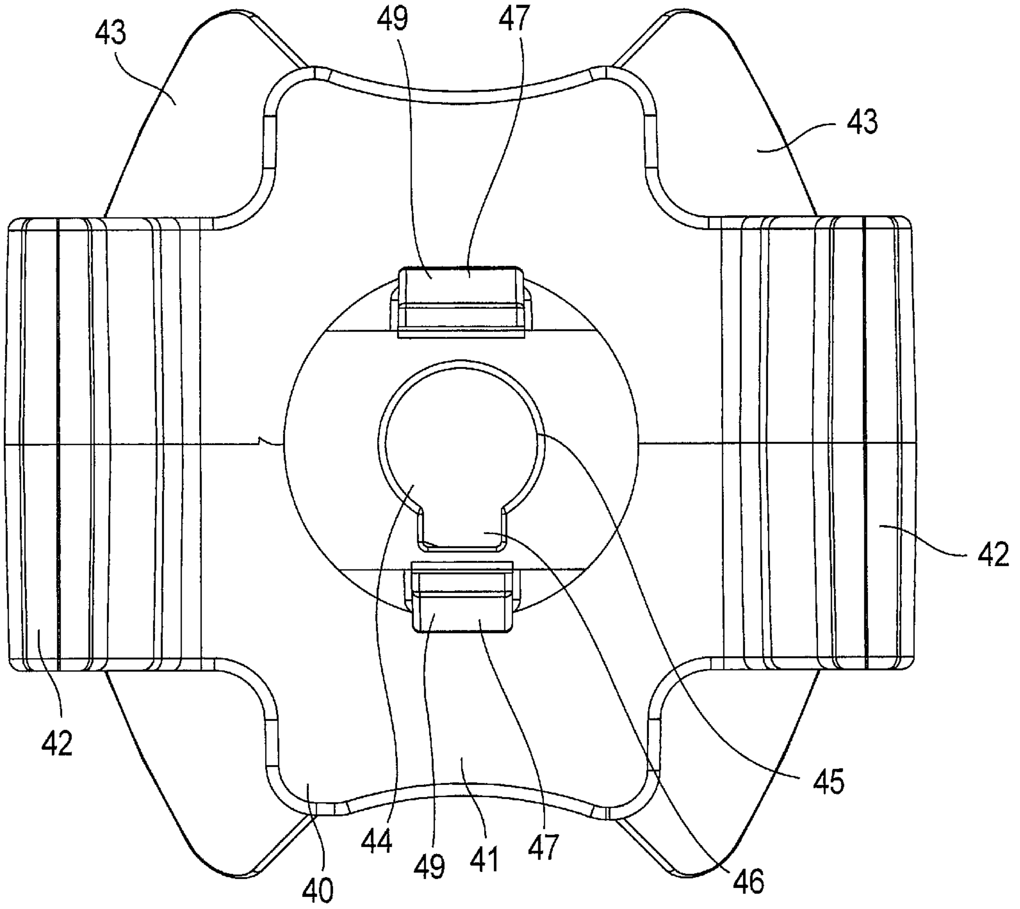
FIG. 10 is a plan view showing the arrangement of the main body of the container connector.
Figure 11:
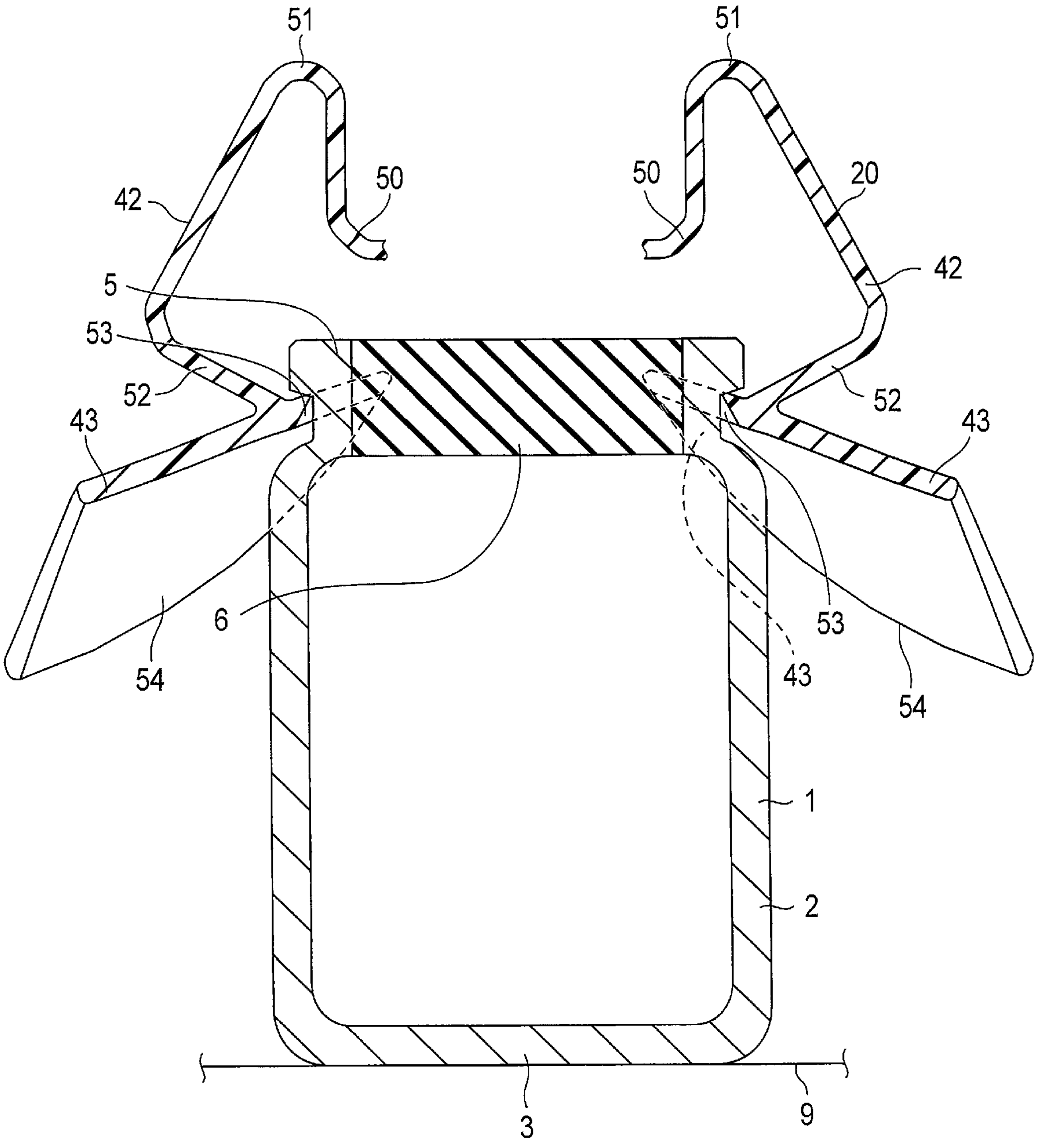
FIG. 11 is a sectional view showing a state in which the container connector is fixed to a container.
Figure 12:
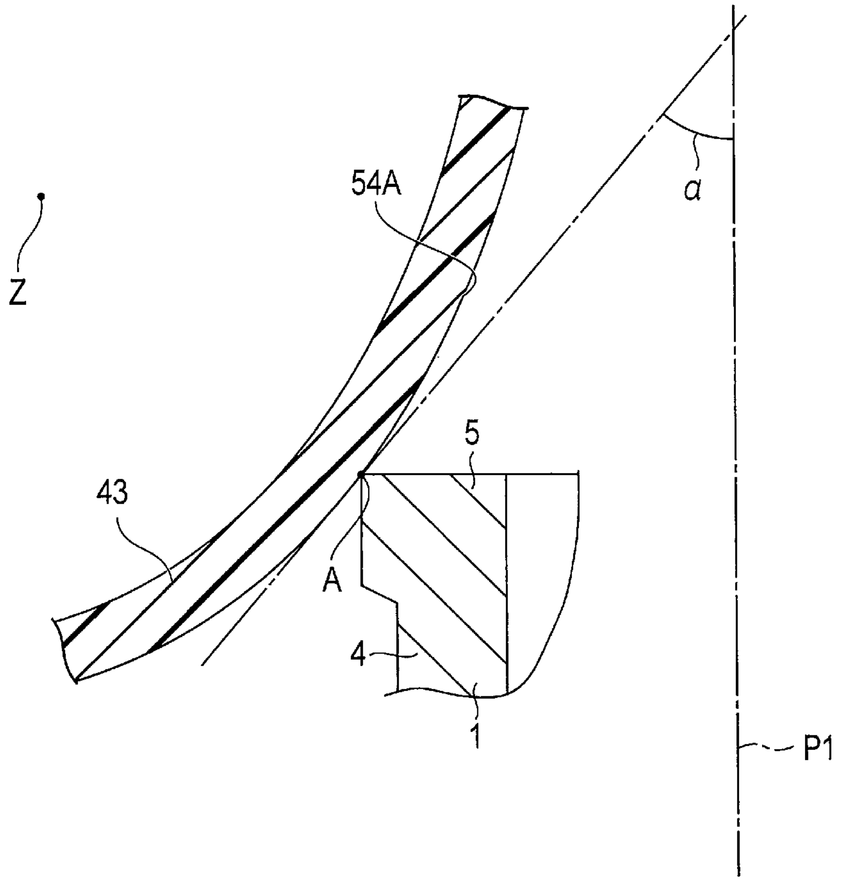
FIG. 12 is a sectional view showing a main part in the state in which the container connector is connected to the container.

FIG. 7 is a plan view showing the arrangement of the container connector 20. FIG. 8 is a sectional view showing the arrangement of the container connector 20. FIG. 9 is a perspective view showing the arrangement of a container fixing section main body 40 used in the container connector 20. FIG. 10 is a plan view showing the arrangement of the container fixing section main body 40. FIG. 11 is a sectional view showing a state in which the container connector 20 is fixed to a container 1. FIG. 12 is a sectional view showing a main part in a process of connecting the container connector 20 to the container 1.

Figure 13:
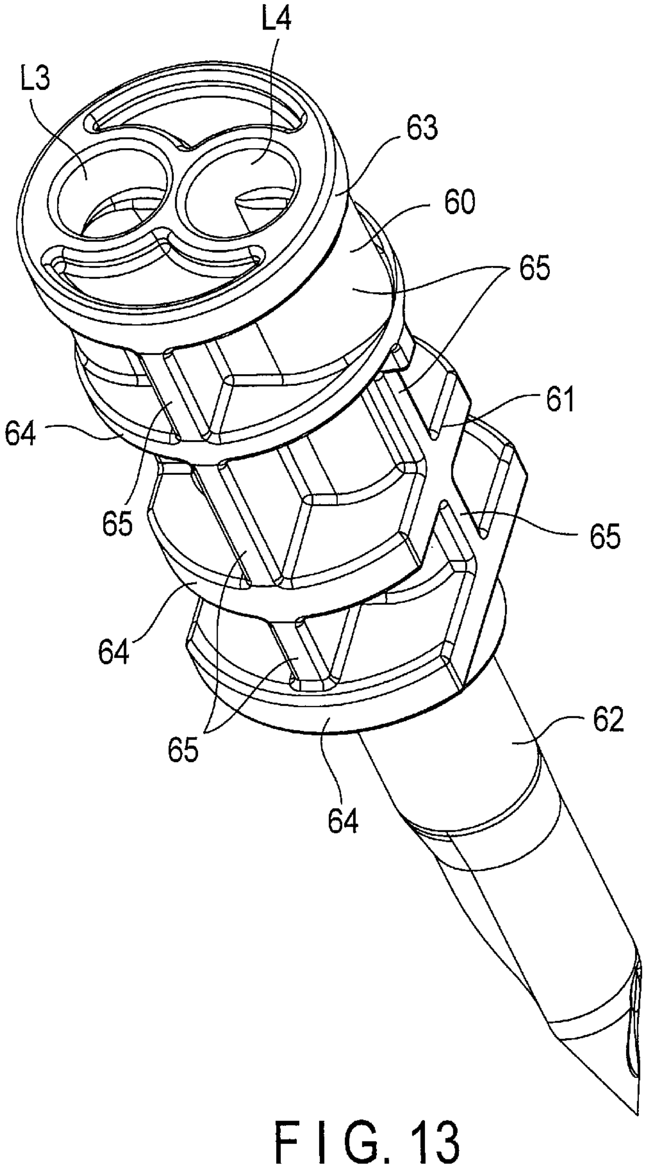
FIG. 13 is a perspective view showing the arrangement of a needle member used in the container connector.
Figure 14:
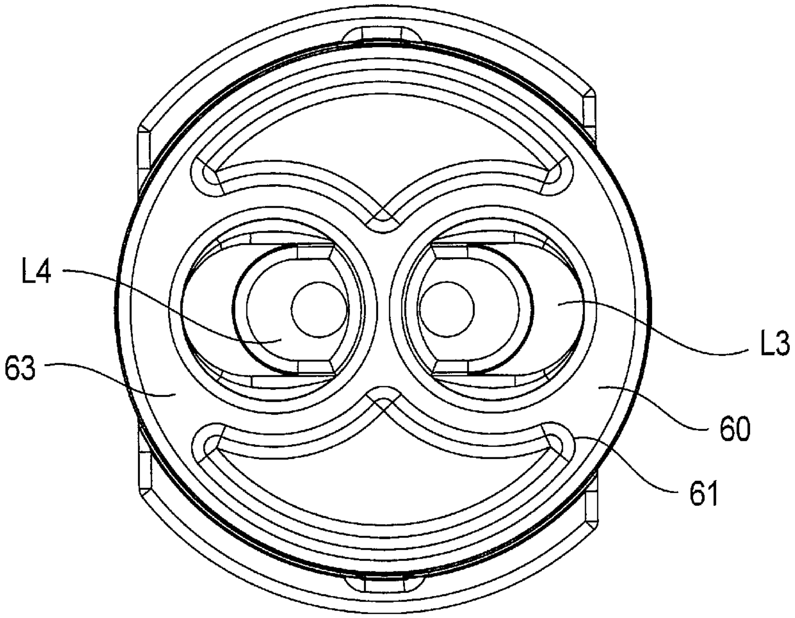
FIG. 14 is a plan view showing the arrangement of a pin of the container connector.
Figure 15:
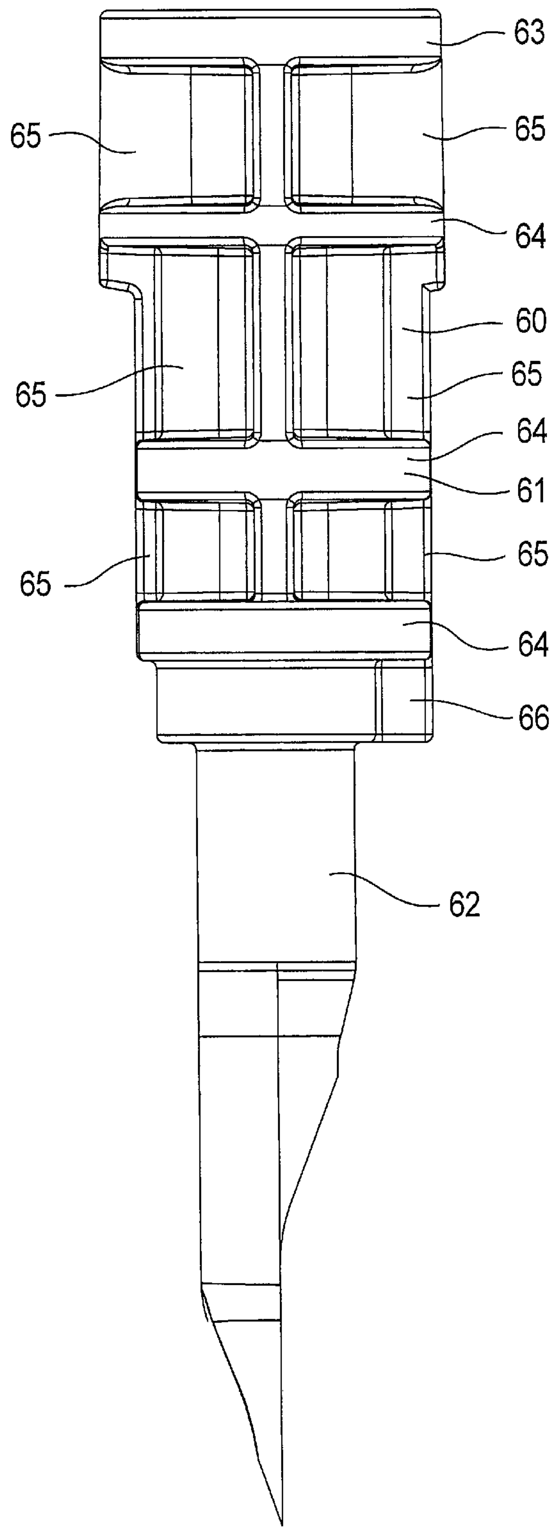
FIG. 15 is a side view showing the arrangement of the pin of the container connector.
Figure 16:
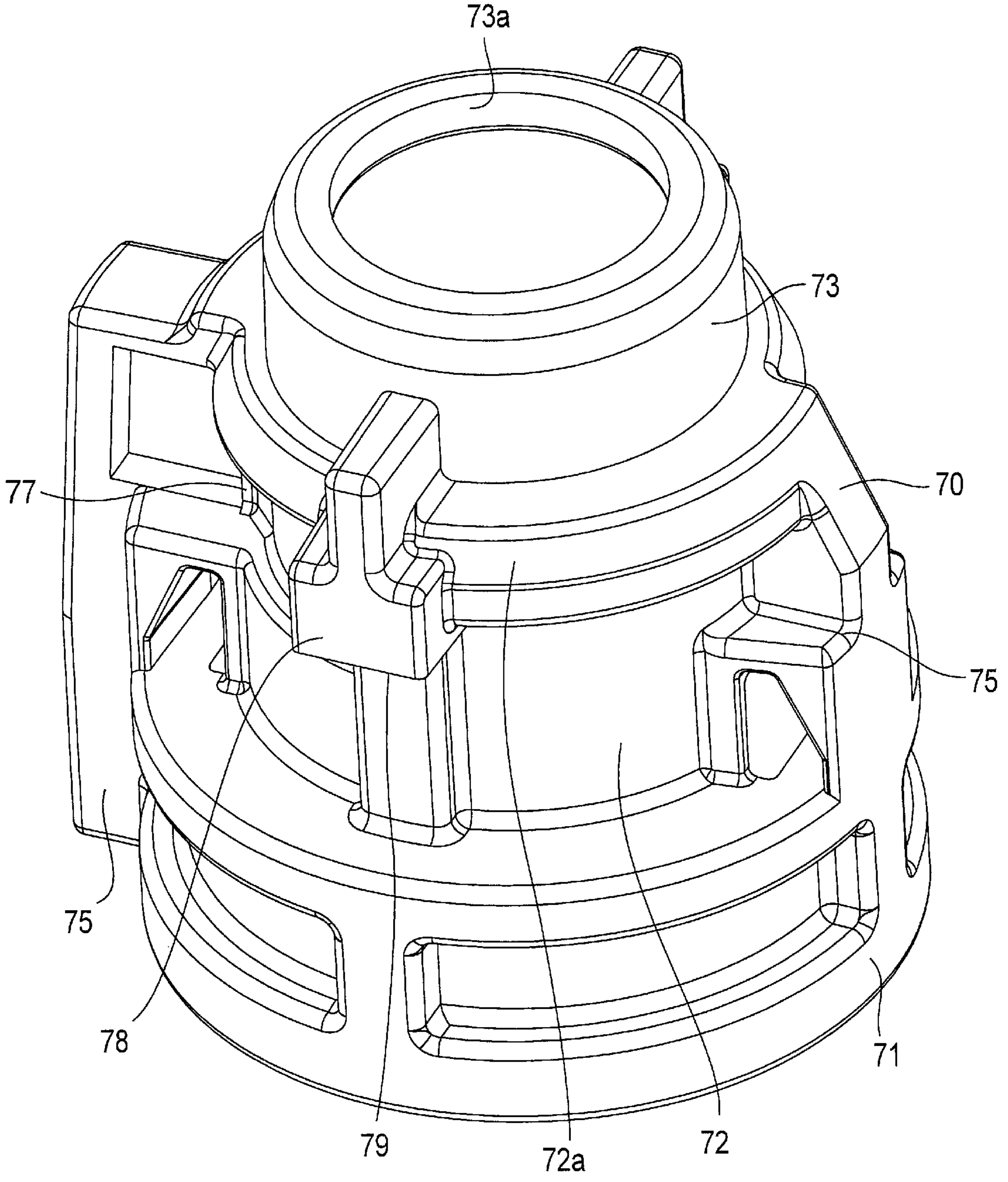
FIG. 16 is a perspective view showing the arrangement of the container cap used in the container connector.
Figure 17:
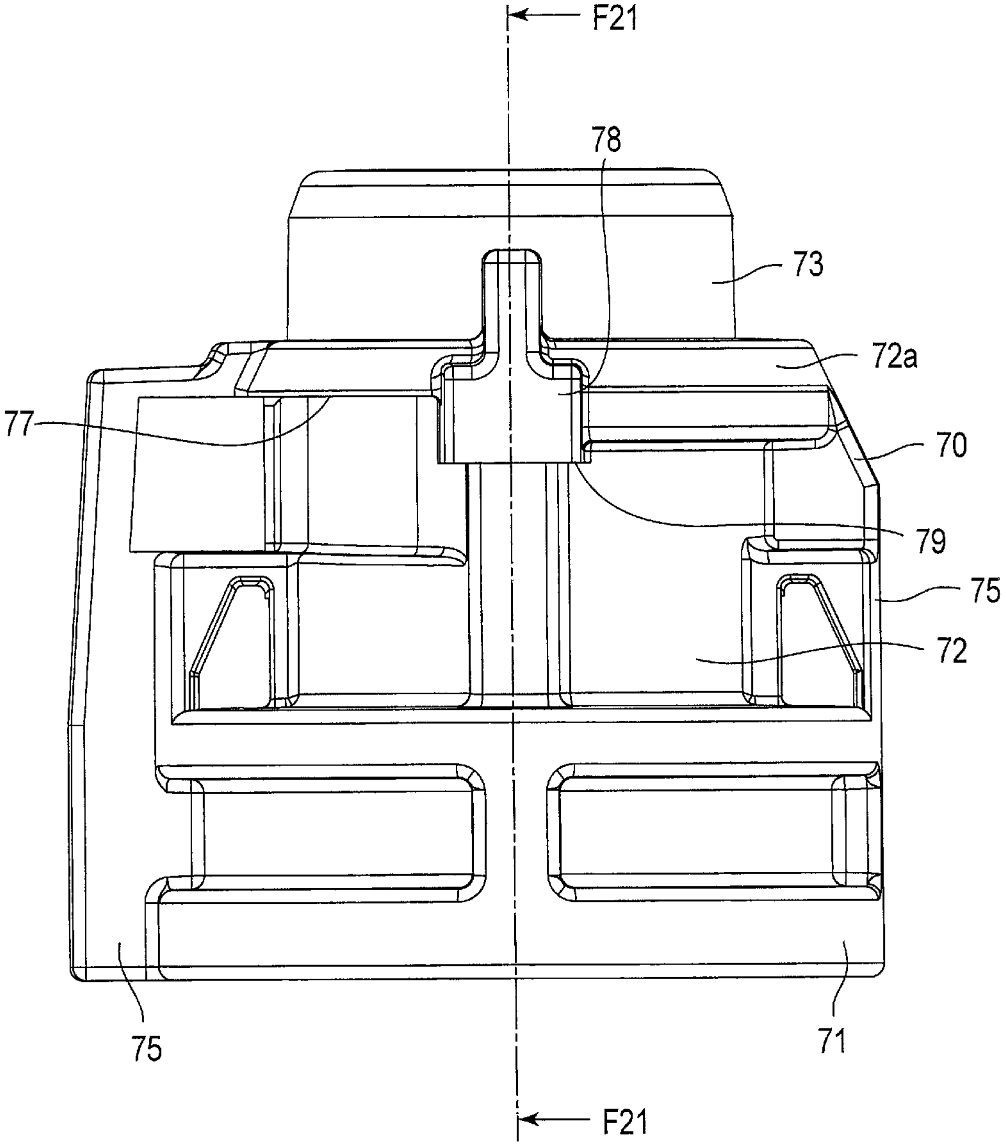
FIG. 17 is a side view showing the arrangement of the container cap.
Figure 18:
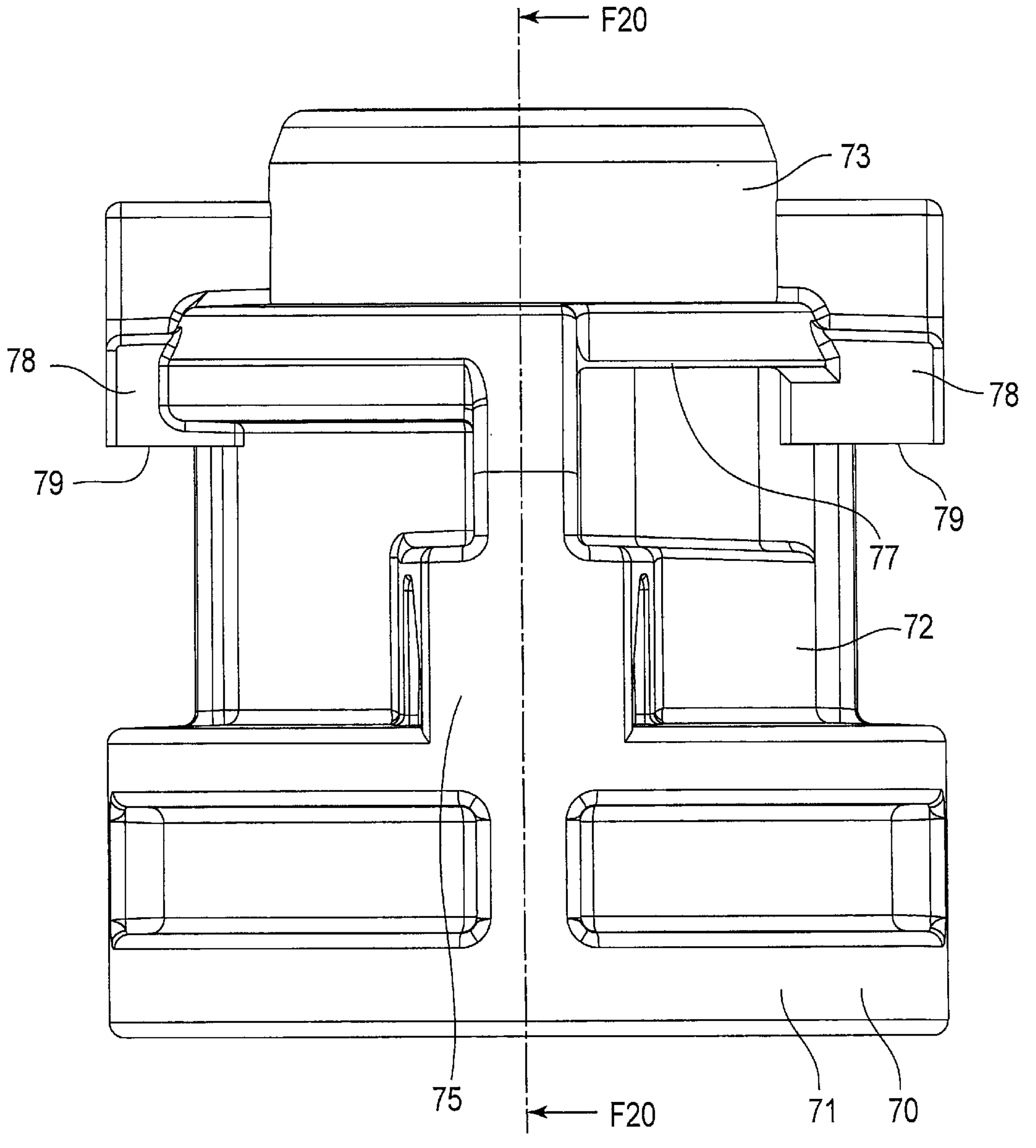
FIG. 18 is a side view showing the arrangement of the container cap.

FIG. 13 is a perspective view showing the arrangement of a needle member 60 used in the container connector 20. FIG. 14 is a plan view showing the arrangement of the needle member 60. FIG. 15 is a side view showing the arrangement of the needle member 60. FIG. 16 is a perspective view showing the arrangement of a container fixing section 30 used in the container connector. FIG. 17 is a side view showing the arrangement of the container fixing section 30. FIG. 18 is a side view showing the arrangement of the container fixing section 30, and is a side view showing a state in which the container fixing section 30 is rotated about its axis by 90° with respect to the container fixing section 30 shown in FIG. 17.

Figure 19:
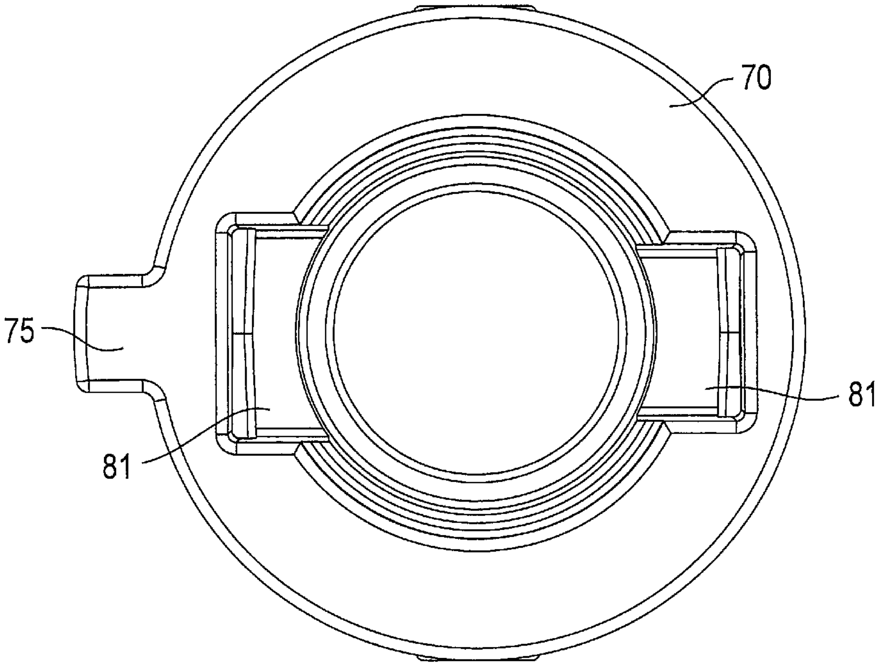
FIG. 19 is a bottom view showing the arrangement of the container cap.
Figure 20:
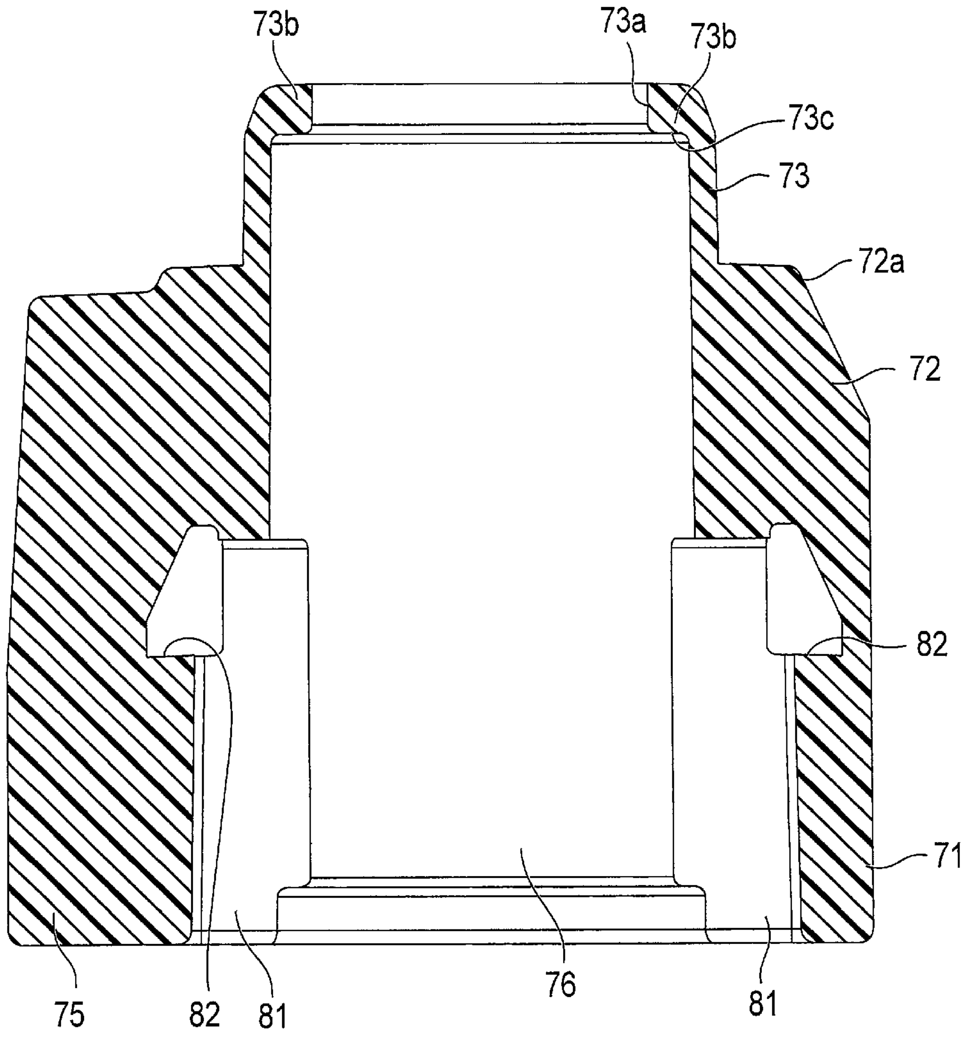
FIG. 20 is a sectional view showing the arrangement of the container cap.
Figure 21:
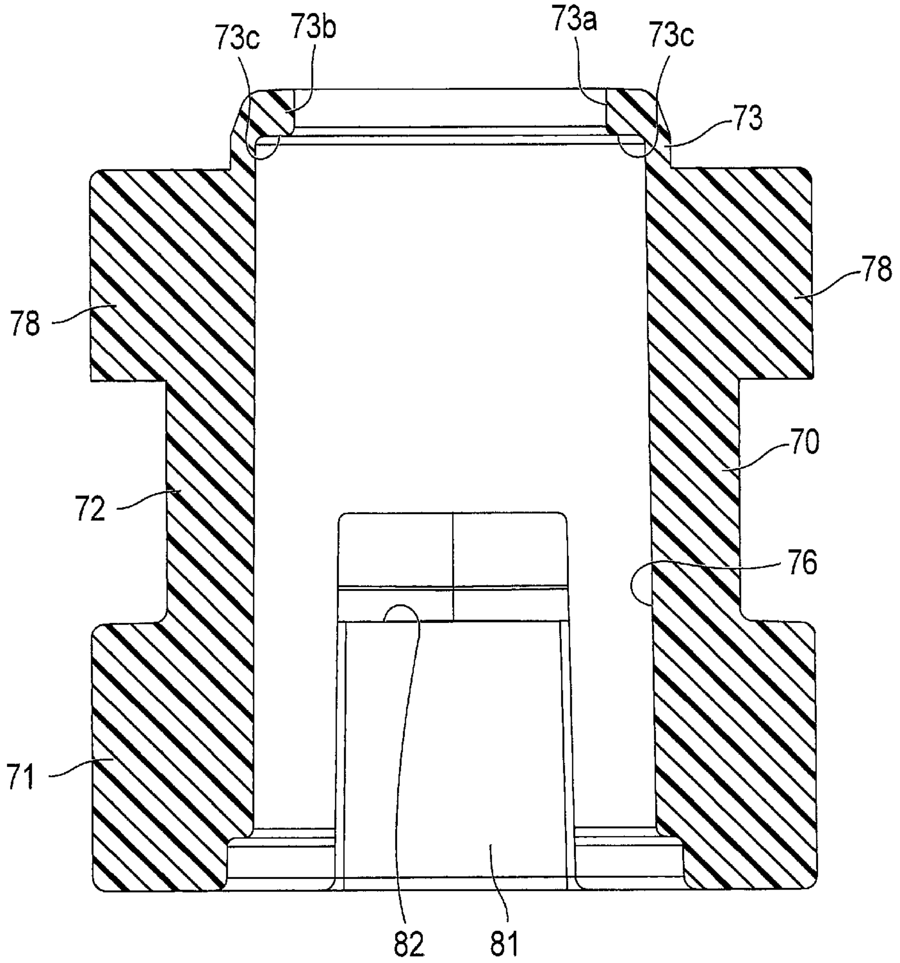
FIG. 21 is a sectional view showing the arrangement of the container cap.
Figure 22:
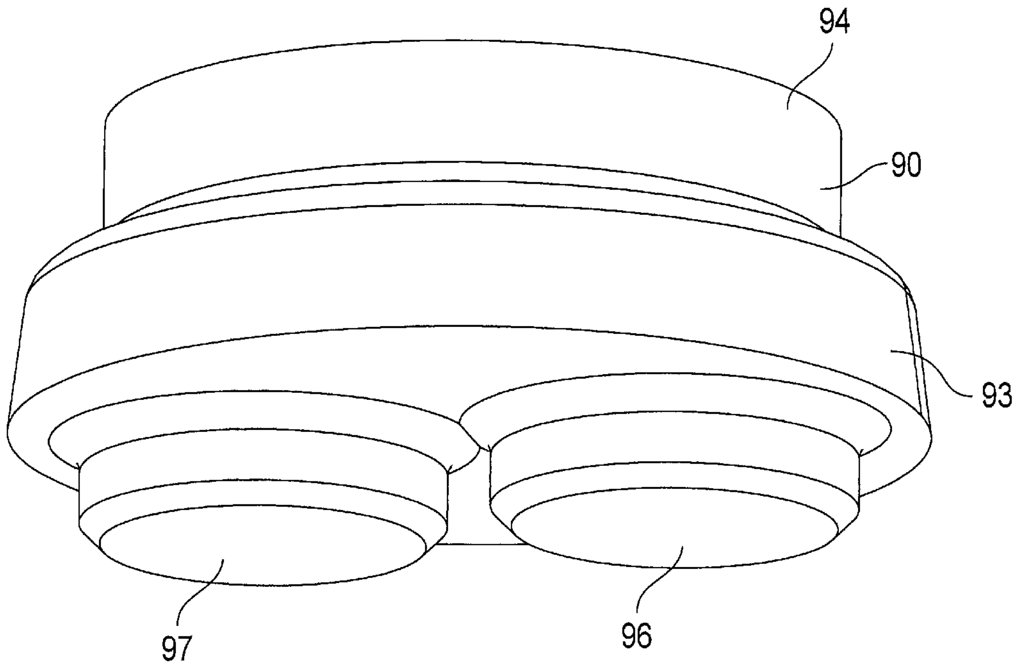
FIG. 22 is a perspective view showing the arrangement of a container seal used in the container connector.
Figure 23:
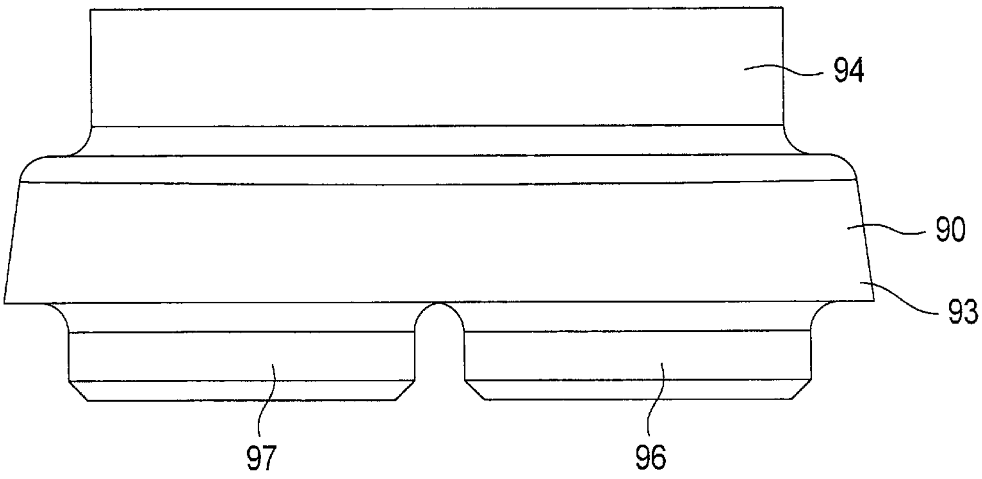
FIG. 23 is a side view showing the arrangement of the container seal.

FIG. 19 is a bottom view showing the arrangement of the container fixing section 30. FIG. 20 is a sectional view of a container cap taken along a line F20-F20 shown in FIG. 18. FIG. 21 is a sectional view of the container fixing section 30 taken along a line F21-F21 shown in FIG. 17. FIG. 22 is a perspective view showing the arrangement of a container seal 90 used in the container connector 20. FIG. 23 is a side view showing the arrangement of the container seal 90.

Figure 24:
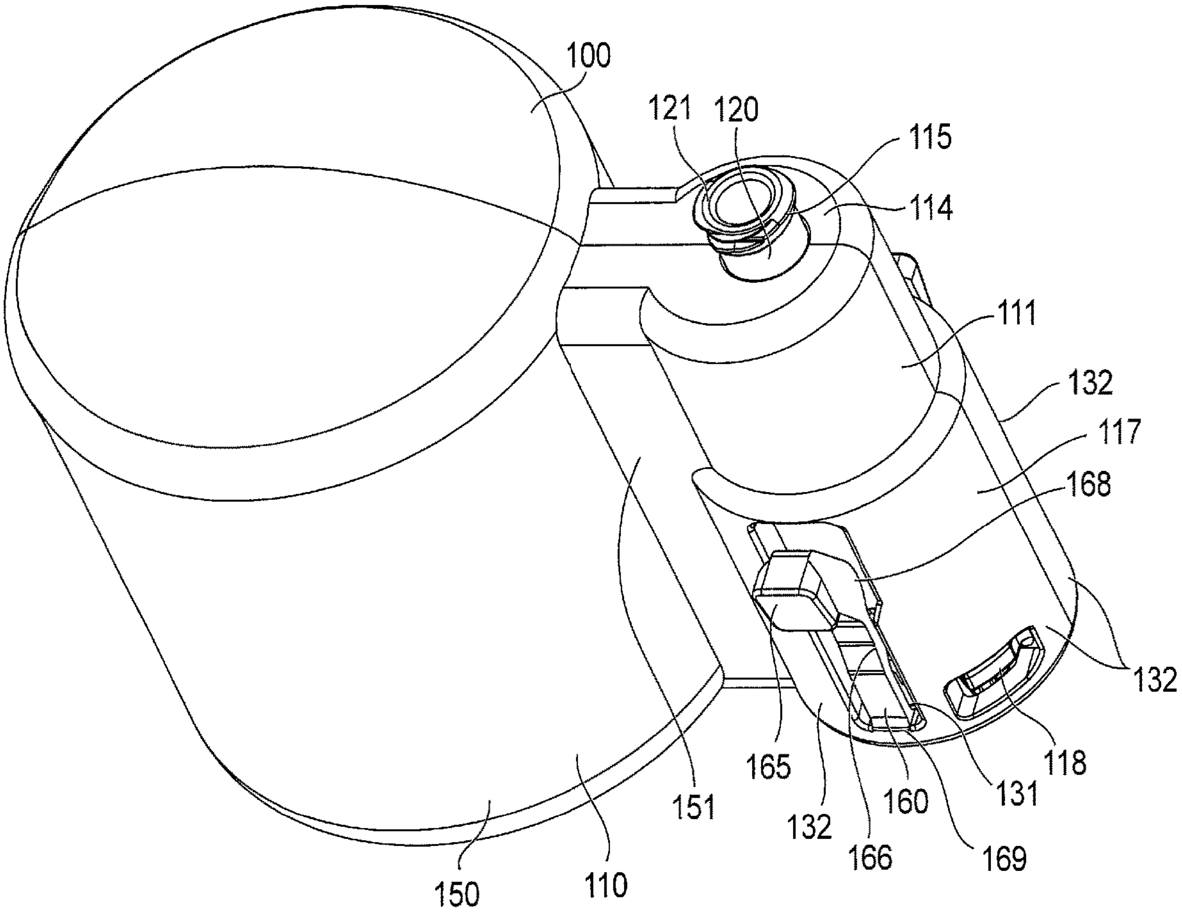
FIG. 24 is a perspective view showing the arrangement of an equipment connector used in the connection equipment.
Figure 25:
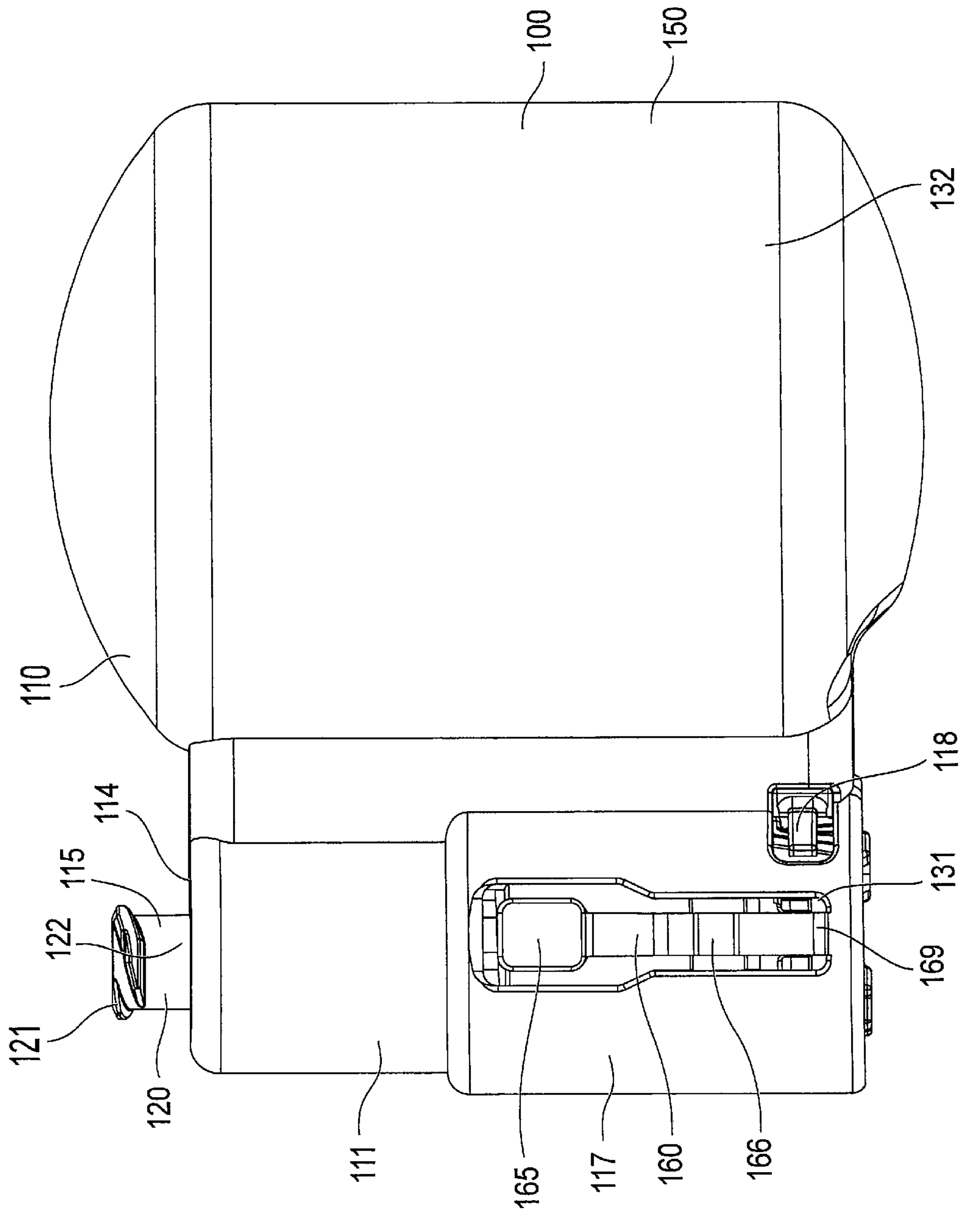
FIG. 25 is a side view showing the arrangement of the equipment connector.
Figure 26:
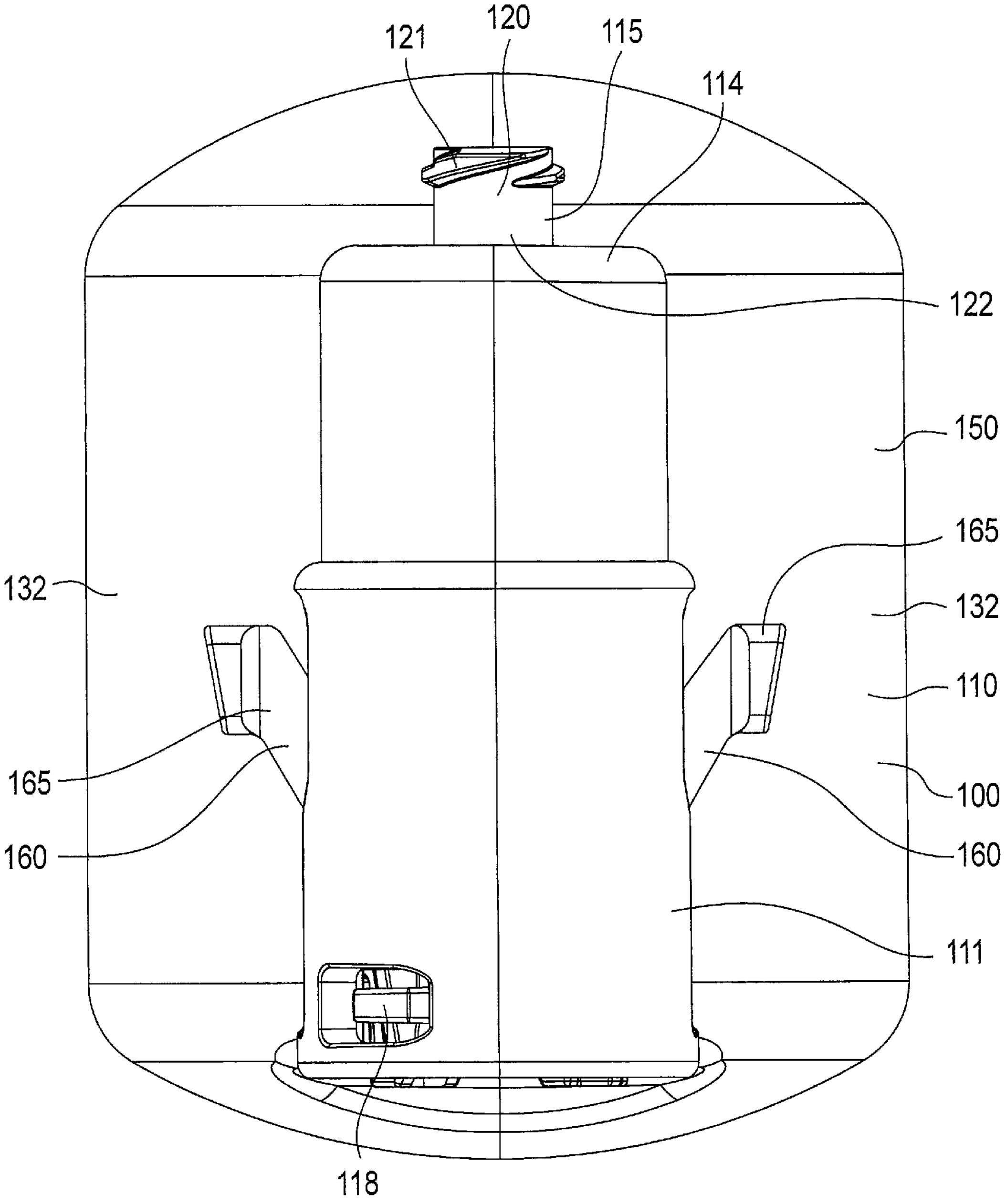
FIG. 26 is a side view showing the arrangement of the equipment connector.
Figure 27:
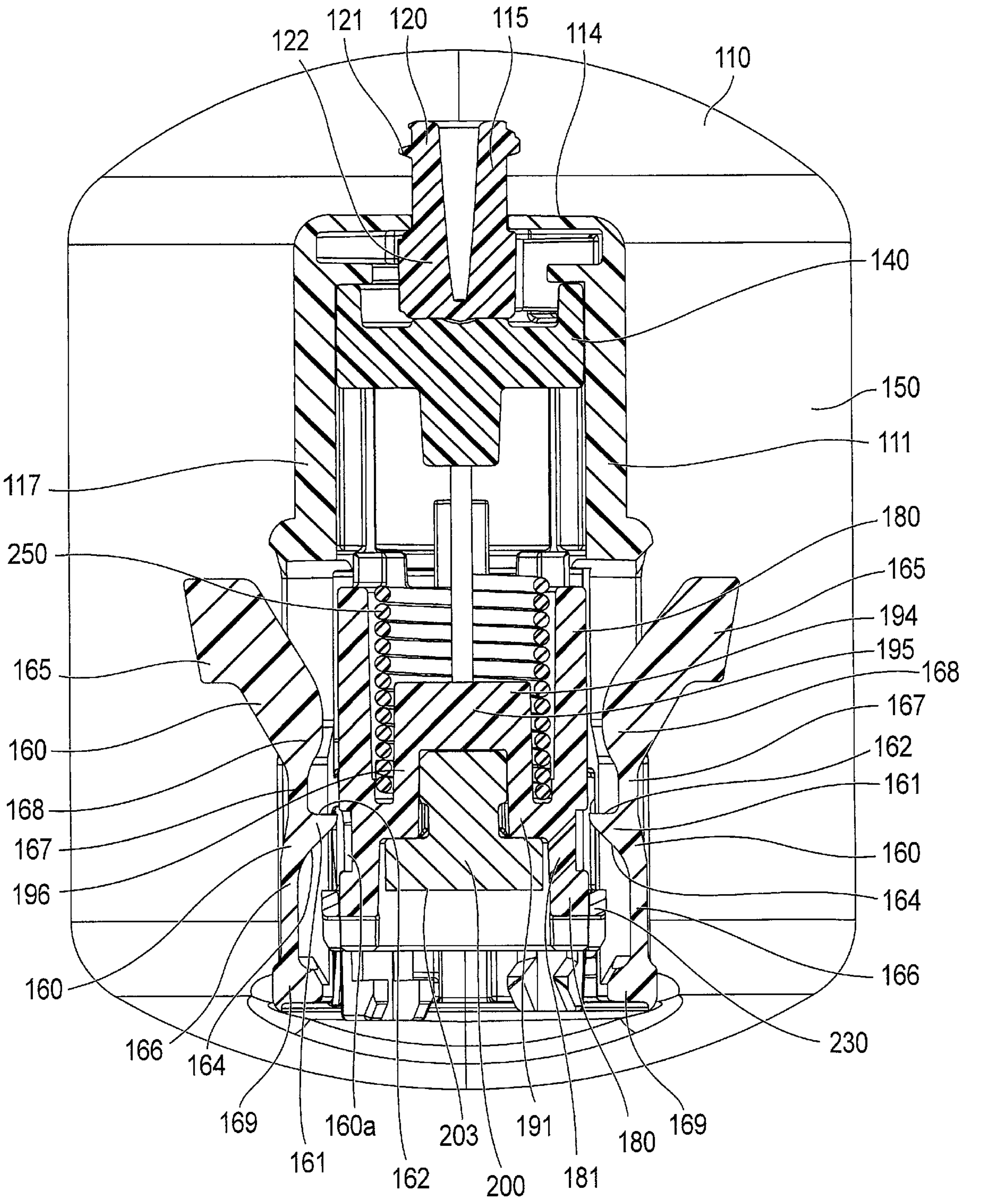
FIG. 27 is a sectional view showing the arrangement of the equipment connector.
Figure 28:
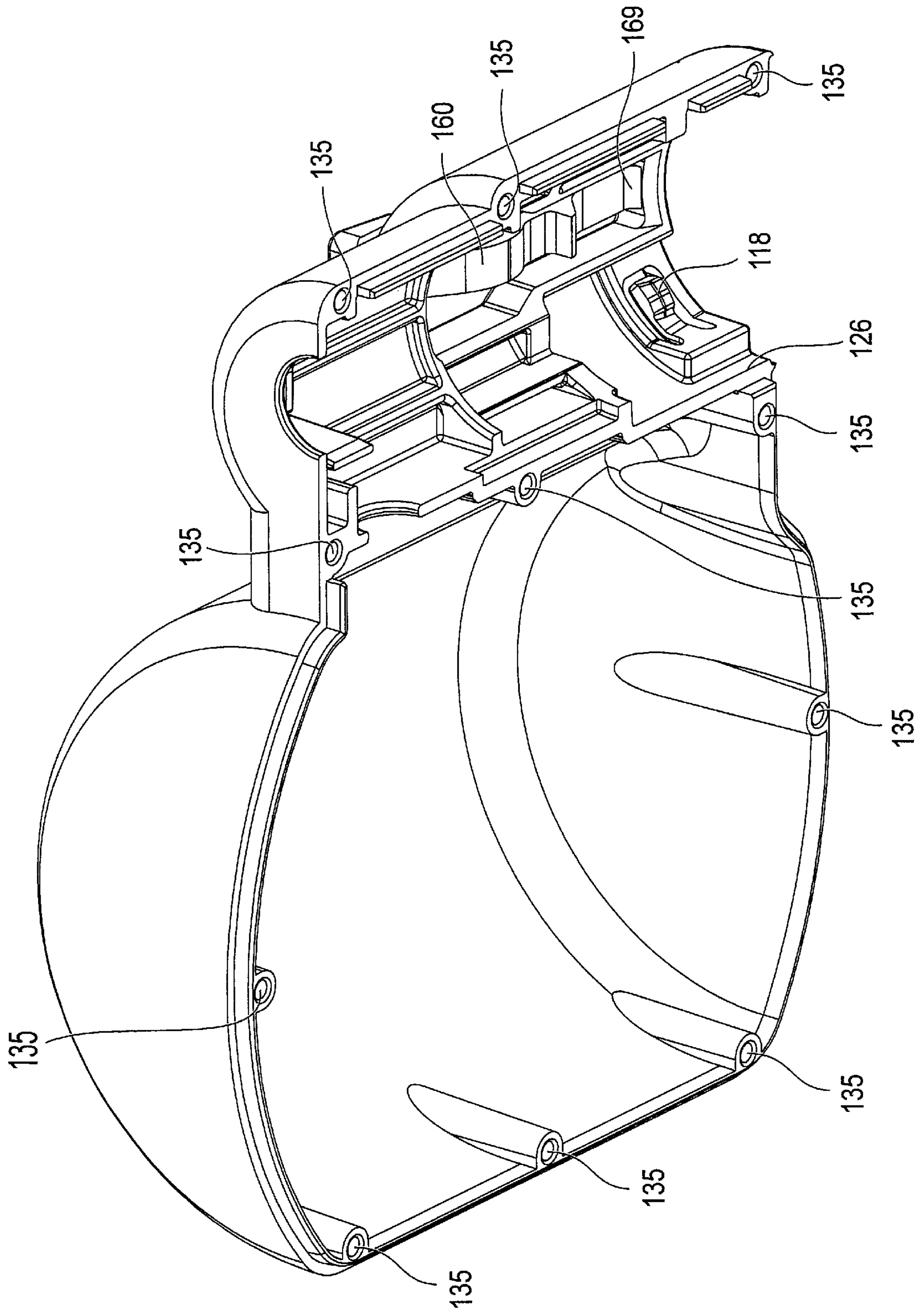
FIG. 28 is a perspective view showing the arrangement of one outer shell constituting member used in the equipment connector.
Figure 29:
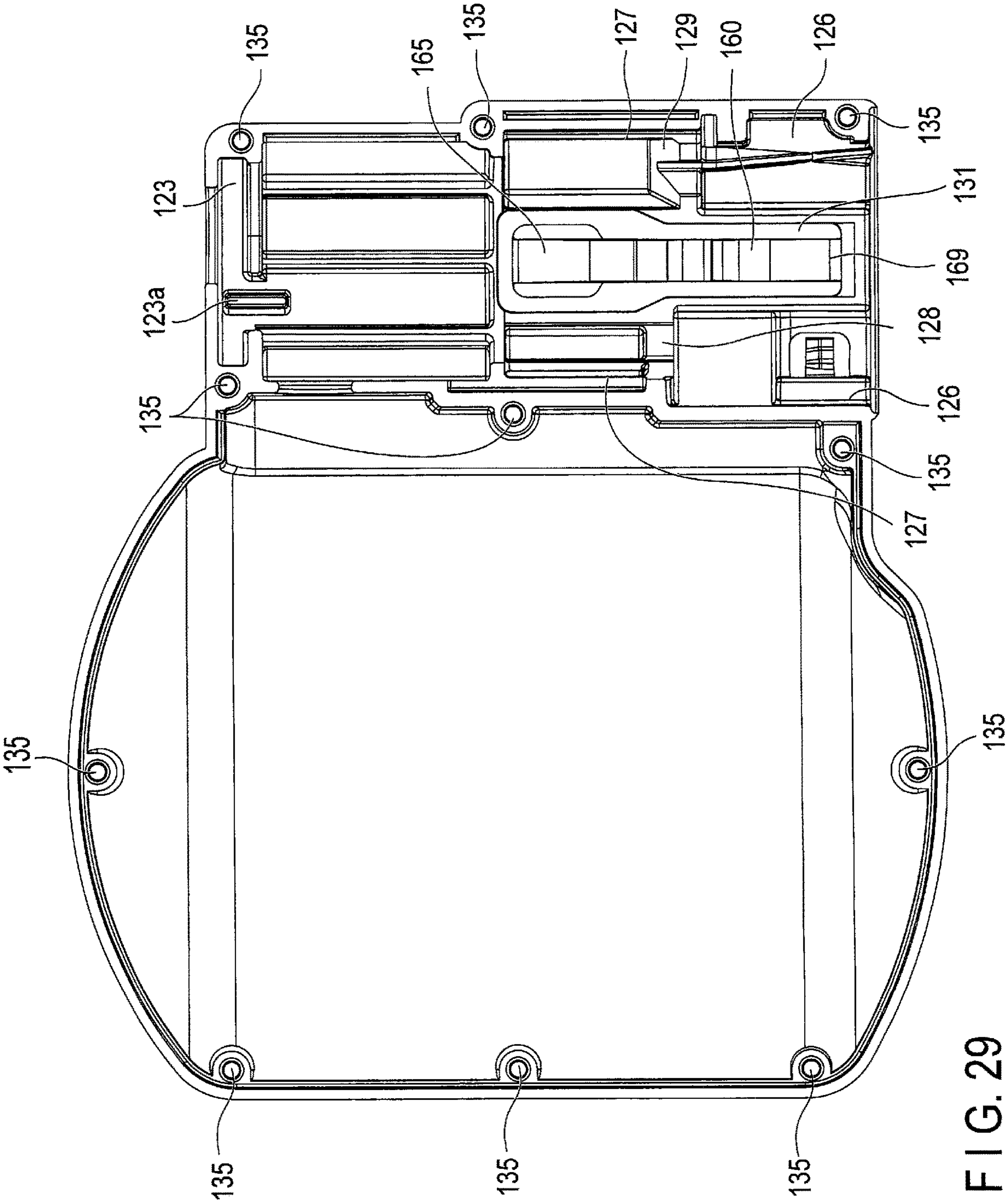
FIG. 29 is a side view showing the arrangement of the outer shell constituting member.

FIG. 24 is a perspective view showing the arrangement of an equipment connector 100 used in the connection equipment 10. FIG. 25 is a side view showing the arrangement of the equipment connector 100. FIG. 26 is a side view showing the arrangement of the equipment connector 100. FIG. 27 is a sectional view showing the arrangement of the equipment connector 100. FIG. 28 is a perspective view showing the arrangement of one outer shell constituting member 132 used in the equipment connector 100. FIG. 29 is a side view showing the arrangement of the outer shell constituting member 132.

Figure 30:
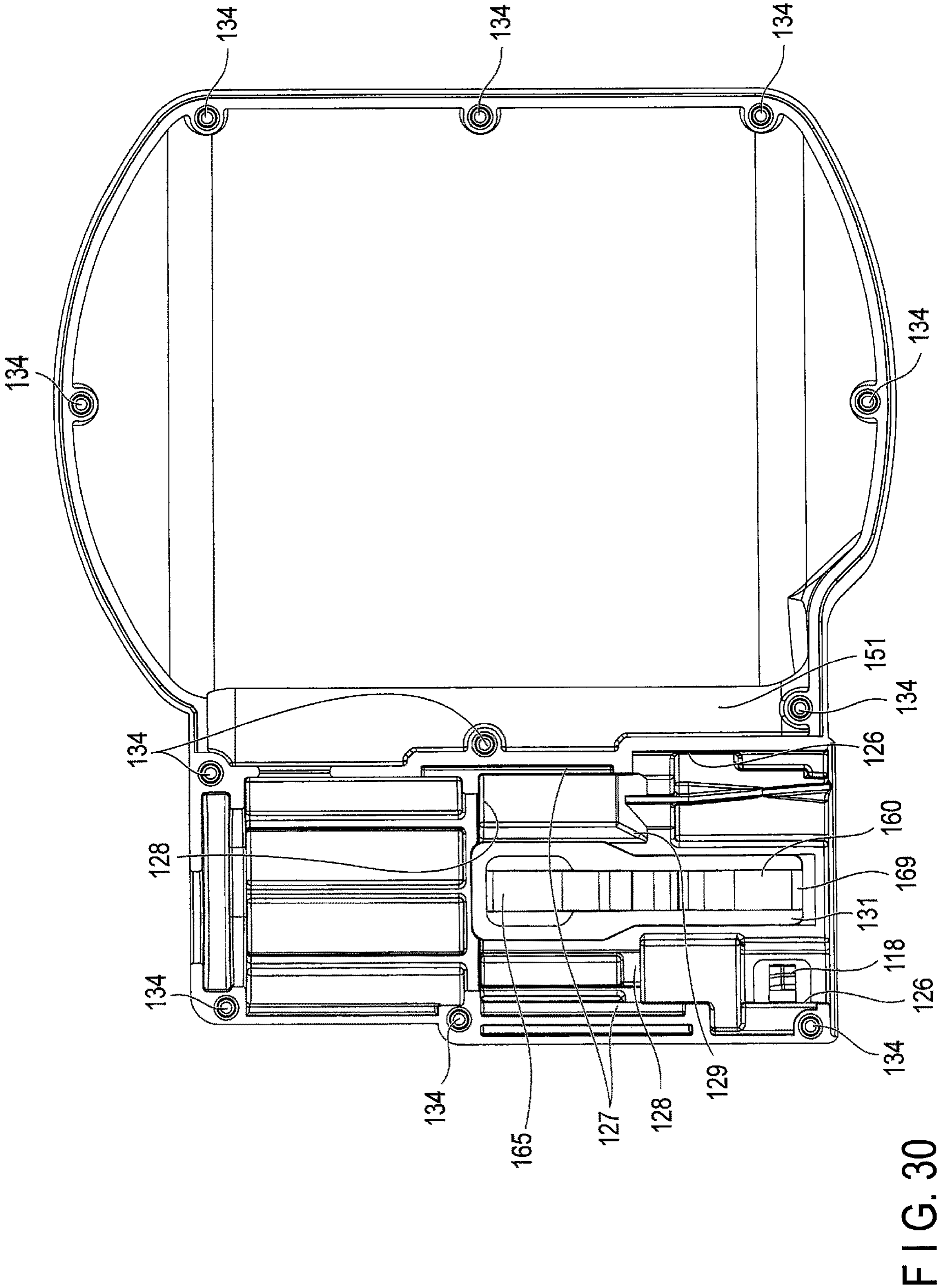
FIG. 30 is a side view showing the arrangement of another outer shell constituting member used in the equipment connector.
Figure 31:
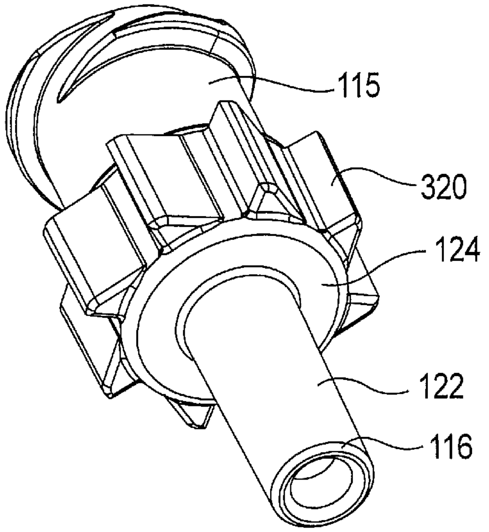
FIG. 31 is a perspective view showing the arrangement of a needle holder used in the equipment connector.
Figure 32:
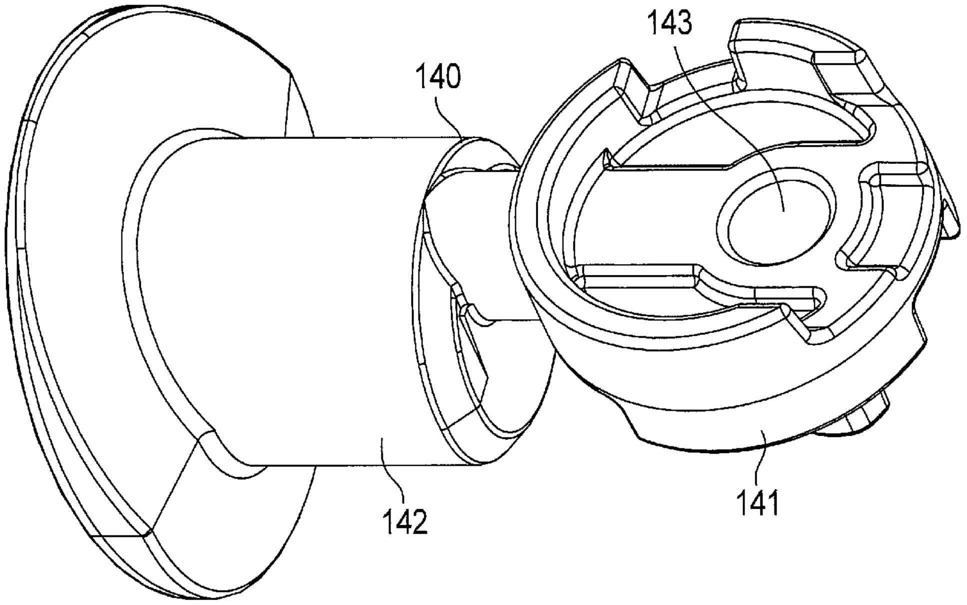
FIG. 32 is a perspective view showing the arrangement of an inner sleeve used in the connection equipment.
Figure 33:
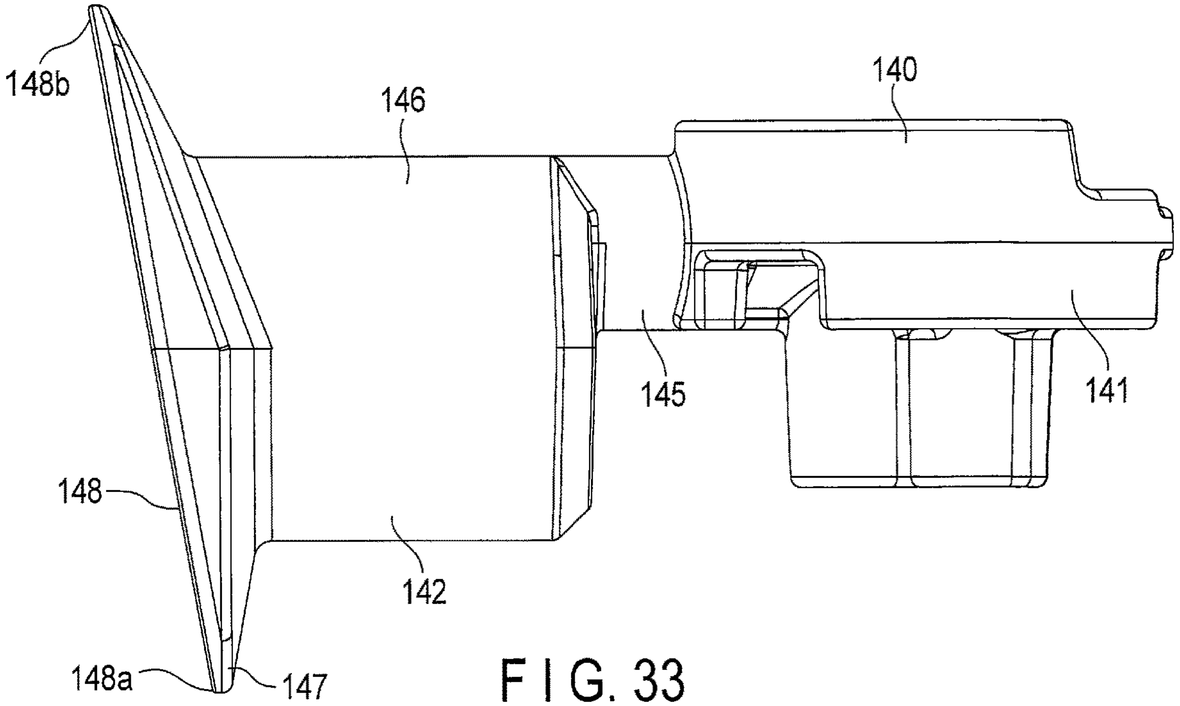
FIG. 33 is a side view showing the arrangement of the inner sleeve.
Figure 34:
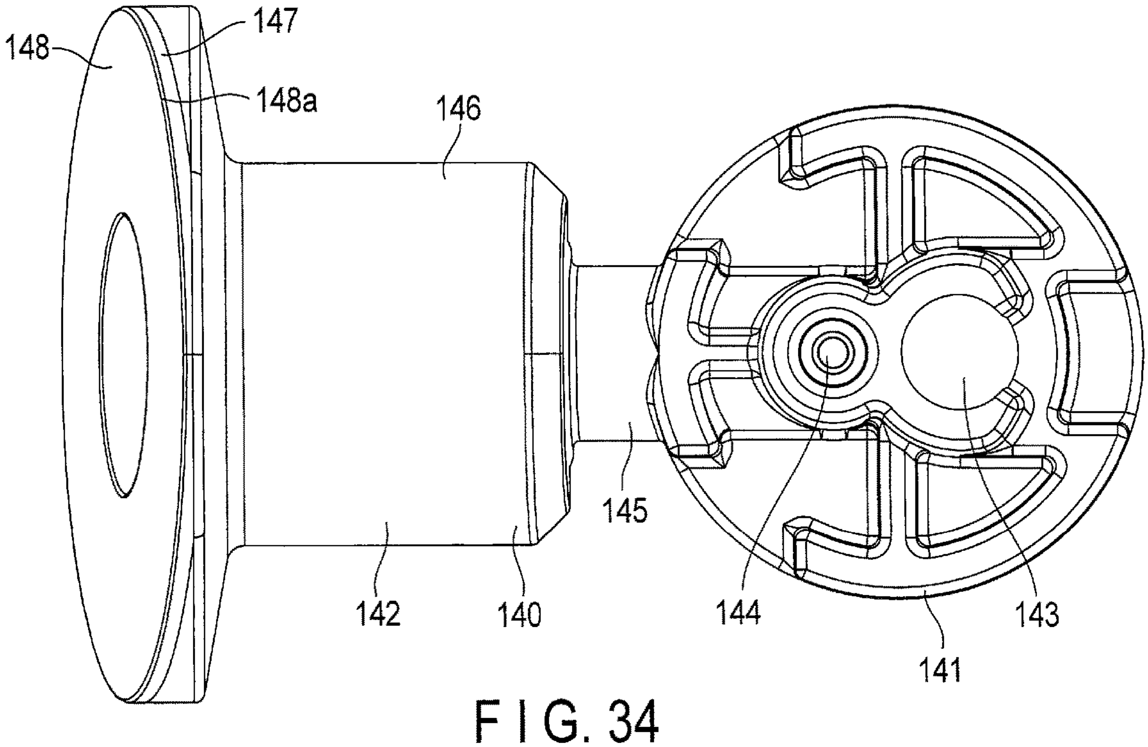
FIG. 34 is a bottom view showing the arrangement of the inner sleeve.

FIG. 30 is a side view showing the arrangement of another outer shell constituting member 132 used in the equipment connector 100. FIG. 31 is a perspective view showing the arrangement of a needle holder 122 used in the equipment connector 100. FIG. 32 is a perspective view showing the arrangement of an inner sleeve 140 used in the equipment connector 100. FIG. 33 is a side view showing the arrangement of the inner sleeve 140. FIG. 34 is a bottom view showing the arrangement of the inner sleeve 140.

Figure 35:
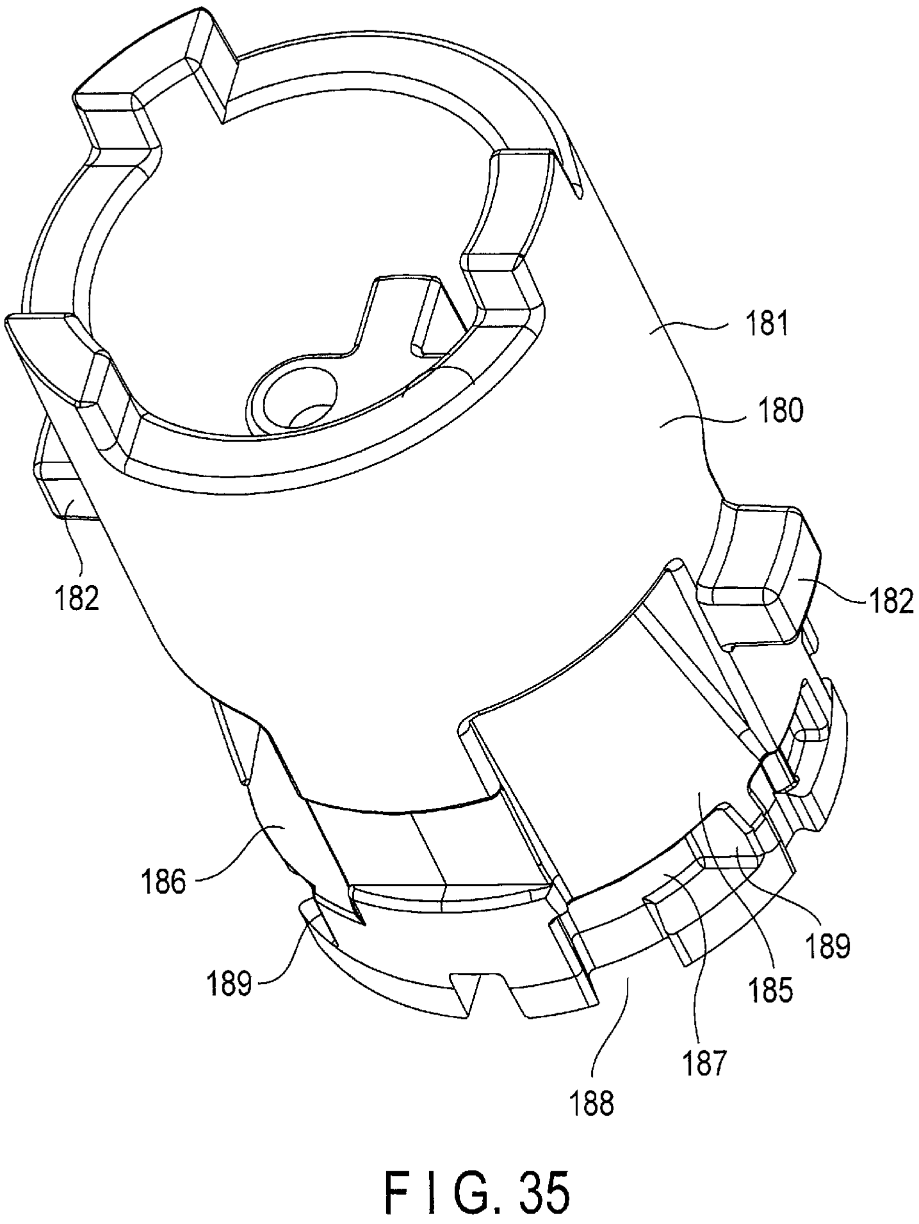
FIG. 35 is a perspective view showing the arrangement of a head sleeve used in the equipment connector.
Figure 36:
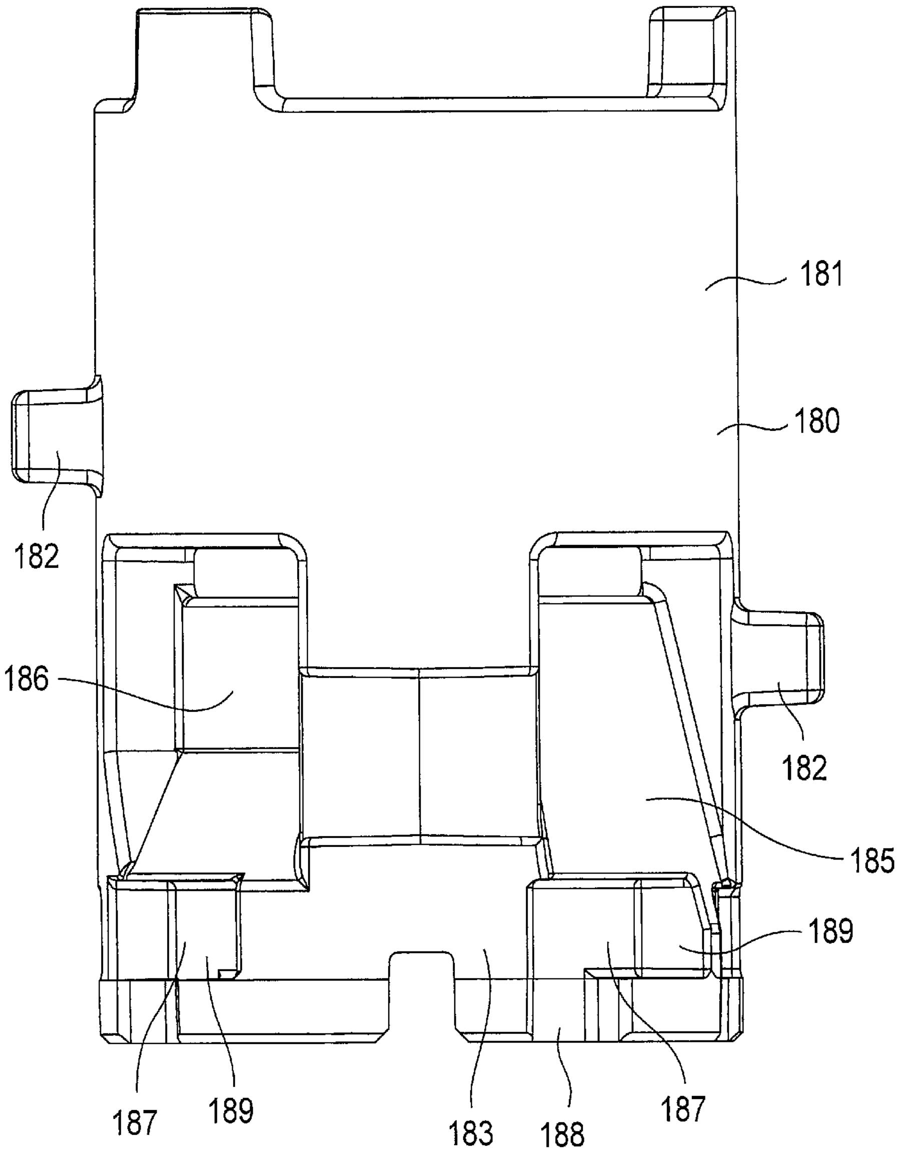
FIG. 36 is a side view showing the arrangement of the head sleeve.
Figure 37:
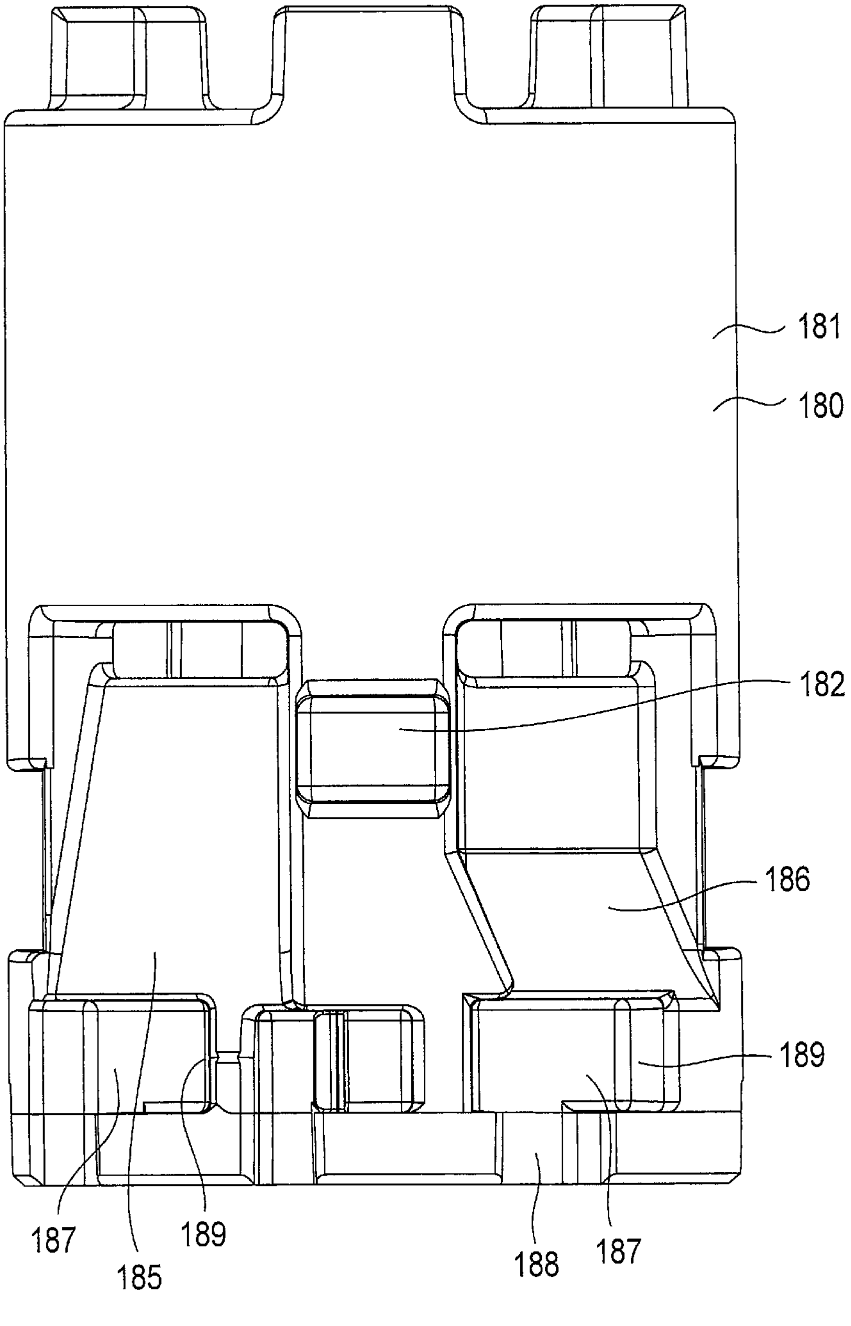
FIG. 37 is a side view showing the arrangement of the head sleeve.
Figure 38:
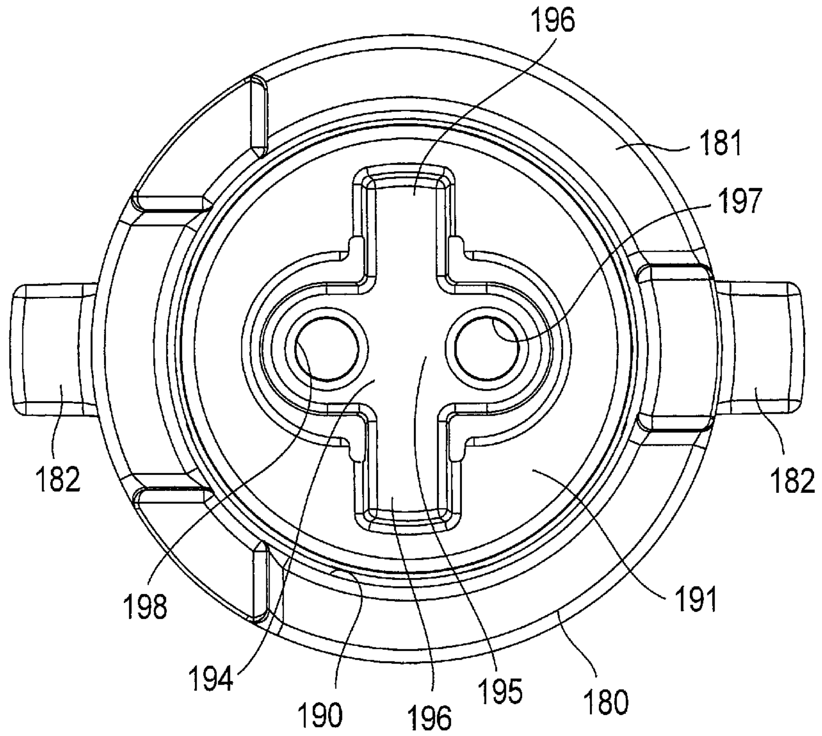
FIG. 38 is a plan view showing the arrangement of the head sleeve.
Figure 39:
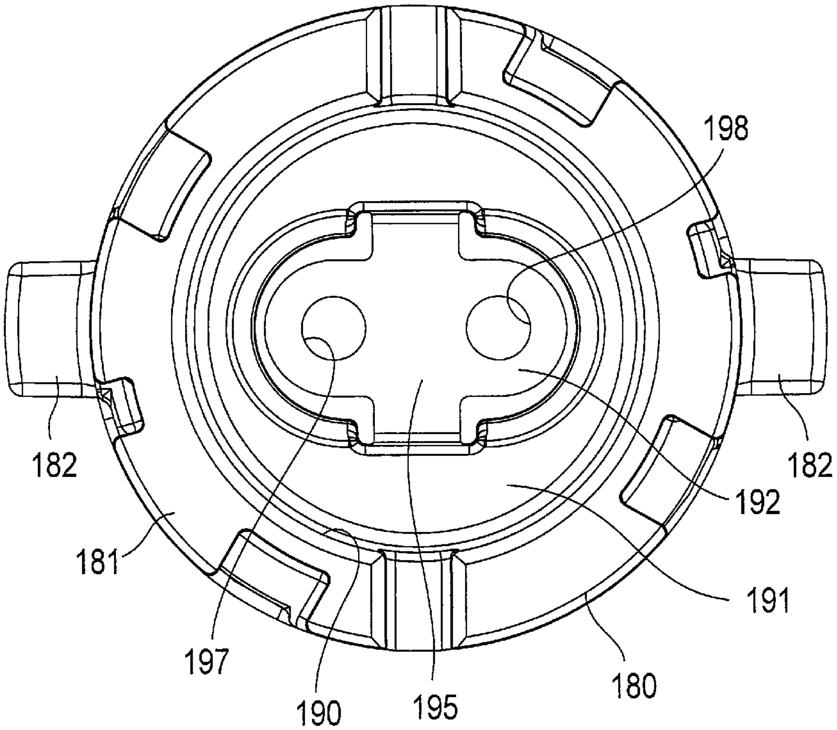
FIG. 39 is a bottom view showing the arrangement of the head sleeve.
Figure 40:
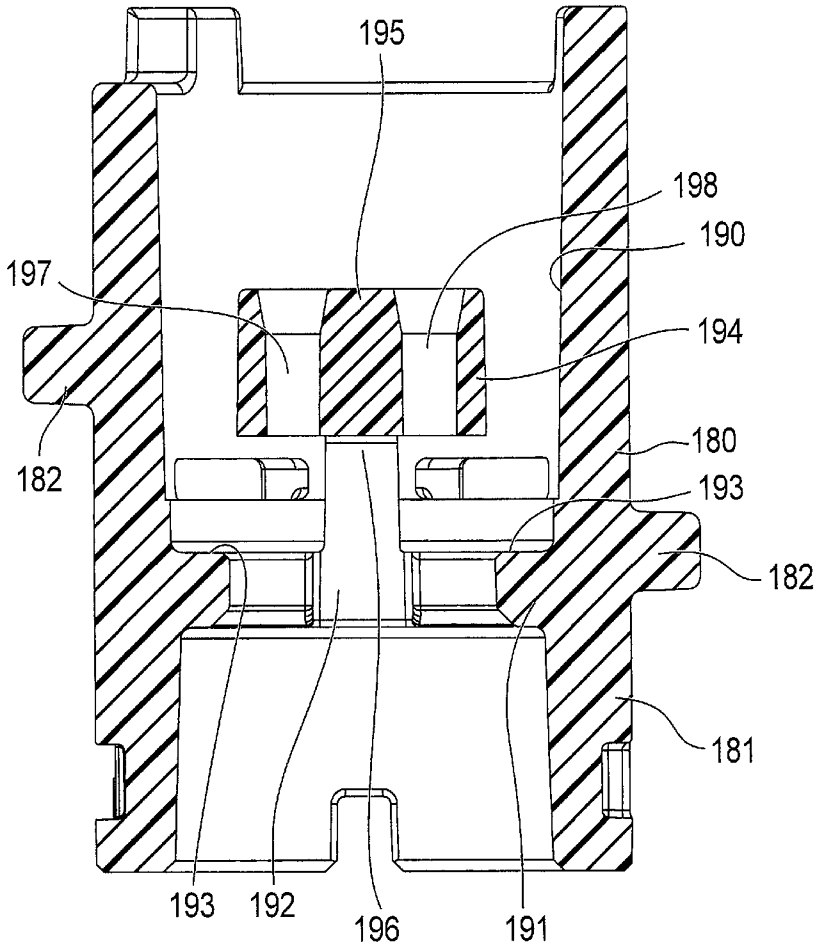
FIG. 40 is a sectional view showing the arrangement of the head sleeve.
Figure 41:
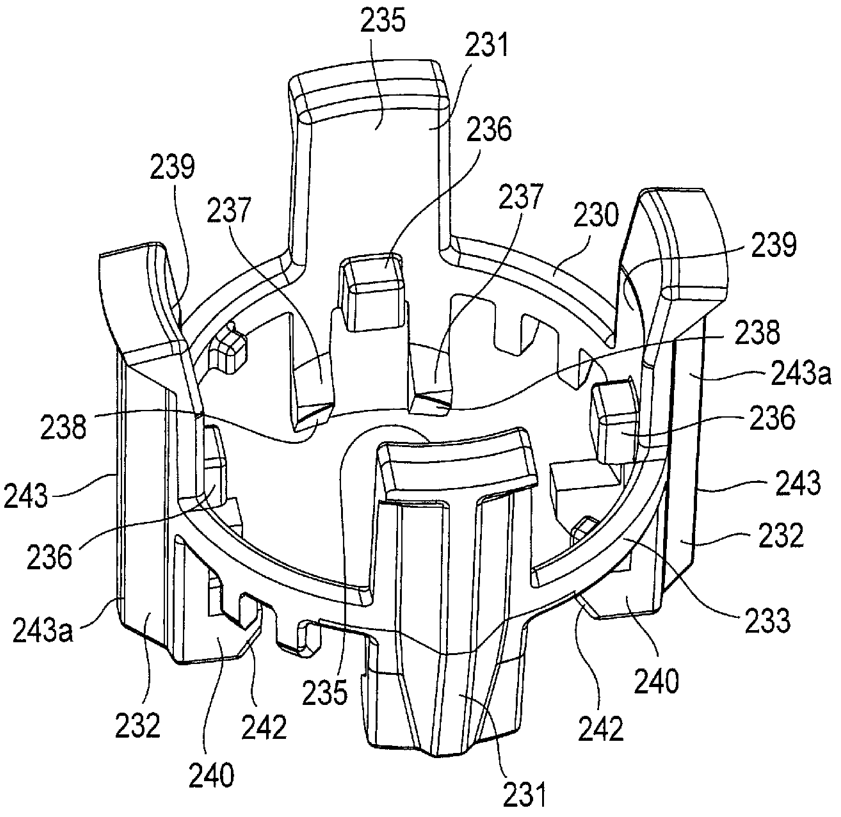
FIG. 41 is a perspective view showing the arrangement of a stopper sleeve used in the connection equipment.
Figure 42:
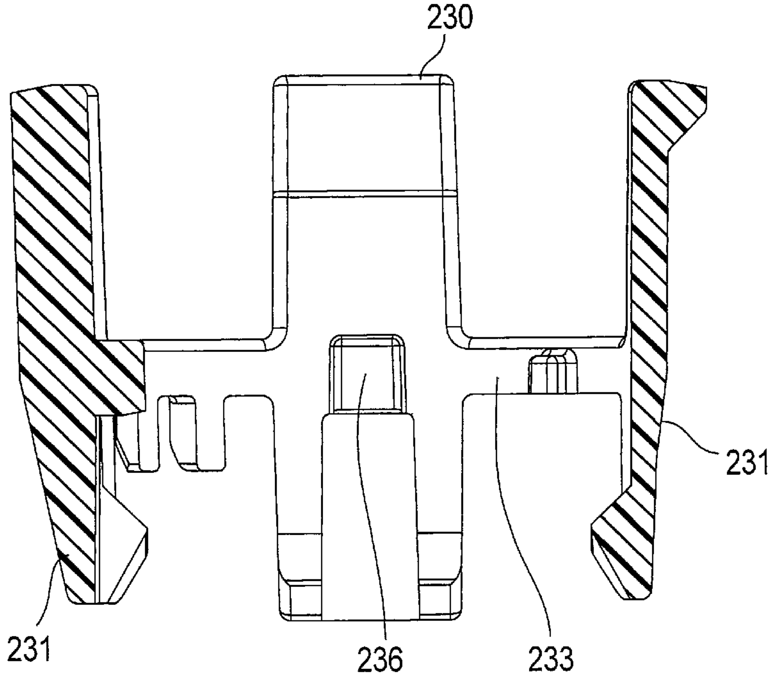
FIG. 42 is a sectional view showing the arrangement of the stopper sleeve.
Figure 43:
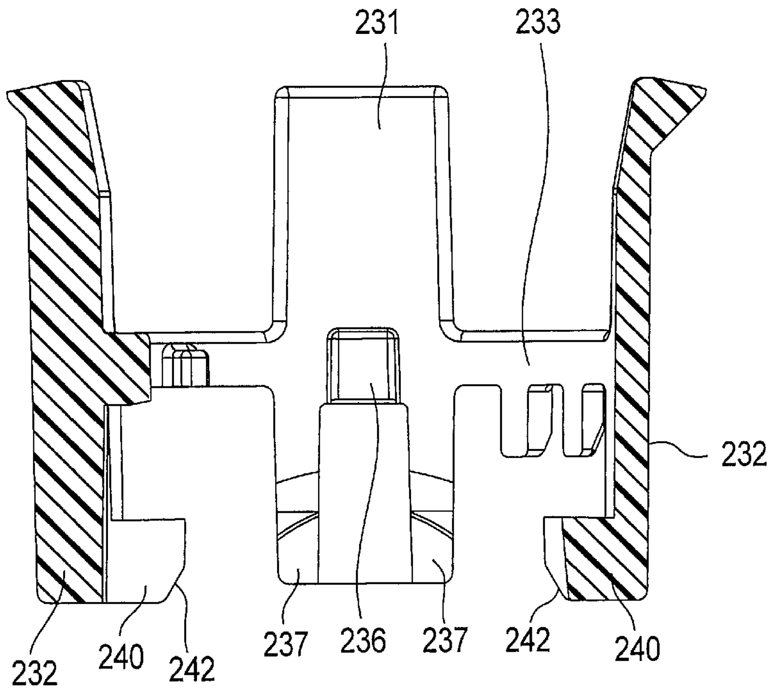
FIG. 43 is a sectional view showing the arrangement of the stopper sleeve.

FIG. 35 is a perspective view showing the arrangement of a head sleeve 180 used in the equipment connector 100. FIG. 36 is a side view showing the arrangement of the head sleeve 180. FIG. 37 is a side view showing the arrangement of the head sleeve 180. FIG. 38 is a plan view showing the arrangement of the head sleeve 180. FIG. 39 is a bottom view showing the arrangement of the head sleeve 180. FIG. 40 is a sectional view showing the arrangement of the head sleeve 180. FIG. 41 is a perspective view showing the arrangement of a stopper sleeve 230 used in the connection equipment 10. FIG. 42 is a sectional view showing the arrangement of the stopper sleeve 230. FIG. 42 shows a state in which two first arms 231 of the stopper sleeve 230 are cut at different cutting positions, respectively. FIG. 43 is a sectional view showing the arrangement of the stopper sleeve, and is a sectional view showing a state in which the stopper sleeve 230 is rotated about its axis by 90° with respect to the stopper sleeve 230 shown in FIG. 42. FIG. 43 shows a state in which the two first arms 231 of the stopper sleeve 230 are cut at different cutting positions, respectively.

Figure 44:
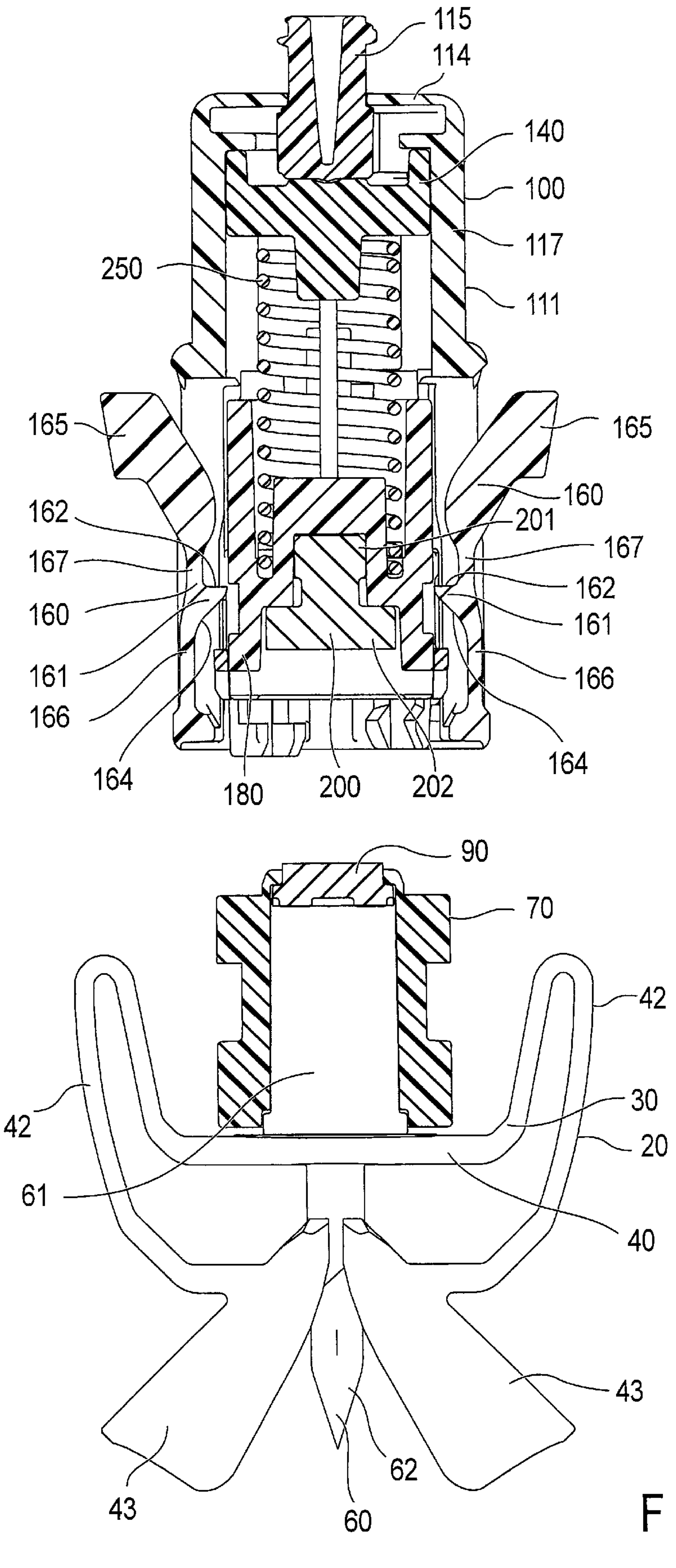
FIG. 44 is an explanatory view for explaining engagement between an engagement member used in the equipment connector and an engaged section used in the container connector.
Figure 45:
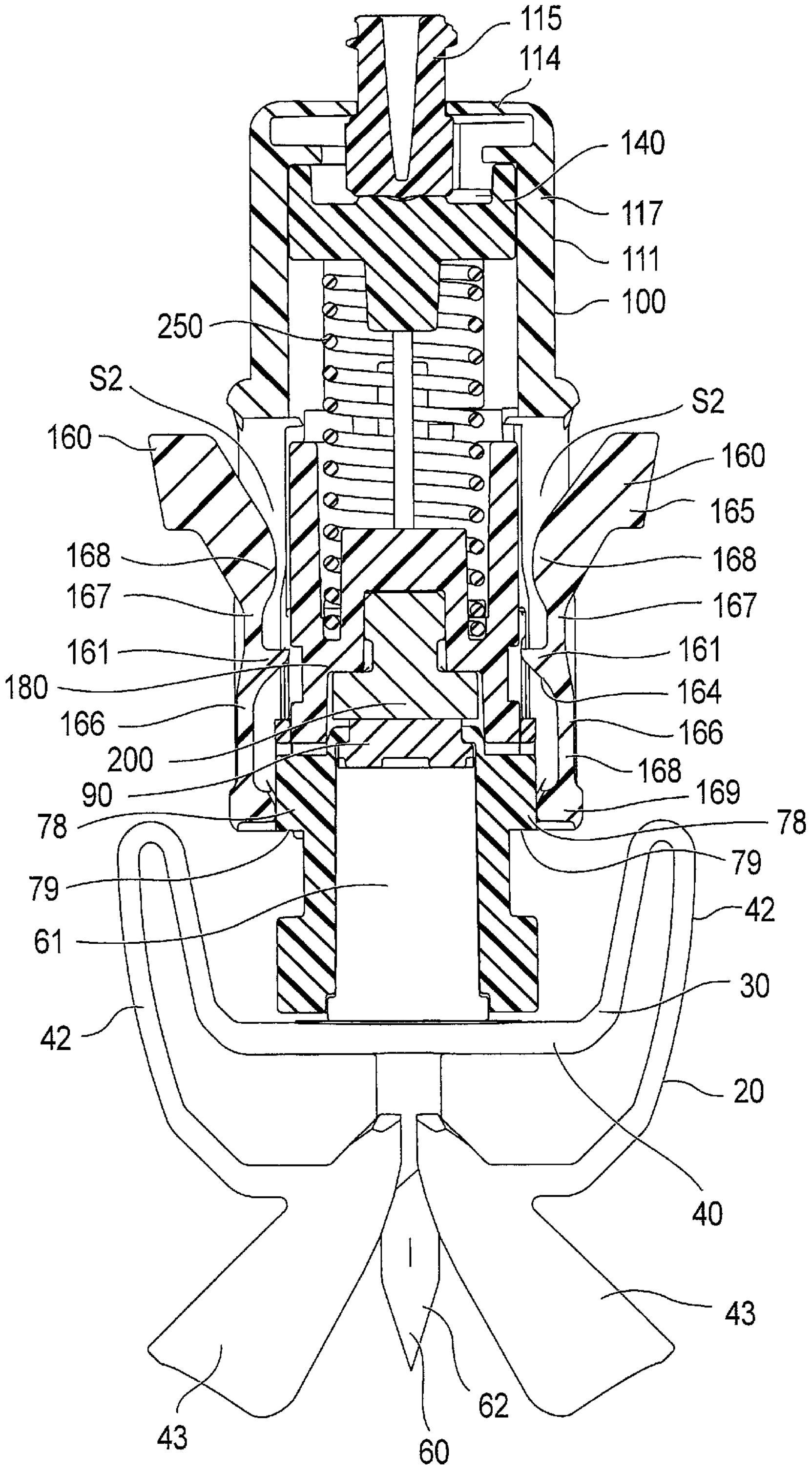
FIG. 45 is an explanatory view for explaining the engagement between the engagement member and the engaged section.
Figure 46:
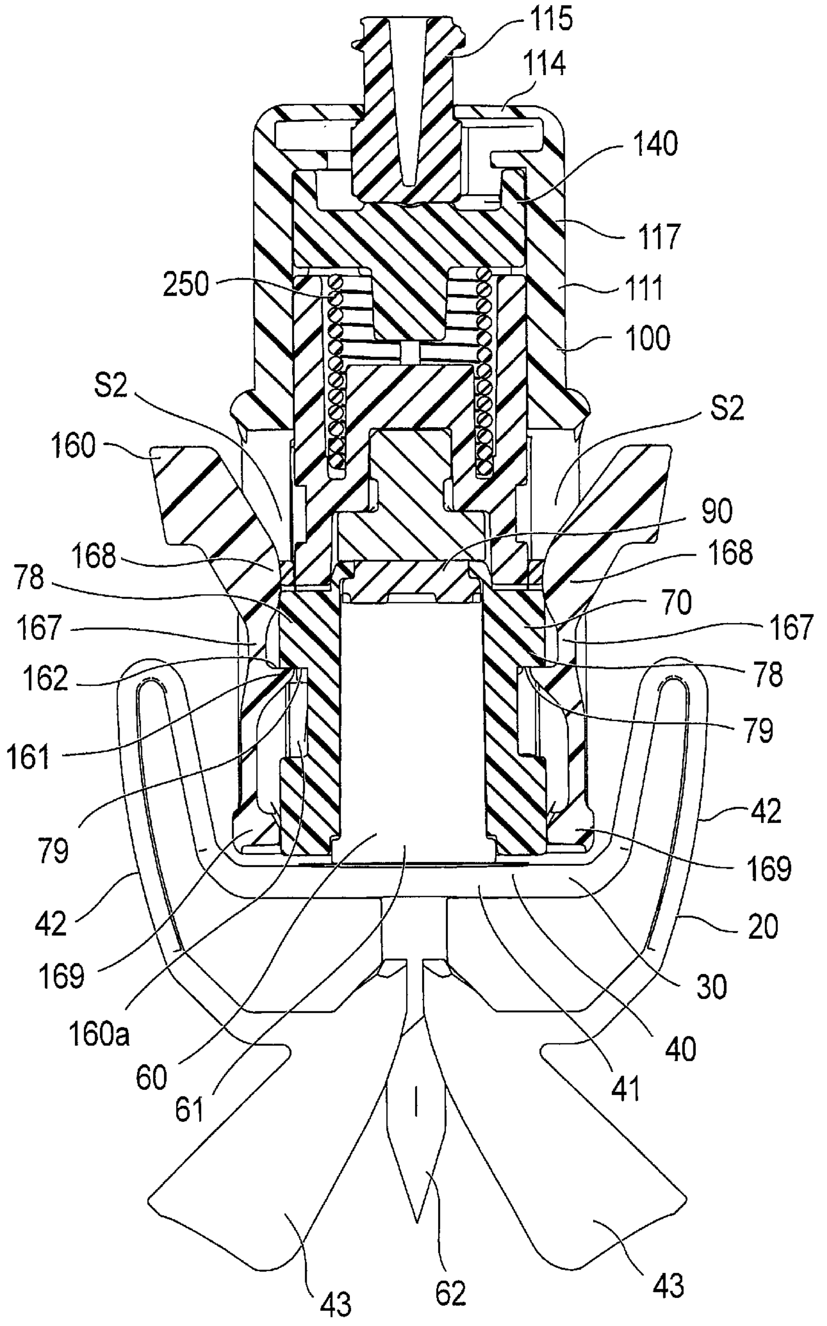
FIG. 46 is an explanatory view for explaining the engagement between the engagement member and the engaged section.
Figure 47:
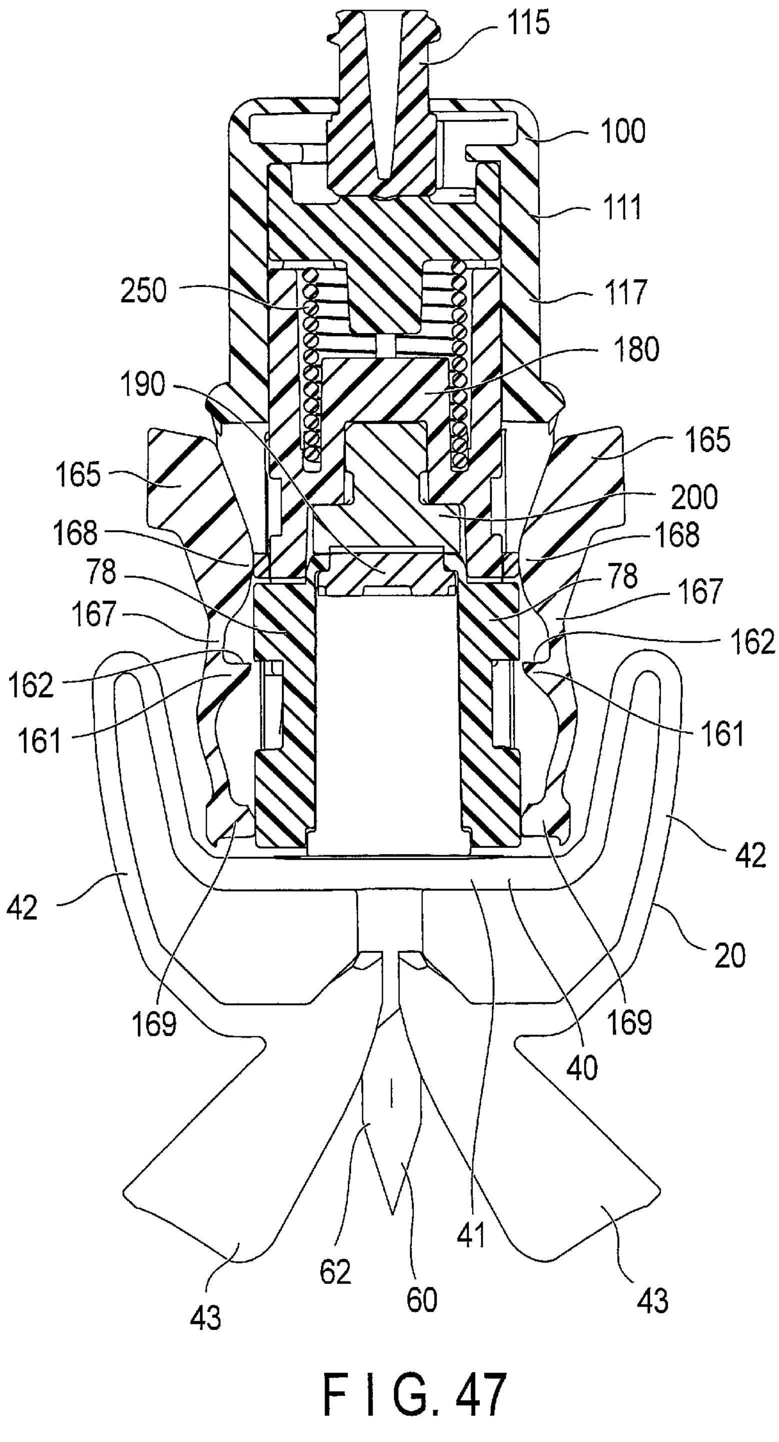
FIG. 47 is an explanatory view for explaining releasing of the engagement between the engagement member and the engaged section.

FIGS. 44, 45, and 46 are explanatory views for explaining engagement between an engagement member 160 used in the equipment connector 100 and an engaged section 78 used in the container connector 20. FIG. 47 is an explanatory view for explaining releasing of the engagement between the engagement member 160 and the engaged section 78. FIGS. 48, 49, 50, 51, 52, 53, and 54 are explanatory views for explaining connection between the equipment connector 100 and the container connector 20.

As shown in FIGS. 1, 2, and 11, the connection equipment 10 includes the container connector 20 which is formed to be fixable to the container 1, and the equipment connector 100 which is formed to be fixable to a barrel 8 of a syringe 7 as an example of an equipment and to which the container connector 20 is detachably connected. The connection equipment 10 includes a liquid flow path L1 communicating with the container 1 and the syringe 7, and makes it possible to collect a chemical solution in the container 1 by the syringe 7 through the liquid flow path L1. The connection equipment 10 includes a gas flow path L2 communicating with the container 1 and the interior of an air bag 152 (to be described later), and makes it possible to hold the pressure in the container 1 constant by the gas flow path L2. A vertical direction is set for the connection equipment 10 based on a state in which the container 1 is disposed on the lower side and the syringe 7 is disposed on the upper side.

As shown in FIG. 11, the container 1 is formed in a bottomed tubular shape that can store a chemical solution. The container 1 includes, for example, a barrel section 2 formed in a cylindrical shape, a bottom wall 3 formed at the bottom end of the barrel section 2 to close the barrel section 2, a neck 4 formed at the upper end of the barrel section 2 and having a cylindrical shape of a diameter smaller than that of the barrel section 2, a flange 5 formed at the upper edge of the neck 4, and a plug 6 fixed in the opening of the neck 4 to seal the opening of the neck 4.

The plug 6 is made of a resin such as rubber or elastomer and has flexibility. The plug 6 is formed to be able to liquid-tightly and air-tightly seal, by resilience, a hole formed when a needle section 62 of the needle member 60 (to be described later) of the container connector 20 is inserted, after a liquid needle 170 and a gas needle 175 are moved.

As shown in FIGS. 4, 5, 7, and 8, the container connector 20 includes the container fixing section 30 formed to be fixable to the container 1, a seal cap 70 fixed to the container fixing section 30, and the container seal 90 provided in the seal cap 70.

As shown in FIG. 2, the container fixing section 30 includes a liquid flow path constituting portion L3 constituting a part of the liquid flow path L1 and a gas flow path constituting portion L4 constituting a part of the gas flow path L2. As shown in FIG. 2, more specifically, the container fixing section 30 includes the container fixing section main body 40 formed to be fixable to the container 1, and the needle member 60 fixed to the container fixing section main body 40 and including the liquid flow path constituting portions L3 and L4.

The container fixing section main body 40 is configured to be fixable to the container 1 in a state in which the needle member 60 is inserted into the plug 6 of the mouth of the container 1. More specifically, the container fixing section main body 40 includes a base 41 to which the needle member 60 is fixed, two arms 42 provided in the base 41, and engaging sections 43 that are provided in the two arms 42, respectively, and can engage with the neck 4 of the container 1.

As shown in FIG. 10, the base 41 is formed in a plate shape having a hole 44 at the center, in which the needle member 60 is disposed. The hole 44 includes an arc portion 45 formed in an arc shape and a rectangular portion 46 formed in a rectangular shape.

In the base 41, an engaging claw 47 that engages with the needle member 60 inserted into the hole 44 is formed. The engaging claw 47 is disposed near, for example, the hole 44 on the upper surface of the base 41. For example, a plurality of engaging claws 47 are formed. As a practical example, two engaging claws 47 are formed. The two engaging claws 47 are disposed to face each other via the hole 44.

As shown in FIG. 6, a circle X is set. The center of the circle X is set to, for example, the same position as the center of curvature of the arc portion 45 of the hole 44. The axis of the circle X is represented by C3.

Each engaging claw 47 includes a base 48 formed in a long plate shape extending upward from the base 41, and a claw section 49 formed at the upper end of the base 48. The surface of the claw section 49 on the opposite side of a surface facing the other engaging claw 47 is constituted as an inclined surface on which the lower end of that surface is located outside in the radial direction of the hole 44, as compared to the upper end of that surface.

As shown in FIG. 9, the two arms 42 are provided in the base 41. The two arms 42 are disposed at positions separated by 180° about the axis C3 of the circle X. One of the arms 42 has flexibility so as to move a corresponding one of the engaging sections 43 toward the axis C3 of the circle X set in the base 41 and away from it. The other arm 42 has flexibility so as to move the other engaging section 43 toward the axis C3 of the circle X and away from it. As shown in FIG. 6, the two arms 42 are formed in shapes symmetric with respect to a first virtual flat plane P1 passing through the axis C3 of the circle X and parallel to the axis C3.

A part of each arm 42 is located above one end of the arm 42 on the side of the base 41. More specifically, each arm 42 includes a first arm 50, a folded portion 51, and a second arm 52.

The first arm 50 is formed in a plate shape continuing to the base 41 and extending upward. The folded portion 51 is formed in a shape continuing to the first arm 50 and folded downward with respect to the first arm 50. The second arm 52 is formed continuously from the folded portion 51. The second arm 52 is formed in a shape that extends below the base 41 and has a tip portion bent toward the axis C3. The engaging section 43 is provided at the tip of the second arm 52.

The arm 42 having the above arrangement moves the engaging section 43 when the first arm 50, the folded portion 51, and the second arm 52 are bent. The arm 42 has, for example, a constant thickness. Alternatively, the folded portion 51 may be formed thinner than the first arm 50 and the second arm 52 so that the engaging section 43 readily swings about the folded portion 51.

The engaging section 43 is formed in a plate shape curved from the upper side to the lower side along the axis C3 in a direction away from the axis C3. The upper end of the engaging section 43 is constituted as an abutment section 53 abutting against the neck 4 of the container 1. The surface of the engaging section 43 on the side of the axis C3 abuts against the flange 5 of the container 1, and is constituted as a guide surface 54 that guides the neck 4 to the abutment section 53. The one engaging section 43 and the other engaging section 43 are formed in shapes symmetric with respect to the first virtual flat plane P1 passing through the axis C3 of the circle X and parallel to the axis C3.

The engaging section 43 is formed in such a shape that the abutment section 53 abuts against the neck 4 of the container 1 at two points. In other words, the pair of abutment sections 53 abut against the neck 4 at four points. The guide surface 54 of the engaging section 43 or another edge 56 (to be described later) is formed in such a shape that it contacts the flange 5 at two points in a process of guiding the neck 4 to the abutment section 53.

More specifically, the engaging section 43 is formed in a shape symmetric with respect to a second virtual flat plane P2 passing through the axis C3 of the circle X and orthogonal to the first virtual flat plane P1. The cross-sectional shape of the engaging section 43 obtained by cutting the engaging section 43 along a cross section orthogonal to the axis C3 is almost a V shape.

In other words, in the cross section of the guide surface 54 orthogonal to the axis C3 of the circle X, the second virtual flat plane P2 side of the guide surface 54 is disposed at a position away from the axis C3 with respect to the two ends of the guide surface 54 facing each other via the second virtual flat plane P2 in a direction parallel to the second virtual flat plane P2 among directions orthogonal to the axis C3.

Furthermore, the engaging section 43 is inclined with respect to the vertical direction so that the lower end of the engaging section 43 is located at a position away from the other engaging section 43, as compared to the position of the upper end of the engaging section 43.

Note that the vertical direction is set for the connection equipment 10 based on the state in which the container 1 is disposed on the lower side and the syringe 7 is disposed on the upper side, as described above. Therefore, in the container connector 20, the vertical direction is parallel to the axis C3.

As shown in FIGS. 5 and 6, the engaging section 43 is formed in a curved shape that is convex to the side away from the other engaging section 43. The length of the lower end of the engaging section 43 in the circumferential direction is set longer than the length of the upper end of the engaging section 43 in the circumferential direction. The length of the lower end of the engaging section 43 in the circumferential direction is set longer than the length from the upper end of the engaging section 43 to its lower end in the vertical direction along the engaging section 43.

The length of the engaging section 43 along the circumferential direction corresponds to the length of the engaging section 43 around the axis C3.

The guide surface 54 is inclined with respect to the axis C3, that is, the vertical direction so that the lower end of the guide surface 54 is located at a position away from the axis C3, as compared to the position of the upper end of the guide surface 54.

As shown in FIGS. 5 and 6, the guide surface 54 is constituted as a curved surface that is convex to the side away from the axis C3. More specifically, a portion connecting the center of the upper end of the guide surface 54 in the circumferential direction to the center of the lower end of the guide surface 54 in the circumferential direction is formed in a linear shape inclined with respect to the axis C3. Then, the guide surface 54 is constituted as a curved surface symmetric with respect to the linear portion. The portion connecting the center of the upper end of the guide surface 54 in the circumferential direction to the center of the lower end of the guide surface 54 in the circumferential direction corresponds to a portion located on the second virtual flat plane P2.

The length of the lower end of the guide surface 54 in the circumferential direction is set longer than the length of the upper end of the guide surface 54 in the circumferential direction. The length of the lower end of the guide surface 54 in the circumferential direction is set longer than the length from the upper end of the guide surface 54 to its lower end in the vertical direction along the guide surface 54.

The guide surface 54 having the above arrangement and the other edge 56 (to be described later) are constituted as a curved surface symmetric with respect to the center in the circumferential direction on two sides in the circumferential direction, and are thus constituted as a surface which the flange 5 of the container 1 can contact at two points when fixing the container connector 20 to the container 1. More specifically, the guide surface 54 and the other edge 56 (to be described later) abut against the flange 5 at one point on one side of the second virtual flat plane P2 and abut against the flange 5 at one point on the other side of the second virtual flat plane P2. Then, the pair of engaging sections 43 support the flange 5 at four points.

At this time, a portion constituting a portion of the engaging section 43 on one side of the second virtual flat plane P2 is represented as a first portion 43A, and a portion constituting a portion of the engaging section 43 on the other side of the second virtual flat plane P2 is represented as a second portion 43B. The first portion 43A and the second portion 43B are formed in shapes symmetric with respect to the second virtual flat plane P2.

The first portion 43A includes a first abutment section constituting portion 53A as one part of the abutment section 53, and a first guide surface constituting portion 54A as one part of the guide surface 54. The second portion 43B includes a second abutment section constituting portion 53B as the other part of the abutment section 53, and a second guide surface constituting portion 54B as the other part of the guide surface 54.

The first abutment section constituting portion 53A and the second abutment section constituting portion 53B are formed in shapes symmetric with respect to the second virtual flat plane P2. The first guide surface constituting portion 54A and the second guide surface constituting portion 54B are formed as surfaces symmetric with respect to the second virtual flat plane P2.

As shown in FIG. 6, the first abutment section constituting portion 53A is formed in a shape with an inclination gradually approaching the first virtual flat plane from one end on the side of the second virtual flat plane P2 to the other end.

The first guide surface constituting portion 54A will be described in detail.

In the cross section of the first portion 43A orthogonal to the axis C3 of the circle X, one edge 55 of the first guide surface constituting portion 54A on the side of the second virtual flat plane P2 is disposed at a position away from the axis C3 with respect to the other edge 56 of the guide surface 54 on the opposite side of the second virtual flat plane P2 in the direction parallel to the second virtual flat plane P2 among the directions orthogonal to the axis C3.

The one edge 55 of the first guide surface constituting portion 54A is formed so that, for example, its extension is a straight line inclined with respect to the axis C3. The one edge 55 is a line passing through the center of the guide surface 54 in the circumferential direction, and is a line on the second virtual flat plane P2 in this embodiment. The one edge 55 of the first guide surface constituting portion 54A is formed so that, for example, its extension is a straight line forming an angle of 45° with the axis C3.

The length of the lower end of the first guide surface constituting portion 54A in the circumferential direction is set longer than the length of the upper end of the first guide surface constituting portion 54A in the circumferential direction. The other edge 56 is disposed closer to the other engaging section 43 than the one edge 55. Then, the other edge 56 is formed in a shape extending in a direction away from both the engaging section 43 and the one edge 55 with respect to the one edge 55.

Even for the container 1 whose barrel section 2 has a largest diameter, The length from the one edge 55 to the other edge 56 in the circumferential direction is set to a length that can suppress the barrel section 2 from abutting against the guide surface 54 when making the flange 5 abut against the guide surface 54 to guide the flange 5 to the abutment section 53.

Therefore, the first guide surface constituting portion 54A is formed in such a fan shape that the extension of the one edge 55 on the side of the second virtual flat plane P2 intersects the extension of the other edge 56 on the opposite side of the one edge 55 in a bottom view, as shown in FIG. 6.

At least the upper end side of the other edge 56 is formed as a curved portion. The curved portion includes the upper end of the other edge 56. More specifically, the curved portion is formed in a curved shape that extends downward and has the center of curvature located on the opposite side of the other engaging section 43 via the guide surface 54. Then, the lower end side of the other edge 56 below the curved portion is formed in, for example, a linear shape.

The first guide surface constituting portion 54A is constituted as a curved surface continuing the one edge 55 and the other edge 56 having the above arrangement. For example, the first guide surface constituting portion 54A is constituted as such a curved surface that the curved portion of the other edge 56 gradually approaches the one edge 55 from the other edge 56 to the one edge 55.

The first guide surface constituting portion 54A having the above arrangement includes, for example, a portion constituted as a curved surface whose center of curvature is located on the opposite side of the other engaging section 43 via the first guide surface constituting portion 54A, and a portion constituted as a curved surface whose center of curvature is located on the side of the other engaging section 43 with respect to the first guide surface constituting portion 54A.

This arrangement will be described in detail. FIG. 12 is a sectional view showing the periphery of a contact A between the first guide surface constituting portion 54A and the flange 5 in the process of connecting the container connector 20 to the container 1. FIG. 12 shows a state obtained when cutting along a cross section passing through the contact A and parallel to a tangent S of the contact A and the axis C3 of the circle X. The tangent S of the contact A is indicated by a one-dot dashed line in FIG. 6. As shown in FIG. 6, for example, the guide surface 54 is inclined with respect to the second virtual flat plane P2 when viewing the container connector 20 from below.

As shown in FIG. 12, the guide surface 54 is formed as such a curved surface that the tangent S passing through the contact A that the flange 5 contacts is inclined at an angle α with respect to the first virtual flat plane P1. The angle α is smaller than 90°.

As shown in FIG. 12, the first guide surface constituting portion 54A is formed as such a curved surface that a center Z of curvature of a part of the first guide surface constituting portion 54A that constitutes the edge of the cross section of the engaging section 43 cut along the tangent S is located on the opposite side of the first virtual flat plane P1 via the first guide surface constituting portion 54A, that is, the opposite side with respect to the other engaging section 43. In other words, the guide surface 54 is formed in a shape that widens from the upper side to the lower side in the axial direction of the circle X, that is, in a shape that separates from the axis C3 as advancing from the upper side to the lower side. Furthermore, in other words, the first guide surface constituting portion 54A is formed as such a curved surface that the inclination angle α of the tangent S of the first guide surface constituting portion 54A with respect to the first virtual flat plane P1 becomes smaller as approaching the abutment section 53 from the lower side.

Then, a part of the first guide surface constituting portion 54A, for example, a lower part is constituted as a curved surface whose center of curvature is located on the side of the other engaging section 43 with respect to the first guide surface constituting portion 54A.

Note that in the above-described example, for the first guide surface constituting portion 54A, the arrangement including the portion constituted as the curved surface whose center of curvature is located on the opposite side of the other engaging section 43 via the first guide surface constituting portion 54A and the portion constituted as the curved surface whose center of curvature is located on the side of the other engaging section 43 with respect to the first guide surface constituting portion 54A has been exemplified. However, the present invention is not limited to this.

In another example, the first guide surface constituting portion 54A may have an arrangement in which a cross section along a direction parallel to the second virtual flat plane P2 is constituted as a curved surface whose center of curvature is located on the opposite side of the other engaging section 43 via the first guide surface constituting portion 54A and which widens from the upper side to the lower side and a portion constituted as a curved surface whose center of curvature is located on the side of the other engaging section 43 with respect to the first guide surface constituting portion 54A is not included. Therefore, the first guide surface constituting portion 54A is constituted as such a curved surface that the inclination angle of the tangent S with respect to the first virtual flat plane P1 becomes smaller as approaching the first abutment section constituting portion 53A.

Furthermore, the first guide surface constituting portion 54A is formed as such a curved surface that the radius of curvature of a part of the first guide surface constituting portion 54A constituting a part of the edge of the cross section of the engaging section 43 cut along the tangent S becomes smaller from the one edge 55 to the other edge 56.

Therefore, in this embodiment, a range from the one edge 55 of the first guide surface constituting portion 54A to the other edge 56 is formed as a curved surface. Furthermore, in the first guide surface constituting portion 54A, the radius of curvature is largest on the side of the one edge 55 and becomes smaller toward the other edge 56. Then, the radius of curvature of the other edge 56 is smallest.

Note that in the above-described example, the example in which the first guide surface constituting portion 54A is constituted as a curved surface from the one edge 55 to the other edge 56 has been exemplified. However, the present invention is not limited to this. In another example, the first guide surface constituting portion 54A is formed as a curved surface whose radius of curvature becomes smaller from the periphery of the one edge 55 to the other edge 56. Then, a range R1 in the periphery of the one edge 55 of the first guide surface constituting portion 54A is formed as, for example, a flat surface. This flat surface is a flat surface parallel to the one edge 55. This range corresponds to a range within which the container 1 does not contact.

Therefore, in this modification, the range from the periphery of the one edge 55 of the first guide surface constituting portion 54A to the other edge 56 is constituted as a curved surface. Furthermore, in the range of the first guide surface constituting portion 54A formed as the curved surface, the radius of curvature is largest at one end on the side of the one edge 55, and becomes smaller toward the other edge 56. Then, the radius of curvature of the other edge 56 is smallest. Note that if the one edge 55 is constituted as a curved line, the radius of curvature of the one edge 55 is largest.

Furthermore, the inclination angle α of the tangent S of one end, on the side of the abutment section 53, of the other edge 56 of the first guide surface constituting portion 54A with respect to the first virtual flat plane P1 is smaller than that of the extension of the one edge 55 of the first guide surface constituting portion 54A with respect to the first virtual flat plane P1.

In addition, in the first guide surface constituting portion 54A, a part of the first guide surface constituting portion 54 constituting a part of the edge of the cross section of the engaging section 43 orthogonal to the axis C3 is constituted as a curved surface whose center of curvature is located on the side of the first virtual flat plane P1. The curvature is set to a curvature that can prevent the barrel section 2 of the container 1 from abutting against the guide surface 54 in a process of guiding the flange 5 of the container 1 to the abutment section 53 by the guide surface 54.

The one edge 55 of the first guide surface constituting portion 54A is formed as a straight line or a curved line. Note that in this embodiment, the one edge 55 is formed in, for example, a linear shape, as described above.

The guide surface 54 having the above arrangement including the first guide surface constituting portion 54A and the second guide surface constituting portion 54B is constituted as a curved surface that can guide the flanges 5 of a plurality of kinds of containers 1 to the abutment section 53 in cooperation with the guide surface 54 of the other engaging section. The plurality of kinds of containers 1 are a plurality of containers 1 including the flanges 5 of different outer diameters. The guide surface 54 is configured to be able to guide, to the abutment section 53, the containers 1 including the flanges 5 having outer diameters ranging from the assumed minimum diameter to the assumed maximum diameter.

More specifically, the region near the one edge 55 of the first guide surface constituting portion 54A is formed so that the flange 5 of the assumed minimum diameter can abut at a position closest to the one edge 55 when guiding the flange 5 of the container 1 to the abutment section 53 by the guide surfaces 54 of the pair of engaging sections 43. Then, the region near the one edge 55 of the first guide surface constituting portion 54A is formed to be able to guide the flange 5 of the assumed minimum diameter to the first abutment section constituting portion 53A.

The guide surface 54 is pressed and spread by being pressed along the axis C3 against the container 1 including the flange 5 of the assumed minimum diameter.

When the guide surface 54 is pressed and spread, the guide surface 54 moves in a direction away from the other engaging section 43. The region near the one edge 55 of the first guide surface constituting portion 54A is constituted as such a surface that even if the guide surface 54 is pressed and spread to a state immediately before the guide surface 54 engages with the neck 4 of the container 1, the tangent S of a position where the guide surface 54 abuts against the flange 5 is inclined with respect to the direction parallel to the axis C3.

Note that even if the outer diameter of the neck 4 is small, and the engaging section 43 does not spread in a state in which the neck 4 is sandwiched by the pair of abutment sections 53, the one edge 55 is inclined at a predetermined angle, for example, 45° with respect to the axis C3. This inclination is an inclination that prevents the guide surface 54 from interfering with the barrel section 2.

The first guide surface constituting portion 54A is configured so that the flange 5 of a diameter larger than the assumed minimum diameter abuts against it at a position closer to the other edge 56 than the abutment position of the flange 5 of the assumed minimum diameter and can be guided to the abutment section 53. Then, the other edge 56 of the first guide surface constituting portion 54A is configured so that the flange 5 of the assumed maximum diameter can abut against it. Furthermore, the other edge 56 of the first guide surface constituting portion 54A is formed to be able to guide the flange 5 of the assumed maximum diameter to the first abutment section constituting portion 53A.

More specifically, even if the other edge 56 of the first guide surface constituting portion 54A is pressed and spread to the state immediately before the guide surface 54 engages with the neck 4 of the container 1, a tangent of the abutment position of the flange 5 is constituted as a line inclined with respect to the direction parallel to the axis C3. That is, the other edge 56 is configured so that the guide surface 54 is further pressed and spread by further pressing the container connector 20 in that state, and the abutment section 53 can engage with the neck 4 across the flange 5.

The guide surface 54 is configured to abut against the flange 5 having a diameter falling within the range from the assumed minimum diameter to the assumed maximum diameter at one point on each side of the one edge 55, and to be able to guide the flange 5 to the abutment section 53.

The inclination angle α of the tangent S at one end of the other edge 56 of the first guide surface constituting portion 54A on the opposite side of the abutment section 53, that is, at the lower end with respect to the first virtual flat plane P1 is larger than that of the extension of the one edge 55 of the first guide surface constituting portion 54A with respect to the first virtual flat plane P1.

Furthermore, in an upper end portion R2 as one end portion of the first guide surface constituting portion 54A on the side of the abutment section 53, the inclination angle α of the tangent S with respect to the first virtual flat plane P1 becomes smaller from the one edge 55 to the other edge 56. Note that the upper end portion R2 is a range near the abutment section 53 in the first guide surface constituting portion 54A. In a lower end portion R3 of the first guide surface constituting portion 54A on the opposite side of the abutment section 53, the inclination angle α of the tangent S with respect to the first virtual flat plane P1 becomes larger from the one edge 55 to the other edge 56. Note that the lower end portion R3 is a range near the lower end of the guide surface 54.

The guide surface 54 having the above arrangement including the first guide surface constituting portion 54A and the second guide surface constituting portion 54B is configured to be able to guide the container 1 with the flange 5 having an outer diameter of 32 mm or less to the abutment section 53. Referring to FIG. 6, the flange 5 having a diameter (the outer diameter of the flange 5) of 13 mm of the container 1 and the flange 5 having a diameter of 20 mm of the container 1 are represented by two-dot dashed lines. Furthermore, FIG. 6 shows a state in which the flange 5 of the assumed maximum diameter abuts against the other edge 56.

The contact A between the guide surface 54 and the flange 5 of the container 1 moves within the guide surface 54 by pressing the container connector 20 into the container 1. Assume that the locus of the contact A is a contact line S1. The contact line S1 is a line along the second virtual flat plane P2 when viewed from below.

In the container connector 20, the position of the contact A between the container 1 and the guide surface 54 changes in accordance with the size of the diameter of the container 1. More specifically, for the container 1 of a small diameter, the contact A is arranged at a position close to the second virtual flat plane P2 on the guide surface 54. For the container 1 of a large diameter, the contact A is arranged at a position away from the second virtual flat plane P2 on the guide surface 54. The flange 5 of the container 1 with the flange 5 of the assumed maximum diameter abuts against the other edge 56.

Since the guide surface 54 is formed in a fan shape, as shown in FIG. 6, the length of the guide surface 54 in the circumferential direction about the axis C3 is long. More specifically, as compared to the length in the circumferential direction of one end of the guide surface 54 on the side of the abutment section 53, the length in the circumferential direction of the other end of the guide surface 54 is long. Therefore, the container 1 of a relatively small diameter abuts against a region on the one end side of the guide surface 54, and the container 1 of a large diameter abuts against a region on the other end side of the guide surface 54.

When connecting the container connector 20 to the container 1, the container connector 20 is pressed against the container 1, and thus the engaging section 43 is pressed and spread by the container 1. When the engaging section 43 is pressed and spread, the guide surface 54 moves away from the axis C3 of the circle X. Therefore, the inclination angle α of the tangent S with respect to the first virtual flat plane P1 at the same position of the guide surface 54 in a state in which the first portion 43A is pressed and spread by the container 1 is larger than in a state in which the first portion 43A is not pressed and spread.

However, when the guide surface 54 is formed as a curved surface, the increase amount of the inclination angle α generated by the connection progress of the container connector 20 to the container 1 can be relaxed. Furthermore, when the guide surface 54 is formed as a curved surface having the above-described features, the increase amount of the inclination angle α of the tangent S with respect to the first virtual flat plane P1 generated by the connection progress of the container connector 20 to the container 1 can be made small in any portion of the guide surface 54. That is, the increase of the angle α can be made small.

When the guide surface 54 is pressed and spread by the container 1 in this way, the position of the contact A of the guide surface 54 with the container 1 changes. The guide surface 54 is formed as such a curved surface that even if the position of the contact A changes, the angle α does not largely change, as described above. The angle α is almost 45°.

Furthermore, the other engaging section 43 is formed in a shape symmetric to the above-described one engaging section 43 with respect to the first virtual flat plane P1.

A central portion of the abutment section 53 about the axis C3 is formed in an arc shape recessed to the side away from the other engaging section 43, as shown in FIG. 6.

As shown in FIGS. 13, 14, and 15, the needle member 60 includes a needle member base 61 constituting one end side of the needle member 60 and the needle section 62 constituting the other end side of the needle member 60.

The needle member base 61 constitutes the upper portion of the base 41. The needle member base 61 is formed in a pillar shape. A flange 63 is formed at an edge of the upper end of the needle member base 61. An annular extending section 64 extending in a direction away from the axis of the needle member base 61 is formed on the outer peripheral surface of the needle member base 61. More specifically, three extending sections 64 are formed. A column section 65 that couples the flange 63 and the extending section 64 facing the flange 63 is formed between them. A column section 65 that couples the two facing extending sections 64 is formed between them.

A rotation stopping section 66 disposed in the rectangular portion 46 of the hole 44 is provided in the lower end portion of the outer peripheral surface of the needle member base 61. The rotation stopping section 66 is configured so that the shape of the cross section orthogonal to the axial direction of the needle member base 61 is, for example, the same shape as that of the rectangular portion 46 or a shape smaller than that of the rectangular portion 46.

As shown in FIG. 8, an abutment section 67 that abuts against the edge portion of the hole 44 from above is formed in the lower end portion of the outer peripheral surface of the needle member base 61. The abutment section 67 is constituted as, for example, a protruding section of the outer peripheral surface of the needle member base 61, which partially protrudes. When the abutment section 67 abuts against the edge portion of the hole 44 from above, the needle member 60 is held in the hole 44.

The needle section 62 constitutes a portion below the base 41. The tip of the needle section 62 is formed as a sharp head.

The needle member 60 having the above arrangement includes the liquid flow path constituting portion L3 constituting a part of the liquid flow path L1 and the gas flow path constituting portion L4 constituting a part of the gas flow path L2.

The liquid flow path constituting portion L3 is a hole extending in the axial direction of the needle member 60 from the upper end surface of the needle member base 61 to the lower end side of the needle section 62. The lower end of the liquid flow path constituting portion L3 is open to the surface of the needle section 62. A portion, constituted in the needle member base 61, of the liquid flow path constituting portion L3 is formed in such a shape that the flow path area orthogonal to the axial direction of the needle member 60 is large, as compared to a portion constituted in the needle section 62.

The gas flow path constituting portion L4 is a hole extending in the axial direction of the needle member 60 from the upper end surface of the needle member base 61 to the lower end side of the needle section 62. The lower end of the gas flow path constituting portion L4 is open to the surface of the needle section 62. A portion, constituted in the needle member base 61, of the gas flow path constituting portion L4 is formed in such a shape that the flow path area orthogonal to the axial direction of the needle member 60 is large, as compared to a portion constituted in the needle section 62.

Note that the lower end opening of the liquid flow path constituting portion L3 is located above the lower end opening of the gas flow path constituting portion L4. This is so as to guide the chemical solution accumulated on the neck side of the container 1 to the liquid flow path constituting portion L3 when inclining the connection equipment 10, the container 1, and the syringe 7 so that the container 1 is disposed above the connection equipment 10.

As shown in FIGS. 16, 17, 18, 19, 20, and 21, the seal cap 70 is formed in a tubular shape that stores the needle member base 61 and the container seal 90. Furthermore, the seal cap 70 is configured to be able to unlock the stopper sleeve 230 and an outer shell 110 (to be described later) of the equipment connector 100 and to be lockable with the stopper sleeve 230. The seal cap 70 is formed in a tubular shape in which the needle member base 61 fits.

More specifically, as shown in FIG. 16, the seal cap 70 includes a cylindrical seal cap large diameter section 71, a seal cap intermediate diameter section 72 formed on the seal cap large diameter section 71, and a seal cap small diameter section 73 formed on the seal cap intermediate diameter section 72.

A plurality of grooves extending in the circumferential direction are formed on the outer peripheral surface of the seal cap large diameter section 71.

The seal cap intermediate diameter section 72 is formed to have a diameter smaller than that of the seal cap large diameter section 71. The seal cap intermediate diameter section 72 is formed to be able to unlock the stopper sleeve 230 and the outer shell 110 by abutting against the stopper sleeve 230 (to be described alter) of the equipment connector 100 when the container connector 20 is inserted into the equipment connector 100 to reach a predetermined position in the equipment connector 100. More specifically, an upper end portion 72*a* of the outer peripheral surface of the seal cap intermediate diameter section 72 is constituted as a conical surface having a diameter that gradually decreases upward.

In the seal cap intermediate diameter section 72, a locking recess 77 is formed to be engaged with the stopper sleeve 230 when the container connector 20 is inserted into the equipment connector 100 to reach the predetermined position in the equipment connector 100.

The locking recess 77 is a recess formed in a range from the lower end of a portion of the outer peripheral surface of the seal cap intermediate diameter section 72 in the circumferential direction to a middle portion in the axial direction. The upper surface in the locking recess 77 is constituted as an engaged surface with which the stopper sleeve 230 can engage.

In the seal cap intermediate diameter section 72, the engaged section 78 with which the engagement member 160 (to be described later) of the equipment connector 100 can engage is formed. More specifically, the engaged section 78 is formed in a part of the upper end portion 72*a* formed as the conical surface of the outer peripheral surface of the seal cap intermediate diameter section 72. The engaged section 78 is a protruding section formed in a part of the seal cap intermediate diameter section 72 and protruding outward in the radial direction. A lower surface 79 of the engaged section 78 is constituted as, for example, a flat surface orthogonal to the axial direction of the seal cap 70.

On the outer peripheral surface of the seal cap large diameter section 71 and that of the seal cap intermediate diameter section 72, a first guiding protrusion 75 that guides movement of the container connector 20 in the axial direction of the outer shell main body 111 in the outer shell main body 111 of the equipment connector 100 is formed.

The first guiding protrusion 75 is formed in a convex shape that protrudes outward in the radial direction. The first guiding protrusion 75 is formed to be stored in a first guide groove 126 formed in the outer shell main body 111. For example, a plurality of first guiding protrusions 75 are formed. For example, one first guiding protrusion 75 is formed.

The seal cap small diameter section 73 is formed in a tubular shape having a diameter smaller than the upper end of the seal cap intermediate diameter section 72. The seal cap small diameter section 73 is formed in a cylindrical shape that movably fits in the head sleeve 180 (to be described later) of the equipment connector 100.

An edge portion 73*b* of an opening 73*a* at the upper end of the seal cap small diameter section 73 is formed in an annular shape extending inward in the radial direction, as shown in FIG. 20. The opening 73*a* is formed in a round shape. The seal cap small diameter section 73 has such a length that a part of the container seal 90 can be disposed between a lower surface 73*c* of the edge portion 73*b* and the upper end of the needle member base 61 in the axial direction.

In an inner peripheral surface 76 of the seal cap 70 having the above arrangement, a groove 81 in which the engaging claw 47 of the container fixing section main body 40 is disposed is formed, as shown in FIGS. 8, 19, 20, and 21. The groove 81 extends in the axial direction, and has, in its end portion, an engaged surface 82 with which the claw section 49 of the engaging claw 47 engages. The engaged surface 82 is constituted as, for example, a flat surface orthogonal to the axial direction. When the engaging claw 47 of the container fixing section main body 40 is stored in the groove 81 and the claw section 49 engages with the engaged surface 82 in the axial direction, the seal cap 70 and the container fixing section main body 40 are fixed.

A part of the container seal 90 is stored in the seal cap 70, as shown in FIG. 8, and another part of the container seal 90 is disposed outside the seal cap 70 through the opening 73*a* at the upper end of the seal cap 70. The container seal 90 is configured to be able to seal the opening 73*a* of the seal cap 70. The container seal 90 is configured to be able to seal each of the opening of the liquid flow path constituting portion L3 of the needle member 60 and that of the gas flow path constituting portion L4 of the needle member 60.

The container seal 90 is made of a resin such as rubber or elastomer and has flexibility. The container seal 90 is formed to be able to liquid-tightly and air-tightly seal, by resilience, a hole formed when the liquid needle 170 and the gas needle 175 (to be described later) of the equipment connector 100 are inserted, after the liquid needle 170 and the gas needle 175 are moved.

More specifically, as shown in FIGS. 22 and 23, the container seal 90 includes a seal large diameter section 93 disposed in the seal cap 70, a seal small diameter section 94 formed on the upper surface of the seal large diameter section 93 and disposed in the opening 73*a*, a first fitting section 96 formed on the lower surface of the seal large diameter section 93 and disposed in the opening of the liquid flow path constituting portion L3, and a second fitting section 97 formed on the lower surface of the seal large diameter section 93 and disposed in the opening of the gas flow path constituting portion L4.

The seal large diameter section 93 is formed to be able to seal a gap with respect to the inner peripheral surface 76 of the seal cap 70. More specifically, the seal large diameter section 93 is formed in a columnar shape having an outer diameter larger than the inner diameter of the seal cap 70 and a length in the axial direction longer than the distance from the upper end of the needle member 60 to the edge portion 73*b* of the seal cap small diameter section 73.

The seal small diameter section 94 is configured to be able to seal the opening 73*a*. More specifically, the seal small diameter section 94 is formed in a columnar shape having an outer diameter larger than the inner diameter of the opening 73*a* and having a part in the axial direction that protrudes upward from the upper surface of the seal cap small diameter section 73.

The part of the seal small diameter section 94, that protrudes upward from the upper surface of the seal cap small diameter section 73, is a crushing margin obtained when sealing the gap with respect to a needle seal 200 (to be described later) by abutting against the needle seal 200 to be crushed. As this crushing margin, an amount that can seal the gap between the upper surface of the seal small diameter section 94 and the needle seal 200 is set. An upper end surface 95 of the seal small diameter section 94 is formed as a flat surface orthogonal to the axial direction of the seal small diameter section 94.

The first fitting section 96 is formed to be able to seal the opening of the liquid flow path constituting portion L3. More specifically, the first fitting section 96 is formed in a columnar shape having an outer diameter larger than the inner diameter of the liquid flow path constituting portion L3.

The second fitting section 97 is configured to be able to seal the opening of the gas flow path constituting portion L4. More specifically, the second fitting section 97 is formed in a columnar shape having an outer diameter larger than the inner diameter of the gas flow path constituting portion L4.

The equipment connector 100 will be described next. As shown in FIGS. 24 and 27, the equipment connector 100 includes the outer shell 110, the air bag 152 stored in the outer shell 110, the liquid needle 170 constituting a part of the liquid flow path L1, the gas needle 175 constituting a part of the gas flow path L2, the tubular head sleeve 180 movably stored in the outer shell 110, the needle seal 200 fixed to the head sleeve 180, the stopper sleeve 230 configured to be able to selectively fix the head sleeve 180 to the outer shell 110 and selectively fix the head sleeve 180 and the container connector 20, and an urging member 250 that urges the head sleeve 180 in a direction in which the head sleeve 180 is taken out of the outer shell main body 111.

As shown in FIGS. 2 and 27, the outer shell 110 includes the outer shell main body 111, an air bag storage section 150 that stores the air bag 152, and the engagement member 160 that locks the outer shell main body 111 with the container connector 20 to be unlockable.

The outer shell main body ill is formed in a bottomed tubular shape. More specifically, the outer shell main body ill includes a ceiling wall 114, a syringe fixing section 115 which is formed in the ceiling wall 114 and to which the barrel 8 of the syringe 7 can be fixed, a liquid needle fixing section 116 which is formed in the ceiling wall 114 and to which the liquid needle 170 can be fixed, a tubular barrel section 117 formed at a rim of the ceiling wall 114, and the inner sleeve 140 fixed in the outer shell main body 111.

As shown in FIGS. 1 and 2, the ceiling wall 114 is formed in, for example, a disk shape.

The syringe fixing section 115 is formed on the upper surface of the ceiling wall 114, and formed in a tubular shape that protrudes upward from another portion of the upper surface. The syringe fixing section 115 is formed to be fittable in a tip portion of the barrel 8. More specifically, the syringe fixing section 115 includes a syringe fixing section main body 120 formed in a cylindrical shape, and a syringe fixing section protruding section 121 that is formed at a rim of the upper end of the syringe fixing section main body 120 and protrudes outward in the radial direction.

For example, a plurality of syringe fixing section protruding sections 121 are formed. The syringe fixing section protruding section 121 has a predetermined length in the circumferential direction of the syringe fixing section main body 120. The syringe fixing section protruding section 121 is screwed into an internal thread formed in the tip portion of the barrel 8, thereby fixing the syringe 7 and the equipment connector 100.

The liquid needle fixing section 116 is formed in a tubular shape that protrudes downward from the lower surface of the ceiling wall 114 and fixes the liquid needle 170 inside. The liquid needle fixing section 116 communicates with the interior of the syringe fixing section main body 120. The liquid needle fixing section 116 is formed in, for example, a cylindrical shape.

The syringe fixing section 115 and the liquid needle fixing section 116 are formed by, for example, the needle holder 122 as a member different from the other portion of the outer shell main body 111. In other words, the syringe fixing section 115 and the liquid needle fixing section 116 are constituted by attaching the needle holder 122 to the outer shell main body 111.

As shown in FIG. 31, the needle holder 122 includes a base 124, the syringe fixing section 115, and the liquid needle fixing section 116.

The base 124 is formed in a cylindrical shape having a diameter larger than that of the liquid needle fixing section 116 and smaller than that of the syringe fixing section 115. As shown in FIG. 31, on the outer peripheral surface of the base 124, a ratchet 124*a* that allows the needle holder 122 to rotate about the axis of the syringe fixing section 115 only in one direction and regulates rotation in an opposite direction is formed. The rotation direction of the needle holder 122 allowed by the ratchet 124*a* is a direction in which the syringe 7 is rotated about the syringe fixing section 115 to remove the syringe 7 from the syringe fixing section 115.

As shown in FIG. 29, a protruding section 123 protruding downward is formed on the lower surface of the ceiling wall 114. The protruding section 123 regulates the rotation of the needle holder 122 by abutting against the ratchet 124*a* in the direction in which the syringe 7 is rotated about the syringe fixing section 115 to fix the syringe 7 to the syringe fixing section 115.

As shown in FIG. 27, the barrel section 117 is formed in a cylindrical shape in which the seal cap large diameter section 71 of the container connector 20 movably fits. A hole 117*a* in which a part of the inner sleeve 140 is disposed is formed in the upper end portion of the barrel section 117. The hole 117*a* communicates with the interior of the air bag storage section 150.

The first guide groove 126 that movably stores the first guiding protrusion 75 of the seal cap 70 of the container connector 20 is formed in a part of the lower end portion of the inner peripheral surface 117*b* of the barrel section 117. The first guide groove 126 is open to the lower end of the barrel section 117. The first guiding protrusion 75 intrudes into the first guide groove 126 through the opening.

The first guide groove 126 has such a length that it is possible to guide upward movement of the container connector 20 to at least a position where the liquid flow path L1 and the gas flow path L2 are formed by disposing the liquid needle 170 in the liquid flow path constituting portion L3 and disposing the gas needle 175 in the gas flow path constituting portion L4.

The first guide groove 126 extends in the axial direction of the outer shell 110. The width of the first guide groove 126 in the circumferential direction of the outer shell 110 has such a size that the first guiding protrusion 75 movably fits in the groove. The inner surface of the first guide groove 126 abuts against the first guiding protrusion 75 in the circumferential direction, thereby preventing the rotation of the container connector 20. The first guide grooves 126 that correspond in number to the first guiding protrusions 75 are formed. For example, one first guide groove 126 is formed.

In a portion of a middle portion of the inner peripheral surface of the barrel section 117 in the axial direction, which is aligned with the first guide groove 126 in the axial direction, a second guide groove 127 that movably stores a second guiding protrusion 182 (to be described later) of the head sleeve 180 is formed.

The second guide groove 127 extends in the axial direction of the outer shell main body 111. The second guide groove 127 has such a length that it is possible to guide the upward movement of the container connector 20 to at least the position where the liquid flow path L1 and the gas flow path L2 are formed.

The width of the second guide groove 127 in the circumferential direction of the outer shell main body 111 has such a size that the second guiding protrusion 182 movably fits in the groove. The inner surface of the second guide groove 127 is formed to be able to prevent the rotation of the head sleeve 180 by abutting against the second guiding protrusion 182 in the circumferential direction. For example, a plurality of second guide grooves 127 are formed. For example, two second guide grooves 127 are formed, and disposed at positions 180° away from each other in the circumferential direction of the outer shell main body 111.

Furthermore, in the middle portion of the inner peripheral surface of the barrel section 117 in the axial direction, a locking protrusion 128 is formed at a position shifted from the second guide groove 127 in the circumferential direction, as shown in FIGS. 29 and 30. The locking protrusion 128 protrudes inward in the radial direction of the outer shell main body 111.

The locking protrusion 128 is formed to be able to regulate the upward movement of the head sleeve 180 fixed to the stopper sleeve 230 by engaging with the stopper sleeve 230.

For example, a plurality of locking protrusions 128 are formed. For example, two locking protrusions 128 are formed. The two locking protrusions 128 are disposed at positions 180° away from each other in the circumferential direction of the barrel section 117, and each locking protrusion is disposed at a position shifted by 45° from the first guide groove 126 and the second guide groove 127 in the circumferential direction of the outer shell main body 111.

Furthermore, in the middle portion of the inner peripheral surface of the barrel section 117 in the axial direction, an unlocking protrusion 129 is formed at a position shifted from the locking protrusion 128 in the circumferential direction, as shown in FIGS. 30 and 31. The unlocking protrusion 129 protrudes inward in the radial direction of the outer shell main body 111.

The unlocking protrusion 129 is formed to be able to release the engagement between the stopper sleeve 230 and the locking recess 77 of the container connector 20 by abutting against the stopper sleeve 230.

Figure 50:
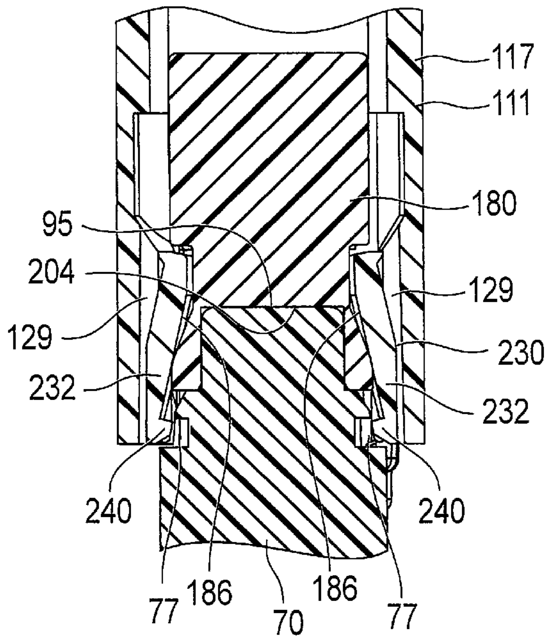
FIG. 50 is an explanatory view for explaining the connection between the equipment connector and the container connector.

As shown in FIG. 50, the unlocking protrusion 129 is formed in such a shape that a middle portion in the axial direction of the barrel section 117 protrudes most inward in the radial direction of the outer shell main body 111 and an amount of protrusion inward in the radial direction gradually increases from the upper and lower ends to the middle portion.

For example, a plurality of unlocking protrusions 129 are formed. For example, two unlocking protrusions 129 are formed. The two unlocking protrusions 129 are disposed at 180° away from each other in the circumferential direction of the outer shell main body 111, and each unlocking protrusion is disposed at a position 90° away from the locking protrusion 128 in the circumferential direction.

As shown in FIGS. 1, 3, 24, and 25, a hole 131 that stores, for example, a part of the engagement member 160 is formed in the lower end portion of the barrel section 117. The hole 131 extends through the barrel section 117 in the radial direction. For example, a plurality of holes 131 are formed. For example, two holes 131 are formed. The two holes 131 are disposed at positions 180° away from each other in the circumferential direction of the outer shell 110, and are disposed at, for example, positions 90° away from the first guide groove 126 and the second guide groove 127 in the circumferential direction.

The outer shell main body 111 having the above arrangement is constituted by, for example, combining a plurality of members. For example, the outer shell main body 111 is constituted by, for example, fixing the two outer shell constituting members 132. FIG. 2 shows a state in which one of the outer shell constituting members 132 is removed. FIGS. 28 and 29 show the one outer shell constituting member 132. FIG. 30 shows the inner surface of the other outer shell constituting member 132.

As shown in FIGS. 28, 29, and 30, each of the two outer shell constituting members 132 has a shape obtained by dividing the outer shell main body 111 into two parts by a plane which passes through the axis of the outer shell main body 111 and is parallel to each of the axial direction of the outer shell main body 111 and a direction in which the outer shell main body 111 and the air bag storage section 150 are arranged.

For example, one of the outer shell constituting members 132 includes a plurality of pins 134. The other outer shell constituting member 132 includes a plurality of holes 135 in which the plurality of pins 134 fit, respectively. When the plurality of pins 134 fit in the plurality of holes 135, the two outer shell constituting members 132 are fixed integrally.

As shown in FIG. 2, the inner sleeve 140 constitutes a gas flow path constituting portion L5 as a part of the gas flow path L2 from the gas needle 175 to the air bag 152. More specifically, as shown in FIGS. 32, 33, and 34, the inner sleeve 140 includes an inner sleeve main body 141 and an extending section 142 extending from the inner sleeve main body 141 to the side of the air bag storage section 150.

The inner sleeve main body 141 is formed in a columnar shape. In the inner sleeve main body 141, a hole 143 in which the liquid needle fixing section 116 is rotatably disposed is formed. As shown in FIG. 34, a gas needle fixing section 144 that can fix the gas needle 175 is formed at a position, which is aligned with the hole 143 in, for example, the radial direction, on the lower surface of the inner sleeve main body 141. The gas needle fixing section 144 is a hole to which the gas needle 175 is fixed. The gas needle fixing section 144 communicates with the gas flow path constituting portion L5 of the gas flow path L2.

The extending section 142 is connected to the air bag 152. For example, the extending section 142 is formed in a tubular shape that protrudes outward in the radial direction from the upper end portion of the outer peripheral surface of the inner sleeve main body 141. As shown in FIG. 2, the extending section 142 includes a support section 145 disposed in the hole 117*a* formed in the outer shell main body 111 and supported by the hole 117*a*, and a fixing section 146 which is disposed in the air bag storage section 150 and to which the air bag 152 is fixed.

The support section 145 is formed in a cylindrical shape having a diameter almost equal to the inner diameter of the hole 117*a*. For example, the fixing section 146 is formed in a cylindrical shape having a diameter larger than that of the support section 145. A flange 147 is formed at the tip of the fixing section 146.

For example, the fixing section 146 is arranged on the upper or lower side with respect to the center of the air bag storage section 150 in the vertical direction. In this embodiment, as an example, the fixing section 146 is disposed on the upper side with respect to the center of the air bag storage section 150 in the vertical direction.

As shown in FIGS. 2 and 33, an end surface 148 of the flange 147 is constituted as a flat surface inclined in each of the vertical direction and the axial direction of the fixing section 146 in a state in which the inner sleeve 140 is attached to the outer shell 110.

If the fixing section 146 is disposed above the center of the air bag storage section 150 in the vertical direction, the inclined flat surface is such a flat surface that a lower end 148*a* of the end surface 148 is located closer to the support section 145 than an upper end 148*b*. In other words, the upper end 148*b* is located closer to the center line of the air bag storage section 150 than the lower end 148*a*. The center line is a line passing through the center of the air bag storage section 150 and parallel to the vertical direction.

If the fixing section 146 is disposed below the center of the air bag storage section 150 in the vertical direction, the inclined flat surface is such a flat surface that the upper end 148*b* of the end surface 148 is located closer to the support section 145 than the lower end 148*a*. In other words, the lower end 148*a* is located closer to the center line of the air bag storage section 150 than the upper end 148*b*.

The thickness of the flange 147 gradually increases from the upper end 148*b* to the center in the vertical direction, and gradually decreases from the center in the vertical direction to the lower end 148*a*. By arranging a division line as a boundary between an upper mold and a lower mold at the center position of the flange 147, the inner sleeve 140 having such shape can be manufactured by injection molding.

Note that if the fixing section 146 is located below the center of the air bag storage section 150 in the vertical direction, the end surface 148 may be constituted as a flat surface having the lower end 148*a* that is located closer to the center line of the air bag storage section 150 than the upper end 148*b*.

As shown in FIG. 2, the air bag storage section 150 is disposed away from the outer shell main body 111 in a direction orthogonal to the axial direction of the outer shell main body 111. In this embodiment, the air bag storage section 150 is aligned with the outer shell main body 111 in a direction in which the two first guide grooves 126 are arranged. The air bag storage section 150 is formed in a box shape having a space in which the air bag 152 can be stored.

The appearance of the air bag storage section 150 is formed, for example, in a columnar shape, and the axis thereof is parallel to the axis of the outer shell main body 111. The upper end wall of the air bag storage section 150 is formed in a dome shape that protrudes upward and an upper surface 150*a* of the inner space of the air bag storage section 150 is also formed in a dome shape that protrudes upward. The upper surface 150*a* is formed in a shape that has an upper end on the axis of the air bag storage section 150 and protrudes upward, for example, in a bowl shape. The lower end wall of the air bag storage section 150 is formed in a dome shape that protrudes downward, and a bottom surface 150*b* of the inner space of the air bag storage section 150 is also formed in a dome shape that protrudes downward. The bottom surface 150*b* is formed in a shape that has a lower end on the axis of the air bag storage section 150 and protrudes downward, for example, in a bowl shape.

The air bag storage section 150 is fixed to the outer shell main body 111 by a coupling section 151. Furthermore, a transparent or translucent resin material is used for the air bag storage section 150, or an opening or a transparent window portion is provided in a part of a wall surface of the air bag storage section 150, thereby making it possible to see the shape of the air bag 152.

The air bag storage section 150 having the above arrangement and the coupling section 151 can be constituted by, for example, combining a plurality of members. For example, the air bag storage section 150 is constituted by fixing two constituting members. In this embodiment, as shown in FIGS. 3 and 6, one of the constituting members that constitute the air bag storage section 150 is formed integrally with one of the outer shell constituting members 132 together with a part of the coupling section 151. The other constituting member that constitutes the air bag storage section 150 is formed integrally with the other outer shell constituting member 132 together with the other part of the coupling section 151. In other words, the outer shell main body 111, the air bag storage section 150, and the coupling section 151 are constituted by fixing the two outer shell constituting members 132.

As shown in FIGS. 1, 3, and 27, for example, a part of the engagement member 160 is disposed in the hole 131. The engagement member 160 engages with the engaged section 78 of the seal cap 70 in a state in which the container connector 20 is inserted into the outer shell main body 111 to form the liquid flow path L1 and the gas flow path L2. Then, the engagement member 160 is configured to be able to release the engagement with the engaged section 78 by being operated. Furthermore, the engagement member 160 is configured to be able to lock the engagement with the engaged section 78. The engagement member 160 and the engaged section 78 constitute a lock mechanism 160*a* that locks the engagement between them. For example, a plurality of engagement members 160 are provided. As a practical example, two engagement members 160 are provided. The two engagement members 160 are disposed at positions 180° away from each other about the axis of the outer shell main body 111.

The engagement member 160 is a member long in the axial direction of the outer shell main body 111. The engagement member 160 includes an engaging section 161 that engages with the engaged section 78 of the seal cap 70, an operating section 165 that is operated by an operator to release the engagement between the engaging section 161 and the engaged section 78, a deformation section 166 that is deformed to move the engaging section 161 in a direction in which the engagement with the engaged section 78 is released, a posture adjustment section 167 that adjusts the posture of the engaging section 161, a fulcrum section 168 that changes the operating force input to the operating section 165 to a force for deforming the deformation section 166, and a fixing section 169 that fixes the engagement member 160 to the outer shell main body 111.

The engaging section 161 engages with the engaged section 78 of the seal cap 70 in the state in which the equipment connector 100 is inserted into the container connector 20 to form the liquid flow path L1 and the gas flow path L2.

More specifically, the engaging section 161 is constituted as a convex section that protrudes inward in the radial direction of the outer shell main body 111. When an upper surface 162 of the engaging section 161 abuts against the lower surface of the engaged section 78 in the vertical direction, it receives, from the engaged section 78, the load imposed by pulling the container connector 20 downward in the axial direction of the barrel section 117, that is, a direction in which the container connector 20 is pulled out of the equipment connector 100. The upper surface 162 is constituted as, for example, a flat surface orthogonal to the vertical direction.

When the container connector 20 is inserted into the equipment connector 100, the seal cap 70 buts against a lower surface 164 of the engaging section 161. The lower surface 164 is formed as a guide surface that guides movement of the seal cap 70. More specifically, the lower surface 164 is constituted as, for example, a curved surface that gradually extends upward to the inner side of the outer shell main body 111.

The operating section 165 is constituted in the upper portion of the engagement member 160. The operating section 165 is configured to be pressable, by the operator, inward in the radial direction of the barrel section 117 of the outer shell main body 111. In the state in which the container connector 20 is inserted into the equipment connector 100 to form the liquid flow path L1 and the gas flow path L2, the operating section 165 has a gap S2 with respect to the container connector 20 disposed in the barrel section 117 in the radial direction of the barrel section 117.

The gap S2 corresponds to the movement margin of the operating section 165 when the operating section 165 is pressed toward the inner side of the outer shell main body 111. More specifically, the operating section 165 is formed in a shape inclined in a direction away from the outer shell main body 111 in the radial direction.

The deformation section 166 is provided between the engaging section 161 and the fixing section 169. For example, the deformation section 166 is continuously provided from the engaging section 161 in the axial direction of the barrel section 117. If a force in a direction in which the engaging section 161 is taken out of the outer shell main body 111 acts on the engaging section 161, the deformation section 166 is bent to move the engaging section 161 outside the outer shell main body 111. The deformation section 166 is configured to be able to bend the engaging section 161 to a position where the engagement with the engaged section 78 can be released and which does not face the engaged section 78 in the vertical direction.

More specifically, the deformation section 166 is formed in a shape that linearly extends in the vertical direction. The deformation section 166 has, for example, a thickness smaller than those of the fixing section 169 and the engaging section 161.

The posture adjustment section 167 is provided between the engaging section 161 and the operating section 165. For example, the posture adjustment section 167 is continuously provided from the engaging section 161 in the axial direction of the barrel section 117. In other words, the posture adjustment section 167 is formed between the engaging section 161 and the fulcrum section 168 (to be described later). The posture adjustment section 167 is configured to be able to hold the engaging section 161 as a flat surface, to which the upper surface 162 is orthogonal in the vertical direction, by bending when a force in the direction in which the engaging section 161 is taken out of the outer shell main body 111 acts on the engaging section 161 and the deformation section 166 bends to move the engaging section 161 from the outer shell main body 111. The posture adjustment section 167 has, for example, a thickness smaller than those of the engaging section 161 and the operating section 165.

The fulcrum section 168 is provided between the operating section 165 and the posture adjustment section 167. In other words, the fulcrum section 168 is continuously formed from the operating section 165 in the axial direction of the barrel section 117. In a state in which the operating section 165 is pressed toward the inner side of the outer shell main body 111, the fulcrum section 168 contacts a part of the equipment connector 100, thereby generating, by a leverage effect, for a portion closer to the engaging section 161 than the fulcrum section 168, a rotation moment in a direction in which the engaging section 161 is taken out of the outer shell main body 111.

For example, the fulcrum section 168 contacts the stopper sleeve 230. Furthermore, for example, the fulcrum section 168 abuts against the stopper sleeve 230 even in a state in which the operating section 165 is not pressed toward the inner side of the outer shell main body 111.

The fixing section 169 is provided in the lower end portion of the engagement member 160 to fix the engagement member 160 to the outer shell main body 111. In other words, the fixing sections 169 of the two engagement members 160 are coupled via the outer shell main body 111 in the circumferential direction of the outer shell main body 111.

The deformation section 166 and the posture adjustment section 167 of the engagement member 160 having the above arrangement have such a strength that buckling deformation is not caused by a force in the direction in which the container connector 20 is pulled out of the equipment connector 100, which is assumed in normal use.

As shown in FIG. 2, the air bag 152 is stored in the air bag storage section 150. The air bag 152 is made of a thin-film resin material that can easily be deformed along the flow of air in and out of the air bag 152. The pressure in the container 1 can be adjusted by the deformation of the air bag 152. The air bag 152 has a volume that is equal to or more than the volume of the barrel 8 of the syringe 7.

The air bag 152 is fixed to the end surface 148 of the flange 147 of the extending section 142 of the inner sleeve 140. The air bag 152 is fixed to the end surface 148 by, for example, bonding. The air bag 152 communicates with the interior of the outer shell main body 111 via the extending section 142. Note that when unused, the air bag 152 is stored in a folded state in the air bag storage section 150. FIG. 2 shows the air bag 152 in the folded state.

Since the end surface 148 of the gas needle fixing section 144 of the inner sleeve 140 is constituted as a flat surface that is inclined in the vertical direction and has the upper end **148*b* located closer to the center of the air bag storage section 150 than the lower end 148*a*, the upper end of the air bag 152 in the folded state is located close to the center of the air bag storage section 150, as compared to the lower end of the air bag 152 in the folded state. Thus, a sufficient space is provided between the upper end of the air bag 152 in the folded state and the upper surface 150*a* of the inner space of the air bag storage section 150**.

Therefore, the upper end of the air bag 152 in the folded state does not abut against the upper surface of the inner space of the air bag storage section 150. In other words, the end surface 148 of the inner sleeve 140 is constituted as such a surface that the upper end of the air bag 152 in the folded state can be disposed at a position that does not abut against the upper surface of the inner space of the air bag storage section 150, that is, a position closer to the center than the outer peripheral edge of the upper surface.

As shown in FIG. 2, the liquid needle 170 is formed in a tubular shape. The upper end portion of the liquid needle 170 is stored in the liquid needle fixing section 116, and fixed to the liquid needle fixing section 116. The liquid needle 170 constitutes a part of the liquid flow path L1.

In this embodiment, the liquid needle 170 is formed in a cylindrical shape that has a lower end portion 171 closed. The lower end portion 171 is formed as a sharp head. A hole 172 via which the interior of the liquid needle 170 communicates with the outside is formed in the lower end portion of an outer peripheral surface 173 of the liquid needle 170.

The hole 172 is an example of an opening on the tip side of the liquid needle 170. For example, the hole 172 may be disposed on the peripheral surface of the lower end portion of the outer peripheral surface 173. Alternatively, the hole 172 may be formed in the lower end portion of the liquid needle 170, that is, the portion formed as the sharp head. That is, the hole 172 need only be disposed on the tip side of the liquid needle 170.

The gas needle 175 is configured so that the gas can flow. For example, the gas needle 175 has an arrangement similar to that of the liquid needle 170. The arrangement of the gas needle 175 having a function similar to that of the liquid needle 170 is denoted by the same reference numeral as in the liquid needle 170 and a description thereof will be omitted. An end portion of the gas needle 175 is fixed to the gas needle fixing section 144 of the inner sleeve 140.

The position of the hole 172 of the gas needle 175 in the vertical direction is arranged at the same position as that of the hole 172 of the liquid needle 170 in the vertical direction. Furthermore, in this embodiment, the position of the lower end of the gas needle 175 in the vertical direction is arranged at the same position as that of the lower end of the liquid needle 170 in the vertical direction. Therefore, as will be described later, along with the movement of the head sleeve 180 in the outer shell 110, the gas needle 175 extends through the needle seal 200 at the same timing as that of the liquid needle 170. In addition, the hole 172 of the gas needle 175 intrudes into the container seal 90 at the same timing as that of the liquid needle 170.

Each of the liquid needle 170 and the gas needle 175 has such a length that its lower end is disposed in the needle seal 200 in a state in which the head sleeve 180 is disposed at the lower end of a movement range in the outer shell main body 111. That is, each of the needle 170 and the gas needle 175 has such a length that the holes 172 of the liquid needle 170 and the gas needle 175 are disposed in the needle seal 200 and thus sealed with the needle seal 200.

As shown in FIGS. 1, 2, and 3, the head sleeve 180 is formed in a tubular shape that can move in the outer shell main body ill. As shown in FIGS. 35, 36, 37, 38, 39, and 40, the head sleeve 180 includes a head sleeve main body 181 and the second guiding protrusion 182. For example, the head sleeve main body 181 is formed in a cylindrical shape that movably fits in the inner peripheral surface of the barrel section 117.

The head sleeve main body 181 is formed in a cylindrical shape that movably fits in the inner peripheral surface of the inner sleeve 140. In the lower end portion of an outer peripheral surface 183 of the head sleeve main body 181, a first arm storage recess 185 that can store a part of the first arm 231 (to be described later) of the stopper sleeve 230 and a second arm storage recess 186 that can store a part of a second arm 232 (to be described later) of the stopper sleeve 230 are formed.

The first arm storage recess 185 is formed in a shape obtained by denting a part of the outer peripheral surface 183 inward in the radial direction. The first arm storage recess 185 is formed in a shape having a depth in the radial direction that gradually increases from the lower end to the upper end. For example, a plurality of first arm storage recesses 185 are formed. In this embodiment, two first arm storage recesses 185 are formed. The two first arm storage recesses 185 are disposed at positions 180° away from each other in the circumferential direction of the head sleeve main body 181.

The second arm storage recess 186 is formed in a shape obtained by denting a part of the outer peripheral surface 183 inward in the radial direction. The second arm storage recess 186 is formed in a shape having a depth in the radial direction that gradually increases from the lower end to the upper end. For example, a plurality of second arm storage recesses 186 are formed. In this embodiment, two second arm storage recesses 186 are formed. The two second arm storage recesses 186 are disposed at positions 90° away from the first arm storage recesses 185 in the circumferential direction of the head sleeve main body 181, respectively.

Furthermore, a fixing protrusion storage recess 187 that stores a fixing protrusion 236 (to be described later) of the stopper sleeve 230 is formed in the lower end portion of the outer peripheral surface 183. The fixing protrusion storage recess 187 is formed in a shape obtained by denting a part of the outer peripheral surface 183 inward in the radial direction.

The fixing protrusion storage recess 187 includes an inlet 188 which is open to the lower end of the head sleeve main body 181 and through which the fixing protrusion 236 passes when the stopper sleeve 230 is fixed to the head sleeve 180, and a holder 189 extending in the circumferential direction of the head sleeve main body 181 and holding the fixing protrusion 236 intruding through the inlet 188. The holder 189 communicates with the inlet 188, and is formed above the inlet 188. The holder 189 is formed in a shape longer than the inlet in the circumferential direction of the head sleeve main body 181.

For example, a plurality of fixing protrusion storage recesses 187 formed in this way are formed. In this embodiment, four fixing protrusion storage recesses 187 are formed. The four fixing protrusion storage recesses 187 are arranged at equal intervals in the circumferential direction of the head sleeve main body 181, and each fixing protrusion storage recess 187 communicates with the first arm storage recess 185 or the second arm storage recess 186.

The second guiding protrusion 182 is formed in a middle portion of the outer peripheral surface 183 in the axial direction. The second guiding protrusion 182 is stored in the second guide groove 127 of the barrel section 117. Furthermore, the second guiding protrusion 182 is formed to be movable in the second guide groove 127.

For example, a plurality of second guiding protrusions 182 are formed. In this embodiment, two second guiding protrusions 182 are formed. Each of the two second guiding protrusions 182 is disposed at a position 45° away from the first arm storage recess 185 in the circumferential direction of the head sleeve 180. Each second guiding protrusion 182 is formed in, for example, a rectangular parallelepiped shape. The height positions of the two second guiding protrusions 182 from the lower end of the head sleeve main body 181 are different from each other. More specifically, one of the second guiding protrusions 182 is disposed on the upper end side of the head sleeve main body 181, and the other second guiding protrusion 182 is disposed on the lower end side of the head sleeve main body.

As shown in FIGS. 38, 39, and 40, a partition section 191 is formed on an inner peripheral surface 190 of the head sleeve main body 181. The partition section 191 divides the inner space of the head sleeve main body 181 into two parts in the vertical direction. The partition section 191 is formed in a middle portion of the inner peripheral surface 190 in the axial direction. The partition section 191 is formed in a wall shape that protrudes inward from the inner peripheral surface 190. In the partition section 191, a hole 192 in which a part of the needle seal 200 is disposed is formed. The hole 192 is formed in, for example, an elliptic shape.

On an upper surface 193 of the partition section 191, a guide 194 that guides the movement of the liquid needle 170 and the gas needle 175 with respect to the needle seal 200 is provided. The guide 194 includes a guide main body 195 and a support section 196 that supports the guide main body 195 at the upper surface 193.

The guide main body 195 is formed in, for example, a parallelepiped shape, and includes a hole 197 in which a part of the liquid needle 170 fixed to the liquid needle fixing section 116 is disposed, and a hole 198 in which a part of the gas needle 175 fixed to the gas needle fixing section 144 is disposed. The holes 197 and 198 extend through the guide main body 195.

The hole 197 is formed as a hole in which the liquid needle 170 can relatively move with respect to the head sleeve 180. More specifically, the inner diameter of the hole 197 is set to a diameter larger than the outer diameter of the liquid needle 170 so that the liquid needle 170 can move. The upper end portion of the hole 197 is formed as a hole having a diameter that gradually increases toward the upper end.

The hole 198 is formed as a hole in which the gas needle 175 can relatively move with respect to the head sleeve 180. More specifically, the inner diameter of the hole 198 is set to a diameter larger than the outer diameter of the gas needle 175 so that the gas needle 175 can move. The upper end portion of the hole 198 is formed as a hole having a diameter that gradually increases toward the upper end.

As shown in FIG. 38, the support section 196 is formed on each of the two sides of the hole 192. Each support section 196 is formed in a pillar shape extending in the axial direction. Each support section 196 is fixed to the guide main body 195. The support sections 196 fix the guide main body 195 to a position where there is a gap with respect to the upper surface 193 and the holes 197 and 198 face the hole 192 of the partition section 191 in the axial direction.

As shown in FIG. 27, the needle seal 200 is fixed to the hole 192. The needle seal 200 is made of a resin such as rubber or elastomer, and is formed to be able to liquid-tightly and air-tightly seal, by resilience, the holes formed by the liquid needle 170 and the gas needle 175 after the liquid needle 170 and the gas needle 175 are moved.

More specifically, the needle seal 200 includes a first portion 201 disposed on the guide main body 195 side of the partition section 191 in the hole 192, a second portion 202 disposed in the hole 192, and a third portion 203 disposed on the other side of the partition section 191.

The first portion 201 is formed in, for example, an elliptic pillar shape that abuts against the lower surface of the guide main body 195 and the two support sections 196. For example, a recess is formed on the upper surface of the first portion 201 as a target for inserting each of the liquid needle 170 and the gas needle 175 at the time of an assembly operation of the equipment connector 100. The first portion 201 is formed in a shape whose cross section orthogonal to the axial direction is larger than the cross section of the second portion 202 orthogonal to the axial direction.

The second portion 202 is formed in an elliptic pillar shape that fits in the hole 192. The third portion 203 is formed in, for example, a columnar shape. The third portion 203 is formed in a shape whose cross section orthogonal to the axial direction is larger than the cross section of the second portion 202 orthogonal to the axial direction. A lower end surface 204 of the third portion 203 is constituted as a surface that seals a space with respect to the upper end surface 95 of the container seal 90 when the upper end surface 95 abuts against the lower end surface 204.

As shown in FIG. 3, the stopper sleeve 230 is fixed to the outer peripheral surface of the head sleeve 180. The stopper sleeve 230 is formed to be able to selectively regulate the movement of the head sleeve 180 with respect to the outer shell 110 and selectively fix the head sleeve 180 to the seal cap 70.

More specifically, as shown in FIGS. 41, 42, and 43, the stopper sleeve 230 includes the first arm 231 formed to be engageable with the locking protrusion 128 of the barrel section 117, the second arm 232 that can engage with the locking recess 77 of the seal cap 70, and a coupling section 233 that couples the first arm 231 and the second arm 232 to each other.

Figure 48:
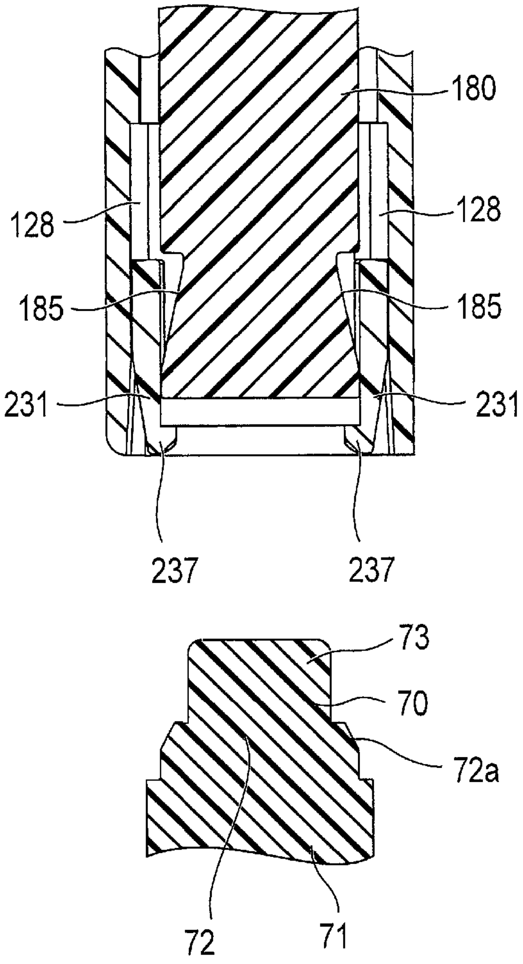
FIG. 48 is an explanatory view for explaining connection between the equipment connector and the container connector.
Figure 49:
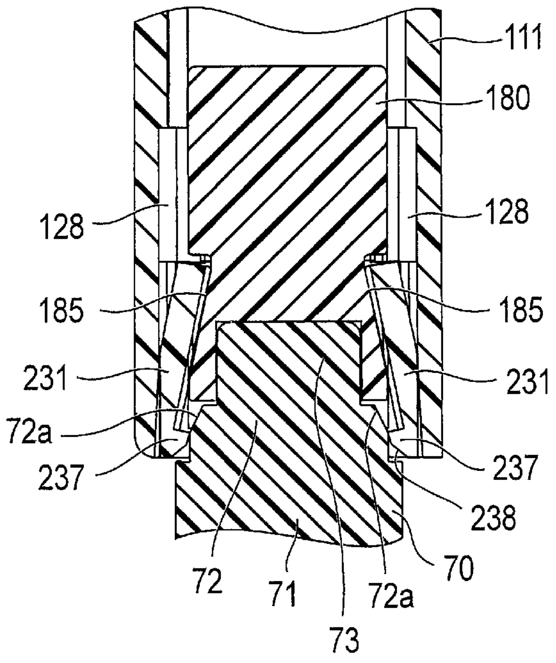
FIG. 49 is an explanatory view for explaining the connection between the equipment connector and the container connector.

As shown in FIGS. 48 and 49, the first arm 231 is formed to be engageable with the locking protrusion 128 in a state in which the head sleeve 180 is located in the lower end portion in the outer shell 110. The first arm 231 engages with the locking protrusion 128 to prevent the head sleeve 180 from moving upward in the outer shell 110. More specifically, as shown in FIGS. 41, 48, and 49, the first arm 231 is formed in a plate shape long in the axial direction of the head sleeve 180 in a state in which the first arm 231 is fixed to the outer peripheral surface of the head sleeve 180. In a central portion of a surface 235, facing the head sleeve 180, of the first arm 231, the fixing protrusion 236 is formed. The upper end surface of the first arm 231 is formed to be able to abut against the locking protrusion 128 from the lower side to the upper side. The upper end surface is formed as, for example, a flat surface.

In the lower end portion of the surface 235 of the first arm 231, a first arm protrusion 237 is formed. A lower end surface 238 of the first arm protrusion 237 is formed to be able to abut against the upper end portion 72*a* formed as a conical surface of the outer peripheral surface of the seal cap intermediate diameter section 72 of the seal cap 70. The lower end surface 238 is formed as an inclined surface that is inclined with respect to the axis of the head sleeve 180 in a state in which the stopper sleeve 230 is fixed to the head sleeve 180.

Furthermore, the first arm protrusion 237 is formed to be able to release the engagement between the first arm 231 and the locking protrusion 128 when the lower end surface 238 abuts against the upper end portion 72*a* formed as the conical surface of the outer peripheral surface of the seal cap intermediate diameter section 72 to rotate the first arm 231 so that its upper end surface moves toward the head sleeve 180. For example, a plurality of first arm protrusions 237 are formed. In this embodiment, two first arm protrusions 237 are formed. For example, a plurality of first arms 231 are formed. In this embodiment, two first arms 231 are formed.

Figure 51:
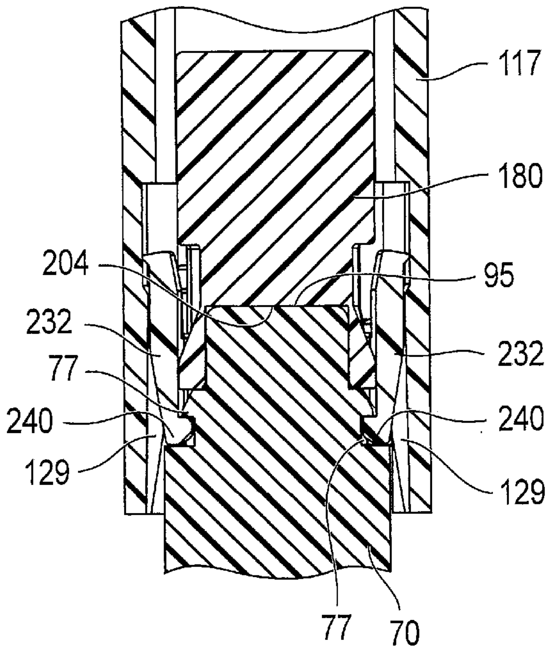
FIG. 51 is an explanatory view for explaining the connection between the equipment connector and the container connector.

As shown in FIGS. 41, 50, and 51, the second arm 232 is formed to be able to maintain a state in which the upper end surface 95 of the container seal 90 is in tight contact with the lower end surface 204 of the third portion 203 of the needle seal 200 when the second arm 232 engages with the seal cap 70 to cause the seal cap small diameter section 73 to fit in the head sleeve 180.

More specifically, as shown in FIG. 41, the second arm 232 is formed in a plate shape long in the axial direction of the head sleeve 180 in a state in which the second arm 232 is fixed to the outer peripheral surface of the head sleeve 180. A second arm protrusion 240 that can engage with the locking recess 77 of the seal cap 70 is formed in the lower end portion of a surface 239 of the second arm 232 on the side of the head sleeve 180.

An upper surface 241 of the second arm protrusion 240 is formed to be engageable with the locking recess 77 of the seal cap 70. A lower end surface 242 of the second arm protrusion 240 is formed as an inclined surface that is inclined with respect to the axis of the head sleeve 180 in a state in which the stopper sleeve 230 is fixed to the head sleeve 180.

The fixing protrusion 236 is formed in the central portion of the surface 239. A surface 243 of the second arm 232 on the opposite side of the head sleeve 180 is formed to be able to abut against the unlocking protrusion 129 of the barrel section 117.

More specifically, the second arm 232 is formed in such a shape with a substantially trapezoidal cross section that the central portion of the surface 243 in the circumferential direction protrudes outward. The second arm 232 is formed so that a central portion 243*a* of the surface 243 in the circumferential direction can abut against the unlocking protrusion 129. The central portion 243*a* is formed to be able to release the engagement between the second arm protrusion 240 and the locking recess 77 when the central portion 243*a* abuts against the unlocking protrusion 129 to rotate the second arm 232 so that the second arm protrusion 240 moves away from the head sleeve 180 to move the second arm protrusion 240 outside the locking recess 77. Furthermore, for example, a plurality of second arms 232 are formed. In this embodiment, two second arms 232 are formed.

In the second arm 232 formed in this way, as shown in FIG. 48, the head sleeve 180 is disposed on the lower side in the outer shell main body 111 and the first arm 231 engages with the locking protrusion 128. In this state, as shown in FIG. 50, the middle portion (a portion that protrudes most inward in the radial direction of the barrel section 117) of the unlocking protrusion 129 in the axial direction of the barrel section 117 abuts against the upper portion of the central portion 243*a* of the surface 243, and thus second arm 232 is rotated to a position where the second arm protrusion 240 disengages from the locking recess 77 of the seal cap 70.

Furthermore, when the stopper sleeve 230 moves upward to move the second arm 232 upward with respect to the unlocking protrusion 129, the middle portion that is the most protruding portion of the unlocking protrusion 129 abuts against the lower end portion of the central portion 243*a* of the surface 243 of the second arm 232.

The second arm 232 is formed to be rotatable to a position where the second arm protrusion 240 engages with the locking recess 77 of the seal cap 70 by abutment of the unlocking protrusion 129 against the lower end portion of the second arm 232 and resilience of the coupling section 233.

The coupling section 233 couples the first arm 231 and the second arm 232 to each other. As shown in FIGS. 1 and 3, the fulcrum section 168 of the engagement member 160 abuts against the coupling section 233. The coupling section 233 has flexibility, and is formed to be twisted to make the first arm 231 and the second arm 232 rotatable. The coupling section 233 disposes the first arm 231 at a position where the first arm 233 can engage with the locking protrusion 128 in a state in which no external force is applied to the first arm 231. The coupling section 233 disposes the second arm 232 at a position where the second arm 232 can engage with the locking recess 77 of the seal cap 70 in a state in which no external force is applied to the second arm 232.

The stopper sleeve 230 having the above arrangement is formed in an annular shape in which the first arm 231 and the second arm 232 are alternately disposed in the circumferential direction. The first arm 231 and the second arm 232 are disposed apart in the circumferential direction.

The stopper sleeve 230 having the above arrangement is rotated by a predetermined angle in the circumferential direction after the fixing protrusion 236 is inserted from the inlet 188 of the fixing protrusion storage recess 187 of the head sleeve main body 181 in the axial direction of the head sleeve main body 181 and intruded into the holder 189. This rotation disposes the fixing protrusion 236 at a position which is not aligned with the inlet 188, and thus the fixing protrusion 236 does not slip off from the inlet 188. Therefore, the stopper sleeve 230 is fixed to the head sleeve 180.

Furthermore, as described above, in a state in which the fixing protrusion 236 is stored in the holder 189, the first arm 231 faces the first arm storage recess 185, and the second arm 232 faces the second arm storage recess 186.

When the first arm 231 faces the first arm storage recess 185, a part of the upper portion of the first arm 231 is stored in the first arm storage recess 185 during rotation. That is, the first arm storage recess 185 is a part of a movement margin when the first arm 231 rotates, and thus the first arm 231 can rotate to a position where the engagement between the upper end of the first arm 231 and the locking protrusion 128 is released. When the second arm 232 faces the second arm storage recess 186, a part of the upper portion of the second arm 232 is stored in the second arm storage recess 186 during rotation. That is, the second arm storage recess 186 is a part of a movement margin when the second arm 232 rotates, and thus the second arm 232 can rotate to a position where the second arm protrusion 240 disengages from the locking recess 77.

As shown in FIG. 2, the urging member 250 is stored in the outer shell main body 111, and configured to be able urge the head sleeve 180 downward. More specifically, the urging member 250 is stored above the partition section 191 in the head sleeve 180. The urging member 250 is, for example, a coil spring. One end of the urging member 250 abuts against the inner sleeve 140. The other end of the urging member 250 abuts against the partition section 191. The urging member 250 is configured to be compressed in a state in which the head sleeve 180 is located at the lowermost end of the movement range of the outer shell main body 111.

Furthermore, an urging section 118 is formed in the barrel section 117 of the outer shell main body 111. The urging section 118 is configured to be able to press the second arm 232 of the stopper sleeve 230 engaging with the locking recess 77 of the seal cap 70 in an engagement direction with the locking recess 77. That is, the urging section 118 is configured to urge the second arm 232 so as to strengthen the engagement between the second arm 232 and the locking recess 77.

More specifically, in the barrel section 117, the urging section 118 is provided at the edge of the hole 117*a* formed at a position facing the second arm 232 of the stopper sleeve 230 that is disposed at the lower end.

Next, an operation of connecting the container connector 20 to the container 1 will be described.

An example of the operation of connecting the container connector 20 to the container 1 will be described with reference to FIG. 11. FIG. 12 shows a state in which the container connector 20 is cut along the second virtual flat plane P2. In FIG. 11, the base 41, the needle member 60, and the seal cap 70 of the container connector 20 are not illustrated.

As shown in FIG. 11, the operator places the container 1 on a working table 9. After placing the container 1 on the working table 9, the operator makes the tip of the needle section 62 of the needle member 60 abut against the center of the upper surface of the plug 6 of the container 1. After making the tip of the needle section 62 abut against the center of the upper surface of the plug 6, the operator presses the needle section 62 into the container 1 by moving the container connector 20 toward the container 1.

When the needle section 62 is pressed into the container 1 by a predetermined amount, the guide surface 54 of each of the two engaging sections 43 of the container connector 20 contacts the outer peripheral portion of the flange 5 of the container 1. When the guide surface 54 is formed in a V shape, the guide surface 54 abuts against the flange 5 at two points. Therefore, the container connector 20 abuts against the container 1 at four points.

When the guide surface 54 of each of the two engaging sections 43 is brought into contact with the flange 5 of the container 1, the operator further pressed the container connector 20 downward. When the container connector 20 is further pressed downward, each of the two engaging sections 43 receives a force from the contact A with the container 1 in a direction away from the axis C3 of the circle X. This force is a component, which acts in a direction orthogonal to the axis C3 of the circle X, of a reaction received from the flange 5 of the container 1 by pressing the container connector 20 downward.

When each of the two engaging sections 43 receives the force in the direction away from the axis C3 of the circle X, the two arms 42 are bent. When the arms 42 are bent, the engaging sections 43 move in the directions away from the axis C3 mainly about the folded portions 51 of the arms 42, respectively. This movement spreads the two engaging sections 43, thereby changing the postures of the engaging sections 43 with respect to the axis C3 of the circle X.

Note that even if the postures of the engaging sections 43 change, the increase amount of the inclination angle $\alpha$, with respect to the first virtual flat plane P1, of the tangent S at each of the contacts A of the four guide surfaces 54 from the time of start of the operation of pressing the container connector 20 into the container 1 is small. Therefore, the operator can press the container connector 20 by an almost constant force.

When the container connector 20 is pressed to a predetermined position in the container 1, each of the two engaging sections 43 is pressed and spread to a position where the abutment section 53 of each of the two engaging sections 43 contacts the outer peripheral edge of the flange 5 of the container 1.

When the container connector 20 is further pressed downward, the abutment section 53 of each of the two engaging sections 43 contacts the outer peripheral surface of the flange 5 of the container 1. When the container connector 20 is further pressed downward, the abutment section 53 of each of the two engaging sections 43 moves downward on the outer peripheral surface of the flange 5 of the container 1.

When the abutment section 53 of each of the two engaging sections 43 moves to a position facing the neck 4 of the container 1 by further pressing the container connector 20 downward, each of the two engaging sections 43 moves toward the neck 4 by resilience of the arm 42, and thus the abutment section 53 abuts against the neck 4. When the shape of the cross section of the engaging section 43 orthogonal to the axis C3 is a V shape, the abutment section 53 abuts against the neck 4 at two points. That is, the neck 4 is supported at four points. When the abutment section 53 abuts against the neck 4, the engaging section 43 is engaged with the neck 4.

Next, an operation of connecting the equipment connector 100 and the container connector 20 to each other to form the liquid flow path L1 and the gas flow path L2 will be described with reference to FIGS. 48, 49, 50, 51, 52, 53, and 54. Note that in FIGS. 48, 49, 50, 51, 52, 53, and 54, some of components other than the first arm 231 and the second arm 232 are not illustrated or are simplified.

As shown in FIG. 48, in a state in which the equipment connector 100 is not connected to the container connector

20, the head sleeve 180 is located in the lower end portion in the outer shell 110. Furthermore, the first arm 231 of the stopper sleeve 230 engages with the locking protrusion 128. As shown in FIG. 50, the second arm 232 of the stopper sleeve 230 abuts against the unlocking protrusion 129 of the barrel section 117, and is rotated to a position where the second arm protrusion 240 disengages from the locking recess 77 of the seal cap 70. A part of the second arm 232 is stored in the second arm storage recess 186 of the head sleeve 180.

Furthermore, a portion where the hole 172 of the liquid needle 170 is formed and a portion where the hole 172 of the gas needle 175 is formed are disposed in the needle seal 200. That is, the hole 172 of the liquid needle 170 and the hole 172 of the gas needle 175 are sealed with the needle seal 200, and are air-tightly and liquid-tightly sealed.

Next, as shown in FIGS. 49 and 50, the seal cap small diameter section 73 of the seal cap 70 is inserted into the head sleeve 180. Before the upper end surface 95 of the container seal 90 is brought into tight contact with the lower end surface 204 of the needle seal 200, the lower end surface 238 of the first arm protrusion 237 of the first arm 231 of the stopper sleeve 230 abuts against the upper end portion 72*a* constituted as the conical surface of the outer peripheral surface of the seal cap intermediate diameter section 72. The upper end surface 95 of the container seal 90 which is formed as the curved surface is pressed and deformed by the lower end surface 204 of the needle seal 200, and is thus brought into tight contact with the lower end surface 204.

When the equipment connector 100 is further lowered from this state, the first arm protrusion 237 is guided by the upper end portion 72*a* and moved outward in the radial direction, as shown in FIG. 49. Along with the movement of the first arm protrusion 237 outward in the radial direction, the first arm 231 rotates. In the state in which the upper end surface 95 of the container seal 90 is in tight contact with the lower end surface 204 of the needle seal 200, the first arm 231 is guided by the upper end portion 72*a* constituted as the conical surface and rotated to the position where the engagement with the locking protrusion 128 is released. At this time, a part of the first arm 231 is stored in the first arm storage recess 185 of the head sleeve 180. When the engagement between the first arm 231 and the locking protrusion 128 is released, the head sleeve 180 can be moved upward in the outer shell main body 111.

At this time, as shown in FIG. 50, when the equipment connector 100 is lowered until the upper end surface 95 of the container seal 90 is brought into tight contact with the lower end surface 204 of the needle seal 200, the second arm protrusion 240 of the second arm 232 faces the locking recess 77.

When the equipment connector 100 is further lowered, the container connector 20 and the head sleeve 180 integrally move upward in the outer shell main body 111. When the head sleeve 180 moves upward in the outer shell main body 111, the liquid needle 170 and the gas needle 175 relatively move downward with respect to the needle seal 200.

When the equipment connector 100 is further lowered, the container connector 20 and the head sleeve 180 further move upward in the outer shell main body 111. Thus, the liquid needle 170 and the gas needle 175 extend through the needle seal 200 and pierce the container seal 90. Note that a gap between the liquid needle 170 and the container seal 90 is liquid-tightly and air-tightly sealed when the container seal 90 is brought into tight contact with the liquid needle 170. Similarly, a gap between the gas needle 175 and the container seal 90 is sealed when the container seal 90 is brought into tight contact with the gas needle 175.

In a state in which the liquid needle 170 and the gas needle 175 extend through the needle seal 200, the second arm 232 moves upward with respect to the unlocking protrusion 129. In this process of the upward movement of the second arm 232 with respect to the unlocking protrusion 129, the abutment position of the middle portion of the unlocking protrusion 129 in the central portion 243*a* of the surface 243 of the second arm 232, which protrudes most inward in the radial direction of the outer shell main body 111, moves downward. The downward movement of the abutment position decreases an urging force for urging the second arm protrusion 240 outward in the radial direction of the outer shell main body 111.

In the state in which the liquid needle 170 and the gas needle 175 extend through the needle seal 200, as shown in FIG. 51, the second arm 232 urged inward in the radial direction by the abutment against the unlocking protrusion 129 of the barrel section 117 is released, and the second arm 232 is rotated by the elastic force (resilience) of the coupling section 233 and the abutment of the second arm protrusion 240 against the lower end portion of the second arm 232 to engage the second arm protrusion 240 with the locking recess 77. That is, the stopper sleeve 230 and the seal cap 70 are fixed to each other before the liquid needle 170 extends through the needle seal 200.

Figure 52:
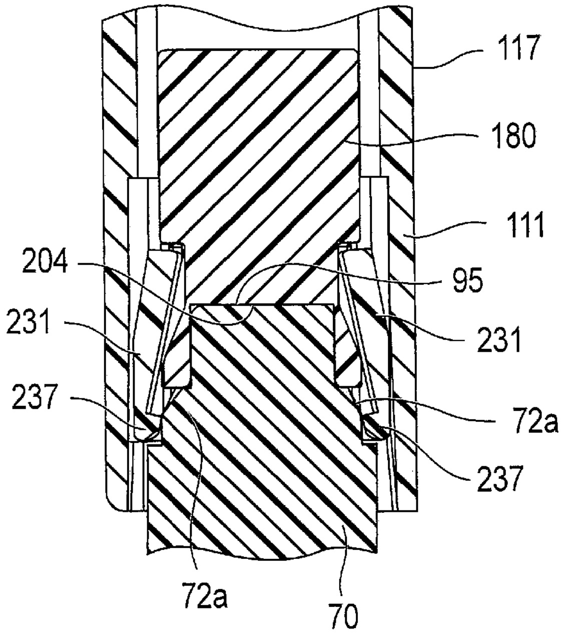
FIG. 52 is an explanatory view for explaining the connection between the equipment connector and the container connector.

In the state in which the second arm protrusion 240 of the second arm 232 engages with the locking recess 77, as shown in FIG. 51, the first arm protrusion 237 of the first arm 231 is maintained in a state in which it abuts against the outer peripheral surface of the seal cap intermediate diameter section 72 of the seal cap 70, as shown in FIG. 52.

When the equipment connector 100 is further lowered, as shown in FIG. 2, the liquid needle 170 and the gas needle 175 extend through the container seal 90, the hole 172 of the liquid needle 170 is disposed in the liquid flow path constituting portion L3, and the hole 172 of the gas needle 175 is disposed in the gas flow path constituting portion L4.

When the hole 172 of the liquid needle 170 is disposed in the portion L3, the liquid flow path constituting portion L3 of the container connector 20 communicates with the liquid needle 170. When the liquid flow path constituting portion L3 communicates with the liquid needle 170, the liquid flow path L1 is formed. When the hole 172 of the gas needle 175 is disposed in the portion L4, the gas flow path constituting portion L4 of the container connector 20 communicates with the gas needle 175. When the gas flow path constituting portion L4 communicates with the gas needle 175, the gas flow path L2 is formed.

Figure 53:
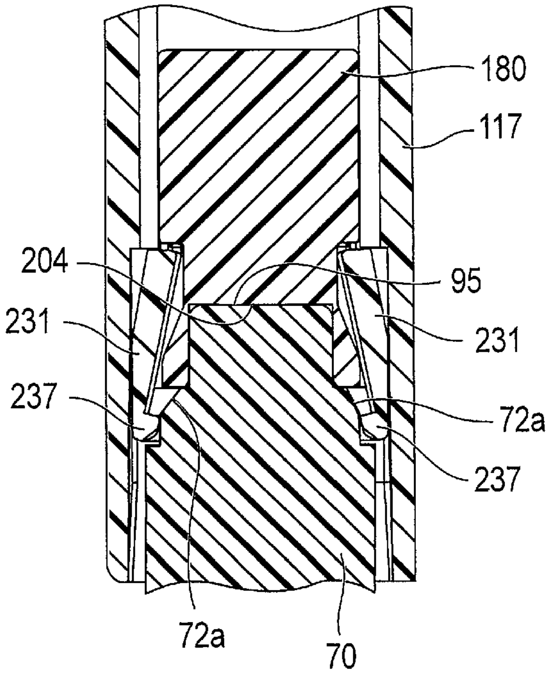
FIG. 53 is an explanatory view for explaining the connection between the equipment connector and the container connector.
Figure 54:
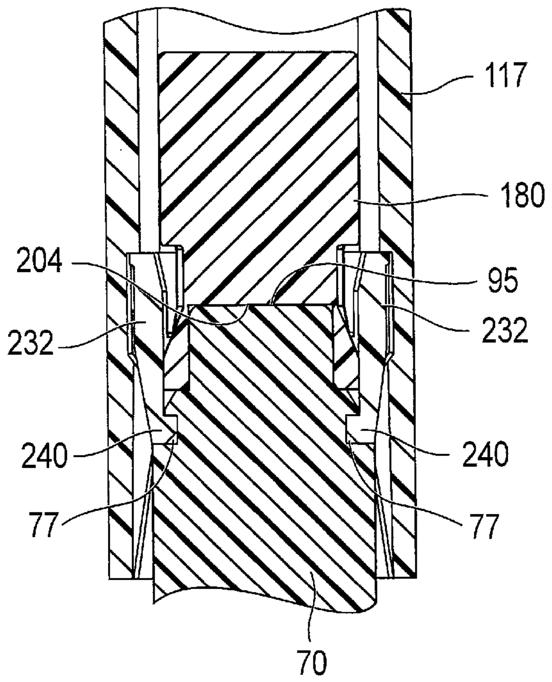
FIG. 54 is an explanatory view for explaining the connection between the equipment connector and the container connector.

When the equipment connector 100 is further lowered, as shown in FIGS. 53 and 54, the first guiding protrusion 75 abuts against the upper end of the first guide groove 126. Furthermore, the second guiding protrusion 182 abuts against the upper end of the second guide groove 127. The abutment of these components regulates the movement of the head sleeve 180 and the container connector 20 in the outer shell main body 111. That is, the equipment connector 100 is lowered to a so-called bottom reached state.

The operator recognizes that the equipment connector 100 is lowered to reach the bottom and the liquid flow path L1 and the gas flow path L2 are accordingly formed. When the equipment connector 100 is lowered to reach the bottom, the operator operates the syringe 7 to collect the chemical solution from the container 1. The solution is moved from the container 1 to the syringe 7 through the liquid flow path L1.

Next, an operation of separating the container connector 20 from the equipment connector 100 will be described. When separating the container connector 20 from the equipment connector 100, the operator presses the operating section 165 of the engagement member 160 inward in the radial direction to a position where the engagement between the engaging section 161 and the engaged section 78 of the seal cap 70 is released.

Next, the operator pulls the equipment connector 100 upward. The head sleeve 180 is fixed to the seal cap 70 by the second arm 232 of the stopper sleeve 230. Therefore, when the equipment connector 100 is pulled upward, the outer shell 110, the liquid needle 170, and the gas needle 175 move upwardly with respect to the head sleeve 180 and the needle seal 200.

When the outer shell 110, the liquid needle 170, and the gas needle 175 move upward with respect to the head sleeve 180 and the needle seal 200, the liquid needle 170 and the gas needle 175 move upward in the container seal 90. When the equipment connector 100 is pulled upward by a predetermined distance, the liquid needle 170 and the gas needle 175 are pulled out of the container seal 90. The container seal 90 liquid-tightly and air-tightly seals, by the resilience, the holes formed by the liquid needle 170 and the gas needle 175. Furthermore, the hole 172 of the liquid needle 170 is sealed with the needle seal 200. The hole 172 of the gas needle 175 is sealed with the needle seal 200.

Furthermore, when the liquid needle 170 and the gas needle 175 are pulled out of the container seal 90 and then the equipment connector 100 is further pulled upward by the predetermined distance, the second arm 232 is rotated by the unlocking protrusion 129 of the barrel section 117 to move the second arm protrusion 240 of the second arm 232 outward in the radial direction from the locking recess 77, thereby releasing the engagement between the second arm protrusion 240 and the locking recess 77. That is, the stopper sleeve 230 and the seal cap 70 are unlocked.

In this state, the portion in which the hole 172 of the liquid needle 170 is formed and the portion in which the hole 172 of the gas needle 175 is formed are stored in the needle seal 200, and both the holes 172 are sealed with the needle seal 200. The needle seal 200 liquid-tightly and air-tightly seals, by the resilience, the holes formed by the liquid needle 170 and the gas needle 175.

Note that the hole 172 of the liquid needle 170 and the hole 172 of the gas needle 175 move out of the container seal 90 at the same timing, and are stored in the needle seal 200 at the same timing.

As described above, the liquid flow path L1 is divided, the liquid needle 170 that is a portion of the liquid flow path L1 formed in the equipment connector 100 is sealed, and the liquid flow path constituting portion L3 that is a portion of the liquid flow path L1 formed in the container connector 20 is sealed.

Similarly, the gas flow path L2 is divided, the gas needle 175 that is a portion of the gas flow path L2 formed in the equipment connector 100 is sealed, and the gas flow path constituting portion L4 that is a portion of the gas flow path L2 formed in the container connector 20 is sealed.

When the seal cap 70 and the head sleeve 180 are unlocked and then the equipment connector 100 is further pulled upward, the seal cap 70 moves downward with respect to the first arm 231 of the stopper sleeve 230. When the seal cap 70 moves downward with respect to the first arm 231, urging of the first arm 231 by the outer peripheral surface of the seal cap 70 is released.

When the urging of the first arm 231 by the outer peripheral surface of the seal cap 70 is released, the first arm 231 is rotated by the elastic force (the resilience) of the coupling section 233. When the first arm 231 is rotated, the upper end of the first arm 231 is disposed below the locking protrusion 128. That is, the first arm 231 is engageable with the locking protrusion 128.

When the first arm 231 is engageable with the locking protrusion 128, the head sleeve 180 is prevented from moving from a state in which the liquid needle 170 that is the portion of the liquid flow path L1 formed in the equipment connector 100 is sealed, that is, the hole 172 is sealed with the needle seal 200, and the gas needle 175 that is the portion of the gas flow path L2 formed in the equipment connector 100 is sealed, that is, the hole 172 is sealed with the needle seal 200.

Next, the operation of the engagement member 160 at the time of the operation of connecting the equipment connector 100 and the container connector 20 to each other will be described with reference to FIGS. 44, 45, and 46.

In a state in which the container connector 20 is not inserted into the equipment connector 100, as shown in FIG. 44, when the container connector 20 is inserted into the equipment connector 100, as shown in FIG. 45, the engaged section 78 of the seal cap 70 is brought into contact with the lower surface 164 of the engaging section 161.

When the container connector 20 is further inserted into the equipment connector 100, the seal cap 70 moves on the lower surface 164. When the container connector 20 is further inserted into the equipment connector 100, the engaging section 161 rides across the engaged section 78, as shown in FIG. 46. When the engaging section 161 rides across the engaged section 78, the upper surface 162 of the engaging section 161 faces the lower surface 79 of the engaged section 78 in the vertical direction, the upper surface 162 is brought into contact with the lower surface 79, and thus the engagement member 160 engages with the engaged section 78. In the state in which the engaging section 161 engages with the engaged section 78, the fulcrum section 168 abuts against the coupling section 233 of the stopper sleeve 230. When the engagement member 160 engages with the engaged section 78, the state in which the container connector 20 is connected to the equipment connector 100 is fixed.

Next, the operation of the engagement member 160 when separating the container connector 20 from the equipment connector 100 will be described with reference to FIG. 47.

The operator presses the operating section 165 toward the inner side of the outer shell main body 111. When the operating section 165 is pressed toward the inner side of the outer shell main body ill, a moment that acts in a direction in which the engaging section 161 is taken out of the outer shell main body ill is generated in a portion below the fulcrum section 168 of the engagement member 160.

As shown in FIG. 47, this moment bends the deformation section 166 to move the engaging section 161 to a position where the engagement with the engaged section 78 is released. Furthermore, this moment bends the posture adjustment section 167 to move the engaging section 161 to a position where the engagement with the engaged section 78 is released while holding the posture in which the upper surface 162 of the engaging section 161 is orthogonal to the vertical direction. When the engaging section 161 is moved to a position which does not face the engaged section 78 in the vertical direction, the engagement between the engaging section 161 and the engaged section 78 is released.

The engagement member 160 of the equipment connector 100 having the above arrangement has an arrangement in which the operating section 165 is disposed on the opposite side of the fixing section 169 via the engaging section 161. Therefore, when attempting to pull the container connector 20 out of the equipment connector 100, the engaging section 161 is pressed by the engaged section 78 to generate a rotation moment about the fixing section 169, that acts in a direction in which the engagement member 160 is inclined toward the inner side of the outer shell main body 111.

This rotation moment urges the engaging section 161 in an opposite direction of the moving direction for releasing the engagement with the engaged section 78. Therefore, even if the engaging section 161 is urged in the direction in which the container connector 20 is pulled out of the equipment connector 100, the engagement between the engaging section 161 and the engaged section 78 is not released. Furthermore, since the engagement member 160 has the arrangement that includes, between the engaging section 161 and the operating section 165, the fulcrum section 168 abutting against the container connector 20 and includes the deformation section 166 between the fixing section 169 and the engaging section 161, the operating section 165 can be operated by the operation of pressing the operating section 165 toward the inner side of the outer shell main body 111. Thus, the operator need only press the operating section 165 when operating the operating section 165. Therefore, it is possible to improve the operability of the operating section 165.

As described above, with the engagement member 160, it is possible to prevent unlocking by pulling while improving the operability.

Since the engagement member 160 is configured to include the posture adjustment section 167, the upper surface 162 of the engaging section 161 is not inclined when releasing the engagement between the engaging section 161 and the engaged section 78. Therefore, the engaging section 161 can be moved smoothly with respect to the engaged section 78. As a result, the operating force on the operating section 165 to release the engagement between the engaging section 161 and the engaged section 78 can be made small.

Furthermore, since the head sleeve 180 includes the guide 194, it is possible to prevent the inclination of the liquid needle 170 and the gas needle 175 such as the deviation of the axial directions of the needles 170 and 175 from the insertion directions of the needles 170 and 175 with respect to the needle seal 200 at the time of the operation of inserting the needles 170 and 175 into the needle seal 200 in assembly of the equipment connector 100. As a result, it is possible to prevent a gap from being generated between the needle seal 200 and the needles 170 and 175, and thus prevent a decrease in sealing property between the needle seal 200 and the needles 170 and 175.

Furthermore, the outer diameter of the first fitting section 96 is set to a diameter larger than the inner diameter of the opening of the liquid flow path constituting portion L3, and the outer diameter of the second fitting section 97 is set to a diameter larger than the inner diameter of the opening of the gas flow path constituting portion L4. Therefore, the first fitting section 96 and the second fitting section 97 are compressed inward in the radial direction in a state in which they are disposed in the opening of the liquid flow path constituting portion L3 and that of the gas flow path constituting portion L4, respectively. As a result, pressures from the first fitting section 96 and the second fitting section 97, which are generated on the surfaces of the needles 170 and 175, become high. Therefore, when the needles 170 and 175 are pulled out of the container seal 90, it is possible to prevent the chemical solution from leaking outside the container seal 90 by wiping the chemical solution adhering to the surfaces of the needles 170 and 175 by the first fitting section 96 and the second fitting section 97.

Furthermore, the end surface 148 of the flange 147 of the inner sleeve 140 is constituted as such an inclined surface that the upper end 148*b* of the end surface 148 is disposed closer to the center of the air bag storage section 150 than the lower end 148*a*. Thus, it is possible to ensure a wide gap between the upper end of the air bag 152 and the upper surface 150*a* of the interior of the air bag storage section 150. As a result, when the air bag 152 swells, it is possible to prevent the air bag 152 from contacting the upper surface of the interior of the air bag storage section 150, and thus prevent the air bag 152 from coming off from the end surface 148 of the flange 147.

In addition, since the upper surface of the inner space of the air bag storage section 150 is formed in a dome shape protruding upward, the gap between the upper surface of the inner space of the air bag storage section 150 and the upper end of the air bag 152 in the folded state can be made large.

Note that if the fixing section 146 is disposed below the center of the air bag storage section 150 in the vertical direction, the lower end 148*a* of the end surface 148 is disposed closer to the center line of the air bag storage section 150 than the upper end 148*b*. In this arrangement, it is possible to ensure a wide gap between the lower end of the air bag 152 and the bottom surface 150*b* of the inner space of the air bag storage section 150. As a result, when the air bag 152 swells, it is possible to prevent the air bag 152 from contacting the bottom surface 150*b* of the inner space of the air bag storage section 150, and thus prevent the air bag 152 from coming off from the end surface 148 of the flange 147.

Furthermore, the guide surface 54 of the engaging section 43 of the container connector 20 is formed in a fan shape in a bottom view, as shown in FIG. 6. In other words, the other edge 56 of the guide surface 54 is formed in a shape in which the flange 5 of the assumed maximum diameter abuts against the other edge 56. Therefore, it is possible to suppress an increase in the size of the engaging section 43 while increasing the maximum value of the outer diameter of the flange 5 of the container 1 to which the container connector 20 is fixable.

This effect will be described in detail.

Since the other edge 56 of the guide surface 54 is formed in a shape in which the flange 5 of the assumed maximum diameter abuts against the other edge 56, it is possible to prevent the length from the abutment section 53 of the guide surface 54 to the lower end along the axis C3 from increasing. In other words, by increasing the length of the lower end of the guide surface 54 in the circumferential direction of the axis C3, it is possible to increase the maximum value of the diameter of the flange 5 of the connectable container 1.

Furthermore, since the length around the axis C3 of one end or the upper end of the guide surface 54 on the side of the abutment section 53 is shorter than the length around the axis C3 of the lower end of the guide surface 54, it is possible to prevent the engaging section 43 from interfering with the upper end of the outer surface of the barrel section 2 of the container 1. For example, in the arrangement in which the pair of other edges 56 of the guide surface 54 are parallel to each other, it is necessary to set a state in which the guide surface 54 is almost orthogonal to the axis C3 while the abutment section 53 abuts against the neck 4, by increasing the length from the upper end of the guide surface

54 to its lower end. However, in this arrangement, the size of the engaging section 43 is increased.

To the contrary, if the guide surface 54 has a fan shape in the bottom view, as shown in FIG. 6, the length of one end of the guide surface 54 on the side of the abutment section 53 in the circumferential direction is short, and thus the engaging section 43 is difficult to interfere with the barrel section 2 of the container 1. As a result, it is unnecessary to increase the length from the upper end of the guide surface 54 to its lower end, and it is thus possible to suppress an increase in the size of the engaging section 43.

The other edge 56 is formed in the shape in which the flange 5 of the assumed maximum diameter abuts against the other edge 56. Thus, it is possible to increase the distance between the abutment position of the flange 5 of the assumed maximum diameter against the first guide surface constituting portion 54A and the abutment position of the flange 5 of the assumed maximum diameter against the second guide surface constituting portion 54B. Therefore, it is possible to prevent a wobble of the guide surface 54 with respect to the flange 5 in a direction parallel to a line segment connecting two points at which the flange 5 of the guide surface 54 abuts, and thus stabilize the container connector 20 with respect to the container 1 in the process of guiding the flange 5 to the abutment section 53 by the guide surface 54.

When the other edge 56 of the guide surface 54 is formed in the shape in which the flange 5 of the assumed maximum diameter abuts against the other edge 56, it is possible to decrease the distance by which the container connector 20 is pressed along the axis C3 from when the container connector 20 is made to abut against the flange 5 by moving the container connector 20 along the axis C3 until the abutment section 53 is made to engage with the neck 4 of the container 1.

The guide surface 54 is constituted as a curved surface in which the center of curvature of a part of the guide surface 54 constituting a part of the edge of a cross section of the engaging section 43 orthogonal to the axis C3 is located on the side of the first virtual flat plane P1. Therefore, it is possible to increase the gap between the guide surface 54 and the barrel section 2 of the container 1, and thus suppress the guide surface 54 from interfering with the barrel section 2 of the container 1.

Furthermore, the central portion of the abutment section 53 is recessed in the direction away from the other engaging section 43, as compared to other portions of the abutment section 53. Therefore, since the neck 4 having a small outer diameter abuts against the two ends of the recess, it is possible to prevent a decrease in the distance between the two points at which the one abutment section 53 abuts against the neck 4 having the small outer diameter. As a result, it is possible to stabilize the state in which the neck 4 having the small outer diameter is sandwiched by the pair of abutment sections 53.

Next, a container connector 20A according to the second embodiment of the present invention will be described with reference to FIGS. 55 and 56. Note that components having the same functions as in the first embodiment are denoted by the same reference numerals as in the first embodiment and a description thereof will be omitted.

Figure 55:
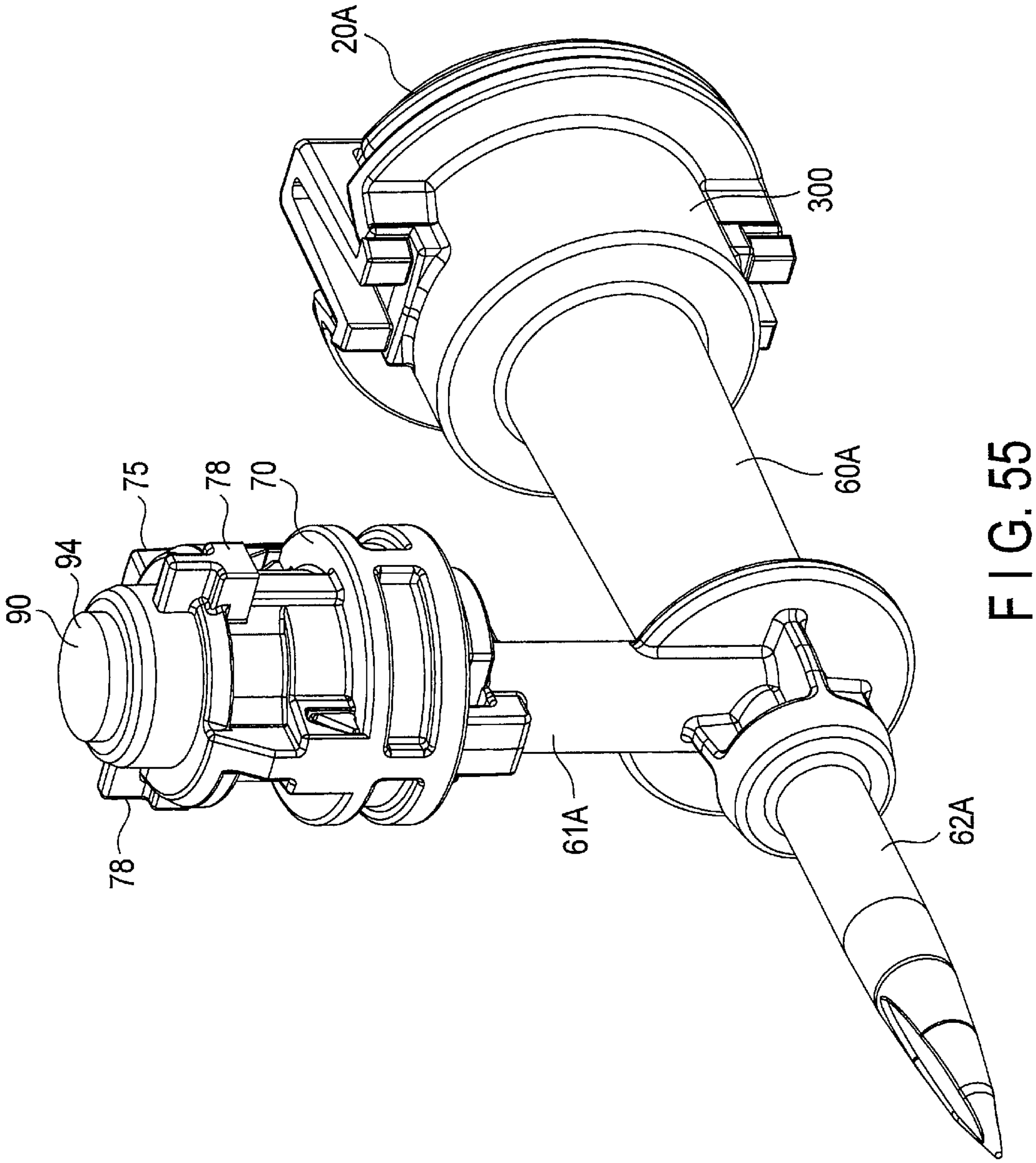
FIG. 55 is a perspective view showing the arrangement of an equipment connector according to the second embodiment of the present invention.

FIG. 55 is a perspective view showing the arrangement of the container connector 20A. FIG. 56 is a sectional view showing the arrangement of the container connector 20A. The container connector 20A is configured to be fixable to an equipment connector having no components associated with the air bag 152 and the gas flow path L2. An example of the equipment connector has an arrangement obtained by eliminating the air bag 152, the air bag storage section 150, the gas needle 175, and the inner sleeve 140 from the equipment connector 100 described in the first embodiment.

Figure 56:
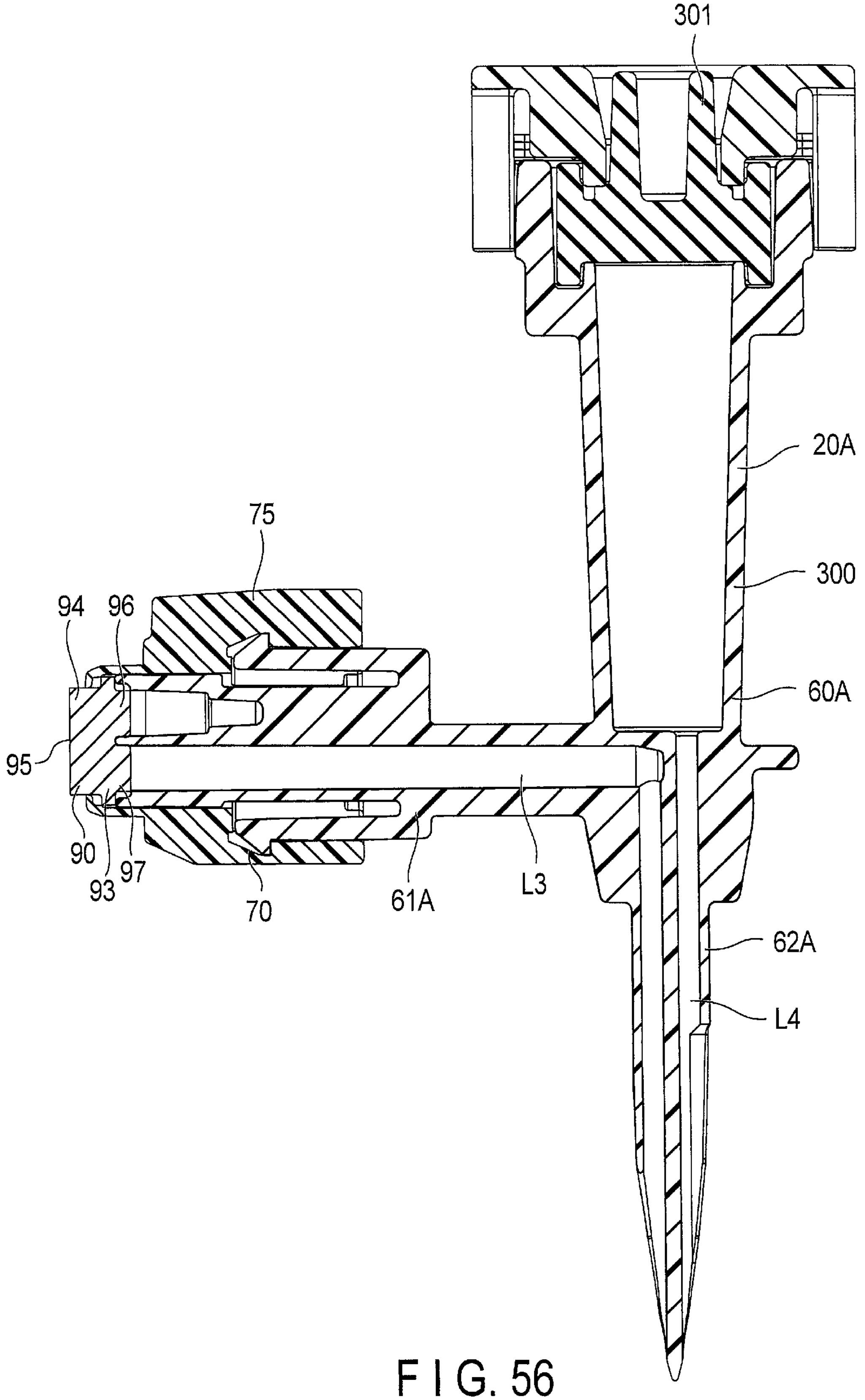
FIG. 56 is a sectional view showing the arrangement of the equipment connector.

As shown in FIGS. 55 and 56, the container connector 20A includes a needle member 60A, a seal cap 70, and a container seal 90.

The needle member 60A includes a needle member base 61A, a needle section 62A, and a tube connecting section 300. For example, the needle section 62A of the needle member 60A is inserted into an infusion bag and connected to it.

The needle member base 61A has an arrangement obtained by eliminating the gas flow path constituting portion L4 from the needle member base 61 described in the first embodiment. The needle section 62A extends in a direction inclined with respect to the needle member base 61A, as a practical example, in a direction orthogonal to the needle member base 61A. The needle section 62 includes a liquid flow path constituting portion L3 and a gas flow path constituting portion L4.

The tube connecting section 300 extends from the needle section 62A. A tube such as a drip infusion tube is connected to the tube connecting section 300. More specifically, the tube connecting section 300 is connected to the tube when a needle provided in the tube and including a flow path is inserted into the tube connecting section 300. The tube connecting section 300 is formed in a tubular shape communicating with the gas flow path constituting portion L4. A plug 301 for closing the opening of the tube connecting section 300 is provided in the opening. The needle of the tube is inserted into the plug 301.

The plug 301 is made of a resin such as rubber or elastomer and has flexibility. The plug 301 is formed to be able to liquid-tightly and air-tightly seal, by resilience, a hole formed when the needle provided in the tube is inserted, after the needle is moved.

Even the container connector 20 of the second embodiment is fixed to the equipment connector by an engagement member 160 similar to that of the equipment connector 100 of the first embodiment.

Note that the arrangement in which the engagement member 160 of the first or second embodiment is provided in the equipment connector 100 has been explained as an example but the present invention is not limited to this. The engagement member 160 may be provided in the first member having an opening, and configured to lock the first member and the second member inserted into the first member through the opening of the first member. In other words, the equipment connector 100 is an example of the first member and the container connector 20 or 20A is an example of the second member.

The first and second embodiments have exemplified the arrangement in which the engagement member 160 includes the posture adjustment section 167 but the present invention is not limited to this. In another example, the engagement member 160 need not include the posture adjustment section 167. In this arrangement, the fulcrum section 168 is continuously formed from the operating section 165 in the axial direction of the barrel section 117. The engaging section 161 is continuously formed from the fulcrum section 168 in the axial direction of the barrel section 117. The deformation section 166 is continuously formed from the engaging section 161 in the axial direction of the barrel section 117. Note that the arrangement in which the engagement member 160 includes the posture adjustment section 167, as in the first and second embodiments, is preferable since it is possible to move the engaging section 161 smoothly.

Note that the present invention is not limited to the above embodiments, and can be variously deformed in the implementation stage within the spirit and scope of the invention. In addition, the respective embodiments may be appropriately combined and implemented, and in this case, combined effects can be obtained. Furthermore, the above embodiments include various inventions, and various inventions can be extracted by combinations selected from a plurality of disclosed components. For example, if problems can be solved and effects can be obtained even when several constituting elements are eliminated from all the constituting elements described in the embodiments, an arrangement obtained by eliminating the constituting elements can be extracted as an invention.

What is claimed is:

1. A lock mechanism for locking engagement between a first member including a barrel section formed in a cylindrical shape and formed with a hole extending through in a radial direction and a second member inserted into the barrel section from one end of the barrel section, comprising:

an engaged section formed on an outer surface of the second member; and an engagement member having one end portion fixed to an edge of the hole and long in an axial direction of the barrel section, the engagement member including an operating section formed in another end portion and having a gap with respect to the second member in the radial direction, a fulcrum section formed continuously from the operating section in the axial direction of the barrel section and configured to contact the second member in a state in which the operating section is pressed inward in the radial direction, an engaging section formed continuously from the fulcrum section in the axial direction, formed in a convex shape protruding inward in the radial direction, and engaging with the engaged section in the axial direction, and a deformation section formed continuously from the engaging section in the axial direction and configured to be bent to move the engaging section outward in the radial direction when the operating section is pressed inward in the radial direction.

2. The lock mechanism of claim 1, further comprising a posture adjustment section formed between the engaging section and the fulcrum section, and configured to hold, in a posture at the time of engagement with the engaged section, the engaging section at the time of movement by bending of the deformation section when the operating section is pressed inward in the radial direction.

3. An equipment connector comprising:

a barrel section fixed to a container, including a container-side flow path constituting portion, formed in a cylindrical shape so that a container connector including an engaged section on an outer surface is insertable from one end, and having a hole formed at a position facing the container connector in a radial direction;

an equipment-side flow path constituting portion stored in the barrel section and configured to communicate with the container-side flow path constituting portion when the container connector is inserted into the barrel section; and an engagement member having one end portion fixed to an edge of the hole and long in an axial direction of the barrel section, the engagement member including an operating section formed in another end portion and having a gap with respect to the container connector in the radial direction, a fulcrum section formed continuously from the operating section in the axial direction and configured to contact the container connector in a state in which the operating section is pressed inward in the radial direction, an engaging section formed continuously from the fulcrum section in the axial direction, formed in a convex shape protruding inward in the radial direction, and engaging with the engaged section in the axial direction in a state in which the container-side flow path constituting portion and the equipment-side flow path constituting portion communicate with each other, and a deformation section formed continuously from the engaging section in the axial direction and configured to be bent to move the engaging section outward in the radial direction when the operating section is pressed inward in the radial direction.

4. The equipment connector of claim 3, further comprising a posture adjustment section formed between the engaging section and the fulcrum section, and configured to hold, in a posture at the time of engagement with the engaged section, the engaging section at the time of movement by bending of the deformation section when the operating section is pressed inward in the radial direction.

5. A container connector comprising:

an insertion section configured to be insertable into a cylindrical barrel section of an equipment connector for fixing an equipment, which includes an equipment-side flow path constituting portion and includes the barrel section formed with a hole extending through in a radial direction, from one end of the barrel section;

a container fixing section fixed to the container;

a container-side flow path constituting portion formed in the insertion section and the container fixing portion and configured to communicate with an interior of the container when the container fixing section is fixed to the container and communicate with the equipment-side flow path constituting portion when the insertion section is inserted into the barrel section; and an engaged section formed in the insertion portion and configured to, in a state in which the container-side flow path constituting portion and the equipment-side flow path constituting portion communicate with each other, be engaged with an engaging section of an engagement member of the equipment connector, which includes the engagement member being long in an axial direction of the barrel section and having one end portion fixed to an edge of the hole, and the engagement member including an operating section, a fulcrum section formed continuously from the operating section in the axial direction of the barrel section and configured to contact the insertion section in a state in which the operating section is pressed inward in a radial direction of the barrel section, the engaging section formed continuously from the fulcrum section in the axial direction and formed in a convex shape protruding inward in the radial direction, and a deformation section formed continuously from the engaging section in the axial direction and configured to be bent to move the engaging section outward in the radial direction when the operating section is pressed inward in the radial direction.

6. A connection equipment comprising:

a container connector fixed to a container, including a container-side flow path constituting portion, and formed with an engaged section on an outer surface; and an equipment connector including a barrel section formed in a cylindrical shape so that the container connector is insertable from one end and having a hole formed at a position facing the container connector in a radial direction, an equipment-side flow path constituting portion stored in the barrel section and configured to communicate with the container-side flow path constituting portion when the container connector is inserted into the barrel section, and an engagement member having one end portion fixed to an edge of the hole and long in an axial direction of the barrel section, the engagement member including an operating section formed in another end portion and having a gap with respect to the container connector in the radial direction, a fulcrum section formed continuously from the operating section in the axial direction and configured to contact the container connector in a state in which the operating section is pressed inward in the radial direction, an engaging section formed continuously from the fulcrum section in the axial direction, formed in a convex shape protruding inward in the radial direction, and engaging with the engaged section in the axial direction in a state in which the container-side flow path constituting portion and the equipment-side flow path constituting portion communicate with each other, and a deformation section formed continuously from the engaging section in the axial direction and configured to be bent to move the engaging section outward in the radial direction when the operating section is pressed inward in the radial direction.

* * * * *